US007251044B1

(12) United States Patent
Kurashina

(10) Patent No.: US 7,251,044 B1
(45) Date of Patent: Jul. 31, 2007

(54) IMAGE PRINTING METHOD AND APPARATUS

(75) Inventor: Hiroyasu Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/601,010

(22) PCT Filed: Nov. 25, 1999

(86) PCT No.: PCT/JP99/06571

§ 371 (c)(1),
(2), (4) Date: Jul. 25, 2000

(87) PCT Pub. No.: WO00/32400

PCT Pub. Date: Jun. 8, 2000

(30) Foreign Application Priority Data

Nov. 27, 1998 (JP) ................................ 10-337552

(51) Int. Cl.
*G06K 3/00* (2006.01)
*B41J 11/00* (2006.01)

(52) U.S. Cl. ....................... 358/1.11; 358/1.1; 358/1.2; 358/1.18; 358/1.9; 400/61; 400/615.2; 400/76

(58) Field of Classification Search ................. 358/1.1, 358/1.2, 1.18, 1.9, 1.11; 400/61, 615.2, 76
See application file for complete search history.

(56) References Cited

U.S. PATENT DOCUMENTS 5,609,424 A * 3/1997 Sakuragi et al. .............. 400/61

FOREIGN PATENT DOCUMENTS

| | | |
|---|---|---|
| CN | 1144507 | 3/1997 |
| EP | 849687 A2 * | 6/1998 |
| JP | 58-112128 | 7/1983 |
| JP | 06-198962 | 7/1994 |
| JP | 07-205495 | 8/1995 |
| JP | 10-143499 | 5/1998 |
| JP | 10-166683 | 6/1998 |

* cited by examiner

*Primary Examiner*—Douglas Q. Tran

*Assistant Examiner*—Chan S. Park

(74) *Attorney, Agent, or Firm*—Hogan & Hartson LLP

(57) ABSTRACT

There are provided an image forming method and apparatus in which character string having one or more characters is registered as a regular character string, regular printing for printing the regular character string is instructed, irrespective of whether or not a character string other than the regular character string is being input or edited, and when regular printing is instructed, a regular character string image corresponding to the regular character string is printed as a print image. Irrespective of whether or not another character string is being edited, this construction enables the regular character string image of a registered regular character string to be printed at a desired time point through simple operations, while saving the capacity of the memory device.

15 Claims, 45 Drawing Sheets

FIG.21A

| |
|---|
| CIRCULAR 〔1st Sect.〕 : Yamada→Sato→Tanaka→Nakamura(IN CHARGE) |

FIG.21B

| |
|---|
| CIRCULAR : 1st Groop 1st Sect. of Development Dept. |
| Yamada→Sato→Tanaka→Watanabe→Nakamura(IN CHARGE) |

FIG.21C

| |
|---|
| APPROVAL : Sato Ichro,Chief of 1st Sect. of Development Dept. |

FIG.24A

| REGISTRATION No. | | | 1 | 2 | 3 | 6 | 8 |
|---|---|---|---|---|---|---|---|
| NAME | | | Nakamura Hanako | Yamada Taro | Suzuki Jiro | Satoh Ichiro | Tanaka Masa |
| Attribute Information | Affiliation to | Dept. | Development | Development | Manufacturing | Development | Development |
| | | Sect. | | 1st | 2nd | 1st | 1st |
| | | Group | | | | 1st 2nd | 1st |
| | Post | | Clerk | Sect. Chief | Sect. Chief | Chief | Group Leader |
| | Sex | | Female | Male | Male | Male | Male |

FIG.24B

| REGISTRATION No. | | 1 | 2 | 3 | 6 | 8 |
|---|---|---|---|---|---|---|
| NAME | | Nakamura Hanako | Yamada Taro | Suzuki Jiro | Sato Ichiro | Tanaka Masao |
| Attribute Information | Affiliation to | Development Dept | 1st Sect. Development Dept | 2nd Sect. Development Dept | 1st Sect.(1st G,2nd G) Development Dept | 1st G,1st Sect., Development Dept |
| | Post | Clerk | Sect. Chief | Sect. Chief | Chief | Group Leader |
| | Sex | Female | Male | Male | Male | Male |

FIG. 25

| ADDRESS REGISTRATION No. | | 2 |
|---|---|---|
| ENTRY/ REGISTRATION ITEM | PSTL CODE [ | 390-0851 |
| | RESIDENCE [ | 2-12-3-B Simauti, Matumoto City, Nagano Pref. |
| | FIRM [ | Kabusiki Kaisha ABC Project |
| | NAME [ | Yamada Taro |
| | (CUSTOMER) BARCODE [ | 39008512-12-3-B |
| | TEL1 [ | Home 03-1234-5678 |
| | TEL2 [ | Cellular 010-123-4567 |
| | FAX [ | 03-2345-6789 |
| | BIRTHDAY [ | February 3,1998 |
| | MEMO1 [ | e-mail : taro@net.co.jp |
| | MEMO2 [ | URL:http://www.abc.com/ |

F I G. 3 0

| EFFECTIVE KEY(S) | ACTIVE CONDITION | BASIC FUNCTION |
|---|---|---|
| [LEFT ARROW] | EXCEPT AT CHARACTER STRING HEAD | RELATIVELY MOVE IMAGINARY CURSOR TO PRECEDING CHARACTER |
| | AT CHARACTER HEAD | (SOFT WARNING) |
| [SHIFT] + [LEFT ARROW] | EXCEPT AT ITEM HEAD | TO ENTRY GUIDE OF PRESENT ITEM |
| | AT ITEM HEAD | (SOFT WARNING) |
| [UP ARROW] | EXCEPT AT TOP LINE | RELATIVELY MOVE IMAGINARY CURSOR TO PRECEDING ITEM |
| | AT TOP LINE | (SOFT WARNING) |
| [SHIFT] + [UP ARROW] | EXCEPT AT TOP LINE | TO ENTRY GUIDE OF HEAD ITEM |
| | AT TOP LINE | (SOFT WARNING) |
| [DOWN ARROW] | EXCEPT AT BOTTOM LINE | RELATIVELY MOVE IMAGINARY CURSOR TO NEXT ITEM |
| | AT BOTTOM LINE | (SOFT WARNING) |
| [SHIFT] + [DOWN ARROW] | EXCEPT AT BOTTOM LINE | TO LAST CHARACTER STRING OF LAST ITEM |
| | AT BOTTOM LINE | (SOFT WARNING) |
| [RIGHT ARROW] | EXCEPT AT CHARACTER STRING TAIL | RELATIVELY MOVE IMAGINARY CURSOR TO NEXT CHARACTER |
| | AT CHARACTER STRING TAIL | (SOFT WARNING) |
| [SHIFT] + [RIGHT ARROW] | EXCEPT AT CHARACTER STRING TAIL | TO LAST CHARACTER OF PRESENT LINE |
| | AT CHARACTER STRING TAIL | (SOFT WARNING) |
| [CURSOR] (CONTINUAL DEPRESSION) | | AUTO REPEAT |
| [SHIFT] | | NO RESPONSIVE OPERATION |
| [SELECTION] | EXCEPT AT BOTTOM LINE | MOVE TO HEAD OF NEXT ITEM |
| | AT BOTTOM LINE | RETURN TO PRECEDING LEVEL |
| [DELETE] | | RETURN TO PRECEDING LEVEL |
| [SHIFT] + [DELETE] | | |
| [ADDRESS] / [PHONE BOOOK] | | |
| [SHIFT] + [PHONE BOOK] | | |
| [ON/OFF] | | POWER OFF ( START WITH TEXT ENTRY SCREEN WHEN POWER IS TURNED ON NEXT TIME) |

FIG. 33

| KEY OPERATION DURING PREPARATION | PROCESSING |
| --- | --- |
| 〔CANCEL〕 | 1.DISPLAY "STOP PRINT!" FOR A PREDETERMINED TIME<br>2.RETURN TO SELECTION SCREEN OF ADDRESS PRINTING, PRECEDING PHONE BOOK SCREEN |
| 〔ON/OFF〕 | 1.DISPLAY "STOP PRINT!" FOR A PREDETERMINED TIME<br>2.TURN OFF POWER<br>3.(SRART WITH TEXT ENTRY SCREEN WHEN POWER IS TURNED ON NEXT TIME) |
| OTHER KEYS | NO RESPONSIVE OPERATION |

| KEY OPERATION DURING PRINTING | PROCESSING |
| --- | --- |
| 〔CANCEL〕 | 1.IMMEDIATELY DISPLAY "STOP PRINT!"<br>2.STOP PRINTING<br>3.AUTOMATICALLY FEED TAPE BY 12mm<br>4.RETURN TO SELECTION SCREEN OF ADDRESS PRINTING, PRECEDING PHONE BOOK SCREEN |
| 〔ON/OFF〕 | 1.IMMEDIATELY DISPLAY "STOP PRINT!"<br>2.STOP PRINTING<br>3.AUTOMATICALLY FEED TAPE BY 12mm<br>4.TURN OFF POWER<br>5.(SRART WITH TEXT ENTRY SCREEN WHEN POWER IS TURNED ON NEXT TIME) |
| OTHER KEYS | NO RESPONSIVE OPERATION |

FIG. 34A

PSTL CODE [390-0851
RESIDENCE [2-12-3-B Simauti, Matumoto City, Nagano Pref.
FIRM [Kabusiki Kaisha ABC Project
NAME [Yamada Taro
BARCODE [39008512-12-3-B

FIG. 34B 390-0851
2-12-3-B Simauti, Matumoto City, Nagano Pref.
Kabusiki Kaisha ABC Project
Mr. Yamada Taro

FIG. 34C

PSTL CODE [390-0851
RESIDENCE [2-12-3-B Simauti, Matumoto City, Nagano Pref.
FIRM [Kabusiki Kaisha ABC Project
NAME [Yamada Taro

FIG. 34D 390-0851
2-12-3-B Simauti, Matumoto City, Nagano Pref.
Kabusiki Kaisha ABC Project
Mr.Yamada Taro

FIG. 37A

PSTLCODE [390-0851
FIRM [Kabusiki Kaisha ABC Project
NAME [Yamada␣Taro
BARCODE [39008512-12-3-B

FIG. 37B 390-0851-2-12-3-B
Kabusiki Kaisha ABC Project
Mr. Yamada Taro

FIG. 37C

PSTL CODE [390-0851
RESIDENCE NO. [2-12-3-B
FIRM [Kabusiki Kaisha ABC Project
NAME [Yamada Taro

FIG. 37D

PSTL CODE [390-0851
RESIDENCE NO. [2-12-3-B
RESIDENCE [2-12-3-B Simauti, Matumoto City,Nagano Pref.
FIRM [Kabusiki Kaisha ABC Project
NAME [Yamada Taro

F I G. 3 9

| LEVEL | 1ST LEVEL | 2ND LEVEL |
|---|---|---|
| OPTION | PHONE BOOK 01<br>:<br>PHONE BOOK 99 | ADD READ nn |
| | (DISPLAY REGITERED NAME + PHONE NO.) | (DISPLAY REGITERED ADDRESS) |

F I G. 4 1

| REGISTRATIONS IN TEL (MAXIMUM 15 CHARACTERS) | DISPLAYED IMAGES (MAXIMUM 12 HALF-SIZE CHARACTERS) |
|---|---|
| 〔□□□□□□□□□□□□□□□〕 | □□□□□□□□□□□□ |
| 〔0 1 2 3 4 5 6 7 8 9 | 0 1 2 3 4 5 6 7 8 9 |
| 〔0 3 − 4 5 6 7 − 8 9 0 1 | 0 3 4 5 6 7 8 9 0 1 |
| 〔0 1 2 3 4 5 6 7 8 9 0 1 2 3 4 | 0 1 2 3 4 5 6 7 8 9 0 1 |
| 〔R E P 0 2 6 3 − 4 5 − 6 7 8 9 | 0 2 6 3 4 5 6 7 8 9 |
| 〔HM1 F 0 3 4 5 6 7 8 9 0 0 | 1 0 3 4 5 6 7 8 9 0 0 |

FIG. 42

| EFFECTIVE KEY(S) | BASIC FUNCTION |
| --- | --- |
| [LEFT ARROW] | DISPLAY PRECEDING CANDIDATE |
| [UP ARROW] | |
| [DOWN ARROW] | DISPLAY NEXT CANDIDATE |
| [RIGHT ARROW] | |
| [CURSOR] (CONTINUAL DEPRESSION) | AUTO REPEAT |
| [SHIFT] | NO RESPONSIVE OPERATION |
| [SHIFT] + [CURSOR] | JUMP TO END OF MENU |
| [SELECTION] | ENRER ADDRESS READ FUNCTION FOR THE SELECTED CANDIDATE |
| [CANCEL] | RETURN TO PRECEDING LEVEL |
| [PHONE BOOK] | RETURN TO PRECEDING LEVEL |
| [PRINT] | EXECUTE PHONE BOOK PRINTING |
| [SHIFT] + [PRINT] | ENTER MENU OF FEED / CUT |
| [ON/OFF] | POWER OFF ( START WITH TEXT ENTRY SCREEN DISPLAYED IMMEDIATELY BEFORE ENTERING PHONE BOOK FUNCTION WHEN POWER IS TURNED ON NEXT TIME |

IMAGE PRINTING METHOD AND APPARATUS

TECHNICAL FIELD

This invention relates to an image printing method and apparatus which print character string images having images of characters, such as letters, numerals, symbols, simple figures, and the like arranged therein.

BACKGROUND ART

Generally, in a printing apparatus, such as a word processor or the like, when the user enters desired character strings including one or more characters, such as letters, numerals, symbols, simple figures, and the like, via the keyboard or the like, font data corresponding to text code data of each character is read out from a ROM or the like having predetermined font data stored therein, and character string image data is formed based on the font data such that the data is arranged in a predetermined display image-forming area, whereby display image data is formed. A display image represented by this display image data is displayed on a predetermined display screen. This permits the user to view and check on results of entry and edit of desired character strings effected via the keyboard, in the display image which is displayed on the display screen with the results reflected thereon.

After the checking, when the user depresses a predetermined print key or the like, the printing apparatus forms character string image data, in the same manner as described above, based on font data such that it is arranged in a predetermined print image-forming area, whereby print image data is formed. A print image represented by this print image data is printed on a predetermined printing object. This permits the user to print a character string image of his desired character string checked on the display screen, on the predetermined printing object. Further, the user can store (register) the desired character string image which he entered via the keyboard or the like and checked on the display screen, in the form of text data which is a source of the desired character string image in a memory area of a predetermined storage medium. Further, he can read it out at a desired time point and print it on a predetermined printing object after verifying the image on the display screen.

In the conventional printing apparatus, such as the word processor, however, it is assumed that a desired character string image is printed on a predetermined printing object after it is checked on the display screen. Conversely, the user can print his desired character string image only after it is displayed on the display screen. On the other hand, print images the user desires to print include (regular or repetitive) character string images that he would like to print habitually and frequently. Examples of such print images are the name of the user himself and the name of his division. Once these print images are checked on and registered or stored, they are needed only for printing but checking of them is no longer necessitated.

Further, in everyday operations, if the above regular character string images have to be printed while other character string images are being entered and edited, it is required to once save (store) the character strings being edited, and then read the regular character string images for printing. Moreover, after the regular character string are printed, it is required to read (restore) the character strings being edited, again, and resume the editing operation. This is an inconvenience. In some word processors (including word processing software installed a personal computer (PC), the user is permitted to handle a plurality of edit screens at a time by switching between the edit screens or displaying the edit screens at the same time. In the former case, however, the user has to switch an edit screen being used for editing operations to a new edit screen, read regular character strings to display them on the screen, print them, and then return to the preceding edit screen used for the editing operations. This is troublesome and time-consuming. In the latter case, to display a plurality of edit screens at a time, a large display screen is required. Further, to use such a plurality of edit screens, a large memory capacity for storing a plurality of display image data items to be displayed on them is necessitated. Therefore, they are not suitable for a small-sized and inexpensive printing apparatus.

It is an object of the invention to provide an image printing method and apparatus which are cable of printing a regular character string image of registered regular character strings at a desired time point through simple operations, irrespective of whether other character strings are being edited or not, while saving the capacity of a memory used for displaying images.

DISCLOSURE OF THE INVENTION

An image printing method as claimed in claim 1 comprises a regular character string registration step of registering a character string having at least one character as a regular character string, a regular printing instruction step of instructing regular printing for printing the regular character string, irrespective of whether or not a character string other than the regular character string is being input or edited, and a regular printing step of printing a regular character string image corresponding to the regular character string on a printing object as a print image when the regular printing is instructed.

An image printing apparatus as claimed in claim 3 comprises regular character string registration means for registering a character string having at least one character as a regular character string, regular printing instruction means for instructing regular printing for printing the regular character string, irrespective of whether or not a character string other than the regular character string is being input or edited, and regular printing means for printing a regular character string image corresponding to the regular character string on a printing object as a print image when the regular printing is instructed.

According to this image printing method and apparatus, it is possible to register beforehand a character string including one or more characters as a regular character string and instruct regular printing for printing the regular character string, irrespective of whether or not a character string other than the regular character string is being input or edited. Further, when regular printing is instructed, a regular character string image corresponding to the regular character string is printed as a print image. That is, by registering beforehand a character string as a regular character string, it is possible to print the regular character string image of the registered regular character string at a desired time point, irrespective of whether or not a character string other than the character string is being input or edited. Further, the regular character string image can be printed through a simple operation, simply by instructing regular printing.

It should be noted that in this processing, the regular character string may be registered (stored) beforehand in a ROM or the like, or that the apparatus may be configured such that the regular character string can be input for registration via an input device, such as a keyboard, similarly to normal character strings. Further, the regular character string may be registered as a character string image (data item) formed, but to save the capacity of the memory device, it is preferred that a text (data item) of the character string is registered and formed into a print image before printing to print the print image thereafter. In this case, the regular text data may be formed as an image based on font data, such as a bit map font and the like, or when the regular text data is of characters registered as nonstandard characters, the regular text data may be formed based on a registered bit map. It should be noted that regular printing can be instructed simply by key entry made via the keyboard, for instance, and in this case, it is not necessary to check or confirm the regular character string by displaying an image thereof on the display screen before printing.

In the image printing method as claimed in claim 1, it is preferred that a plurality of types of regular character strings can be registered as the regular character strings, the image printing method further including a regular printing image selection step of selecting any one of the plurality of types of regular character strings as a regular character string to be printed by the regular printing.

In the image printing apparatus as claimed in claim 3, it is preferred that a plurality of types of regular character strings can be registered as the regular character strings, the image printing apparatus further including regular print image selection means for selecting any of the plurality of types of regular character strings as a regular character string to be printed by the regular printing.

In the image printing method and apparatus, it is possible to register a plurality of types of character strings as regular character strings, and any of the plurality of types of regular character strings is selected as a regular character string for use in regular printing. In other words, a plurality of types of character strings can be registered beforehand as regular character strings, and further, any of the regular character strings can be printed through simple operations, simply by selecting the regular character string at a desired time point and instructing the regular printing. It should be noted that in this case, the regular character string may be selected before regular printing is instructed or it may be selected as an object to be printed by the regular printing after the printing is instructed.

In the image printing method as claimed in claim 2, it is preferred that the regular printing image selection step includes an identifier display step of displaying a plurality of types of identifiers corresponding respectively to the plurality of types of regular character strings on a predetermined display screen, and an identifier selection step of selecting any one of the plurality of types of identifiers.

In the image printing apparatus as claimed in claim 9, it is preferred that the regular print image selection means includes identifier display means for displaying a plurality of types of identifiers corresponding to the plurality of types of regular character strings on a predetermined display screen, and identifier selection means for selecting any of the plurality of types of identifiers.

According to this image printing method and apparatus, a plurality of types of identifiers corresponding to a plurality of types of regular character strings are displayed on the display screen, for selecting any of the identifiers. In this case, identifiers are only required to enable discrimination of regular character strings from each other based on their images displayed. For instance, a predetermined number of characters placed at the head of each regular character string, a nickname or the like, and simply a registration number may be used as identifiers. In these cases, the display screen can be designed compact, since it is only required to display identifiers. Further, since the identifiers can be easily displayed in a manner listed in order, they can be selected with ease through simple operations.

In the image printing method as claimed in claim 3, it is preferred that the regular printing image selection step includes a display-restoring information storage step of storing display-restoring information required for restoring contents currently displayed on the predetermined display screen before displaying the plurality of types of identifiers, and a display restoration step of restoring the contents displayed on the predetermined display screen at the time of storing the display-restoring information, based on the display-restoring information, after selection of the identifier.

In the image printing method as claimed in claim 3, it is preferred that the regular print image selection means includes display-restoring information storage means for storing in advance display-restoring information required for restoring contents currently displayed on the predetermined display screen before displaying the plurality of types of identifiers, and display restoration means for restoring the contents currently displayed on the predetermined display screen at a time point of storing the display-restoring information, based on the display-restoring information, after selection of the identifier.

According to this image printing method and apparatus, at a time point before the above plurality of types of identifiers are displayed, display-restoring information for restoring displayed contents of the predetermined display screen at the time point is stored, and after selecting identifiers, displayed contents of the predetermined display screen at the time point of storing the display-restoring information are caused to be restored based on the display-restoring information. Consequently, even when the display screen is used to display the identifiers, it is possible to return the display screen to the state of the screen being displayed before the identifiers are displayed, whereby even if the user prints a regular character image (by regular printing) in the course of editing a character string other than a regular character string on the display screen, it is possible to easily restore the display screen to the state of the screen being displayed in the course of the editing operation. In the above case, since text data as a source of the display image of the character string being edited, for instance, is stored in the edit text data area, so that it is only required to set (store) a flag for causing the display image to be formed again from the edit text data, as display-restoring information, which enables the capacity of the memory device to be saved.

In the image printing method as claimed in claim 1, it is preferred that the regular character string includes a character string representative of at least one of a person's name, an appellation, and a name of a division to which a person belongs.

In the image printing apparatus as claimed in claim 3, it is preferred that the regular character strings include a character string representative of at least one of a person's name, an appellation, and a name of a division to which a person belongs.

According to this image printing method and apparatus, since the regular character strings include a character string representative of at least one of a person's name, an appellation, and a name of a division to which a person belongs, it is possible to print a print image including any of the name, the appellation, such as a firm name, and the name of the division at a desired time point through simple operations.

In the image printing method as claimed in claim 1, it is preferable that the image printing method further includes an arbitrary character string entry step of entering an arbitrary character string having at least one character, and at the regular character string registration step, the arbitrary character string is registered as one type of the regular character string.

In the image printing apparatus as claimed in claim 3, it is preferable that the image printing apparatus further includes arbitrary character string entry means for entering an arbitrary character string having at least one character, and the regular character string registration means registers the arbitrary character string as one type of the regular character string.

According to this image printing method and apparatus, it is possible to enter an arbitrary character string including one or more characters, and register the arbitrary character string as one type of a regular character string. More specifically, if only one type of a character string can be registered as the regular character string, an arbitrary character string entered can be registered as the regular character string. Further, if a plurality of types of character strings can be registered as regular character strings, the arbitrary character string entered may be registered as a new or additional regular character string. This makes it possible to print an arbitrary character string entered through a simple operation at a desired time point.

In the image printing apparatus as claimed in claim 13, it is preferred that the image printing apparatus further includes arbitrary printing instruction means for instructing arbitrary printing for printing the arbitrary character string entered, and arbitrary printing means for printing an arbitrary character string image corresponding to the arbitrary character string as the print image when the arbitrary printing is instructed.

According to this image printing method and apparatus, by instructing the arbitrary printing for printing an entered arbitrary character string, an image of the arbitrary character string can be printed. Further, in this case as well, printing operation can be carried out through a simple operation, simply by instructing the arbitrary printing at a desired time point. More specifically, it is possible not only to print a regular character string image by regular printing through simple operations at a desired time point but also to print an arbitrary character string image corresponding to the entered arbitrary character string as a print image through simple operations at a desired time point, irrespective of whether or not the entered arbitrary character string is registered as a regular character string. This makes it possible to further increase the versatility and operability of the apparatus.

In the image printing method as claimed in claim 1, it is preferred that the printing object is a tape.

In the image printing apparatus as claimed in claim 3, it is preferred that the printing object is a tape.

According to this image printing method and apparatus, since the printing object is a tape, the invention can be applied to a tape printing apparatus.

In the image printing method as claimed in claim 1, it is preferable that the image printing method further includes a related character string registration step of registering the regular character string as a representative character string, and registering at least one character string related to the representative character string as related character strings, such that the related character strings are correlated with the representative character string, to thereby construct one regular character string group including the representative character string as a representative thereof, and that the regular printing step includes a related character string printing step of printing, when a representative character string image corresponding to the representative character string is printed as the regular character string image, at least one related character string image corresponding to at least one of the related character strings such that the at least one related character string image accompanies the representative character string image.

In the image printing apparatus as claimed in claim 3, it is preferable that the image printing apparatus further includes related character string registration mean for registering the regular character string as a representative character string, and registering at least one character string related to the representative character string as related character strings, such that the related character strings are correlated with the representative character string, to thereby construct one regular character string group including the representative character string as a representative thereof, and that the regular printing means includes related character string printing means for printing, when a representative character string image corresponding to the representative character string is printed as the regular character string image, at least one related character string image corresponding to at least one of the related character strings such that the at least one related character string image accompanies the representative character string image.

According to this image printing method and apparatus, the registration is carried out for registering the regular character string as a representative character string, and registering at least one character string related to the representative character string as related character strings, such that the related character strings are correlated with the representative character string, to thereby construct one regular character string group including the representative character string as a representative thereof. Further, when a representative character string image corresponding to the representative character string is printed as the regular character string image, at least one related character string image corresponding to at least one of the related character strings is printed such that the at least one related character string image accompanies the representative character string image. That is, a character string group having a regular character string as a representative character string is registered as one regular character string group, and when a representative character string image is printed as a regular character string image, one or more of related character string images are printed such that the one or more of related character string images accompanies the representative character string image. Therefore, irrespective of whether or not another character string is being input or edited, not only the regular character string image of a registered regular character string but also one or more of the related character string images of related character strings related to the regular character string can be printed through simple operations at a desired time point such that the one or more of the related character string images accompanies the regular character string image.

In the image printing method as claimed in claim 2, it is preferred that at the related character string printing step, at least one predetermined related character string image of the related character strings is printed such that the at least one predetermined related character string image accompanies the representative character string image.

In the image printing method as claimed in claim 4, it is preferred that the related character string printing means prints at least one predetermined related character string image of the related character strings such that the at least one predetermined related character string image accompanies the representative character string image.

According to this image printing method and apparatus, since at least one predetermined related character string image of the related character strings is printed such that the at least one predetermined related character string image accompanies the representative character string image, it is possible to print predetermined related character string images related to a regular character string image through simple operations at a desired time point along with the regular character string image.

In the image printing method as claimed in claim 2, it is preferred that a plurality of types of related character strings can be registered as the related character strings, and that the related character string printing step includes a related print image selection step of selecting at least one arbitrary related character string of the related character strings, and a related print image printing step of printing the at least one selected arbitrary related character string such that the at least one selected arbitrary related character string accompanies the representative character string image.

In the image printing method as claimed in claim 4, it is preferred that a plurality of types of related character strings can be registered as the related character strings, and that the related character string printing means includes related print image selection means for selecting at least one arbitrary related character string of the related character strings, and related print image printing means for printing the at least one selected arbitrary related character string such that the at least one selected arbitrary related character string accompanies the representative character string image.

According to this image printing method and apparatus, a plurality of types of character strings can be registered as related character strings, and at least one desired related character strings of the related character strings are selected and printed such that the at least one desired related character strings accompanies a representative character string image. Hence, at least one related character string images can be selected as desired and printed through simple operations at a desired time point such that they accompany the regular character string image.

In the image printing method as claimed in claim 2, it is preferred that a plurality of types of regular character strings can be registered as the regular character strings, and that the image printing method further includes a regular printing image selection step of selecting any one of the plurality of types of regular character strings as a regular character string to be printed by the regular printing.

In the image printing method as claimed in claim 4, it is preferred that a plurality of types of regular character strings can be registered as the regular character strings, and that the image printing apparatus further includes regular printing image selection means for selecting any of the plurality of types of regular character strings as a regular character string to be printed by the regular printing.

According to this image printing method and apparatus, similarly to the method and apparatus as claimed in claims 2 and 9, a plurality of types of regular character strings can be registered as the regular character strings, and any of the plurality of types of regular character strings is selected as a regular character string to be printed by the regular printing. That is, a plurality of types of character strings can be registered as regular character strings and printed through simple operations, simply by selecting any of them at a desired time point and instructing regular printing. It should be noted that in this case as well, a regular character string can be selected before, simultaneously with, or after instruction of regular printing.

In the image printing method as claimed in claim 38, it is preferred that the regular character string group is registered such that related character strings can be retrieved by using an identifier corresponding to the representative character string as a retrieving condition, and that at the regular print image selection step, any of the plurality of regular character strings is selected based on a plurality of types of identifiers corresponding respectively to the plurality of types of regular character strings.

In the image printing method as claimed in claim 7, it is preferred that the regular character string group is registered such that related character strings can be retrieved by using an identifier corresponding to the representative character string as a retrieving condition, and that the regular print image selection means selects any of the plurality of regular character strings based on a plurality of types of identifiers corresponding respectively to the plurality of types of regular character strings.

According to this image printing method and apparatus, the regular character string group is registered such that related character strings can be retrieved by using an identifier corresponding to the representative character string as a retrieving condition, and selection of any of the plurality of regular character strings is effected based on a plurality of types of identifiers corresponding respectively to the plurality of types of regular character strings. Therefore, by selecting an identifier, a regular character string to be printed can be selected, and at the same time related character strings to be printed with the regular character string can be retrieved with ease. In this cases, an identifier may be each regular character string itself, a predetermined number of characters placed at the head of each regular character string, for instance, a nickname or the like, or simply a registration number.

In the image printing method as claimed in claim 20, it is preferred that the regular character string group is registered such that the representative character string corresponding to the identifier is registered separately therefrom as one type of the related character string.

In the image printing method as claimed in claim 42, it is preferred that the regular character string group is registered such that the representative character string corresponding to the identifier is registered separately therefrom as one type of the related character string.

According to this image printing method and apparatus, the regular character string group is registered such that the representative character string corresponding to the identifier is registered separately therefrom as one type of the related character string. That is, although it is obvious that a representative character string is a related character string related to the representative character string itself, by registering the representative character string as related character strings separately from its identifier, whereby the identifier can be set to be, for instance, a registration number, a nickname, or a predetermined number of characters at the head of each regular character string. This makes it easy to simplify an identifier.

In the image printing method as claimed in claim 20, it is preferred that assuming that predetermined two identifiers included in the plurality of types of identifiers are defined as a first identifier and a second identifier, and regular character string groups corresponding to the first identifier and the second identifier are defined as a first regular character string group and a second regular character string group respectively, at least one of related character strings of the second regular character string group is included in related character strings of the first regular character string group, as a common related character string.

In the image printing method as claimed in claim 42, it is preferred that assuming that predetermined two identifiers included in the plurality of types of identifiers are defined as a first identifier and a second identifier, and regular character string groups corresponding to the first identifier and the second identifier are defined as a first regular character string group and a second regular character string group respectively, at least one of related character strings of the second regular character string group is included in related character strings of the first regular character string group, as a common related character string.

According to this image printing method and apparatus, assuming that predetermined two identifiers included in the plurality of types of identifiers are defined as a first identifier and a second identifier, and regular character string groups corresponding to the first identifier and the second identifier are defined as a first regular character string group and a second regular character string group respectively, at least one of related character strings of the second regular character string group is included in related character strings of the first regular character string group, as a common related character string. Therefore, this common related character string can be retrieved based on the first identifier as well as based on the second identifier. It should be noted that in the above case, it is also possible to set all the related character strings of the second regular character string group to common related character strings. Further, as recited hereinabove in claims 21 and 43, when a representative character string is included in the related character strings, the representative character string may be designated as a common representative character string. In this case, the representative character string may be set to a common representative character string, or a representative character string of only one of the first and second regular character string groups. When the representative character string is set to a common representative character string, related character strings (having different attributes from each other, for instance) related to the representative character string in a different manner are registered in the respective regular character string groups, and by selecting identifiers discriminatively, related character strings to be printed such that they accompany the representative regular character string can be selectively used. Further, in this case, if all the related character strings including the representative character string, of the second regular character string group are set to common related character strings, the second regular character string group can be set to a subordinate regular character string group with respect to the first regular character string group as a superordinate regular character group.

In the image printing method as claimed in claim 22, it is preferred that related character strings of the first regular character string group and the second regular character string group are registered in a form of matrix data retrievable by any of predetermined multi-dimensional retrieving conditions including the first identifier and the second identifier, and the common related character string is registered as data retrievable by using either of the first identifier and the second identifier as conditions for retrieval.

In the image printing apparatus as claimed in claim 9, it is preferred that related character strings of the first regular character string group and the second regular character string group are registered in a form of matrix data retrievable by any of predetermined multi-dimensional retrieving conditions including the first identifier and the second identifier, and the common related character string is registered as data retrievable by using either of the first identifier and the second identifier as retrieving conditions.

According to this image printing method and apparatus, each of the related character strings is registered in the form of matrix data which can be retrieved by any of predetermined multi-dimensional retrieving conditions including the first identifier and the second identifier, so that it becomes easy to carry out registration and retrieval based on identifiers, such as the first identifier, the second identifier and the like. Particularly, the common related character string is registered as data retrievable by using either of the first identifier and the second identifier as retrieving conditions, so that the common related character string becomes related characters which simultaneously satisfy both the retrieving conditions. This makes it easier to register and retrieve the common related character string.

In the image printing method as claimed in claim 20, it is preferred that the regular character string group is registered in a form of a list of data which enables related character strings of the regular character string group to be retrieved by using an identifier corresponding to the regular character string group as a retrieving condition.

In the image printing apparatus as claimed in claim 42, it is preferred that the regular character string group is registered in a form of a list of data which enables related character strings of the regular character string group to be retrieved by using an identifier corresponding to the regular character string group as a retrieving condition.

According to this image printing method and apparatus, the regular character string group is registered in a form of a list of data which enables related character strings of the regular character string group to be retrieved by an identifier corresponding to the regular character string group and serving as a retrieving condition. This makes it easy to carry out registration and retrieval of character strings. Particularly, it becomes easy to continuously register and retrieve a plurality of related character strings corresponding to one identifier.

In the image printing method as claimed in claim 20, it is preferred that the regular print image selection step includes an identifier display step of displaying the plurality of types of identifiers on a predetermined display screen, and an identifier selection step of selecting any one of the plurality of types of identifiers.

In the image printing apparatus as claimed in claim 20, it is preferred that the regular print image selection means includes identifier display means for displaying the plurality of types of identifiers on a predetermined display screen, and identifier selection means for selecting any of the plurality of types of identifiers.

According to this image printing method and apparatus, similarly to the method and apparatus as claimed in claims 3 and 10, a plurality of types of identifiers corresponding to the plurality of types of regular character strings are displayed on a predetermined display screen to permit selection of any of the plurality of types of identifiers. The identifiers are only required to have respective images to be displayed with reference to which discrimination of regular character strings can be made. Hence, the display screen can be designed compact.

In the image printing method as claimed in claim 25, it is preferred that the identifier display step includes a related character string display step of displaying related character strings which are to printed when each of the identifiers for selection is selected, together with the each of the identifiers corresponding thereto.

In the image printing apparatus as claimed in claim 10, it is preferred that the identifier display means includes related character string display means of displaying related character strings which are to printed when each of the identifiers for selection is selected together with the each of the identifiers corresponding thereto.

In this image printing apparatus and method, related character strings which are to printed are displayed when each of the identifiers for selection is selected, together with the each of the identifiers corresponding thereto. Therefore, it is possible to easily grasp a related character string for printing by way of the displayed related character, and with reference to the related character displayed each identifier can be selected.

In the image printing method as claimed in claim 26, it is preferred that the identifier display step further includes a related character string reading step of displaying, when a predetermined reading instruction is provided in a state of each of the identifiers being displayed, all related character strings corresponding to the displayed identifier in a readable manner.

In the image printing apparatus as claimed in claim 48, it is preferred that the identifier display means further includes related character string reading means for displaying, when a predetermined reading instruction is provided in a state of each of the identifiers being displayed, all related character strings corresponding to the displayed identifier in a readable manner.

In this image printing apparatus and method, when a predetermined reading instruction is provided in a state of each of the identifiers being displayed, all related character strings corresponding to the displayed identifier are displayed in a readable manner. Therefore, not only the displayed identifier and related character strings but also other related character strings in the same regular character string group can be easily grasped by providing the predetermined reading instruction through simple operations, which makes it possible to select each identifier with reference to the related character strings.

In the image printing method as claimed in claim 25, it is preferred that the regular print image selection step further includes a display-restoring information storage step of storing display-restoring information required for restoring contents currently displayed on the predetermined display screen before displaying the plurality of types of identifiers, and a display restoration step of restoring the contents displayed on the predetermined display screen at the time of storing the display-restoring information, based on the display-restoring information, after selection of the identifier.

In the image printing apparatus as claimed in claim 10, it is preferred that the regular print image selection means further includes display-restoring information storage means for storing display-restoring information required for restoring contents currently displayed on the predetermined display screen before displaying the plurality of types of identifiers, and display restoration means for restoring the contents displayed on the predetermined display screen at the time of storing the display-restoring information, based on the display-restoring information, after selection of the identifier.

In this image printing apparatus and method, similarly to the method and apparatus as claimed in claim 4 and 11, display-restoring information required for restoring contents currently displayed on the predetermined display screen is stored before displaying the plurality of types of identifiers, and the contents displayed on the predetermined display screen at the time of storing the display-restoring information are restored based on the display-restoring information, after selection of the identifier. Therefore, even when the display screen is used to display the identifiers, it is possible to return the display screen to the state of the screen being displayed before the identifiers are displayed, whereby even if the user prints a regular character image in the course of editing a character string other than a regular character string on the display screen, it is possible to easily restore the display screen to the state of the screen being displayed in the course of the editing operation. In the above case, if text data of the character string being edited is stored, it is only required to set (store) a flag for causing the display image to be formed again from the text data, as display-restoring information, which enables the capacity of the memory device to be saved.

In the image printing method as claimed in claim 2, it is preferred that the regular character string includes a character string representative of at least one of a person's name, an appellation, an address, a phone number, and a name of a division to which a person belongs.

In the image printing apparatus as claimed in claim 4, it is preferred that the regular character string includes a character string representative of at least one of a person's name, an appellation, an address, a phone number, and a name of a division to which person belongs.

In this image printing apparatus and method, the regular character string includes a character string representative of any of a name, a appellation, such as a firm name, an address, a phone number and a name of a division. Hence, it is possible to print a print image including at least any of the name, the appellation, the address, the phone number and the name of the division through simple operations at a desired time point.

In the image printing method as claimed in claim 29, it is preferred that when the representative character string is a character string representative of a person's name or an appellation, the related character string includes a character string representative of an address related to the person's name or the appellation.

In the image printing apparatus as claimed in claim 12, it is preferred that when the representative character string is a character string representative of a person's name or an appellation, the related character string includes a character string representative of an address related to the person's name or the appellation.

In this image printing apparatus and method, when the representative character string is a character string representative of a name or a appellation, the related character string includes a character string representative of an address related to the name or the appellation, so that, this regular character string group serves as a so-called address book, and the related character string representative of the address is printed such that it accompanies the representative character string representative of the name or the appellation, whereby a mailing address and the like can be printed with ease.

In the image printing method as claimed in claim 30, it is preferred that the related character string further includes at least one of a postal code and a barcode which correspond to the address.

In the image printing apparatus as claimed in claim 52, it is preferred that the related character string further includes at least one of a postal code and a barcode which correspond to the address.

In this image printing apparatus and method, the related character string further includes at least one of a postal code and a barcode corresponding to the address. Hence, a mailing address and the like can be printed more easily.

In the image printing method as claimed in claim 29, it is preferred that when the representative character string is a character string representative of a person's name or an appellation, the related character string includes a character string representative of a phone number related to the person's name or the appellation.

In the image printing apparatus as claimed in claim 12, it is preferred that when the representative character string is a character string representative of a person's name or an appellation, the related character string includes a character string representative of a phone number related to the person's name or the appellation.

In this image printing apparatus and method, when the representative character string is a character string representative of a person's name or an appellation, the related character string includes a character string representative of a phone number concerning the name or the appellation, so that this regular character string group serves as a so-called phone book, and the related character string representative of the phone number is printed such that it accompanies the representative character string representative of the name or the appellation, whereby the resulting print can be lightly used as a memorandum of phone numbers.

In the image printing method as claimed in claim 32, it is preferred that the related character string representative of the phone number additionally includes a character string representative of an attribute of the phone number.

In the image printing apparatus as claimed in claim 54, it is preferred that the related character string representative of the phone number additionally includes a character string representative of an attribute of the phone number.

According to this image printing method and apparatus, since the related character string representative of a phone number includes a character string representative of the attribute (home, home ground floor, office, representative (pilot), direct dialing or the like) of the phone number, the attributes of the phone number can be easily grasped, simply by adding the attributes to the phone number for printing.

In the image printing method as claimed in claim 33, it is preferable that the image printing method further includes a phone number attribute deletion step of automatically deleting the character string representative of the attribute of the phone number for conversion into a character string indicative of the phone number alone.

In the image printing apparatus as claimed in claim 55, it is preferable that the image printing apparatus further includes phone number attribute deletion means for automatically deleting the character string representative of the attribute of the phone number for conversion into a character string indicative of the phone number alone.

According to this image printing method and apparatus, since the step or the means for automatically deleting the character string representative of the attribute of the phone number for causing the character string to indicate only the phone number is provided, they can be conveniently used when characters are desired to be printed in a limited space. Especially, it is advantageous in displaying characters in a small-sized apparatus, such as the tape printing apparatus which has a relatively small display screen.

In the image printing method as claimed in claim 32, it is preferable that the image printing method further includes a representative phone number selection step of selecting, when there exist a plurality of the related character strings each indicative of a phone number related to the name or the appellation, a related character string representative of a representative phone number representative of the related character strings, from the plurality of the related character strings.

In the image printing apparatus as claimed in claim 54, it is preferable that the image printing apparatus further includes representative phone number selection means for selecting, when there exist a plurality of the related character strings each indicative of a phone number related to the name or the appellation, a related character string representative of a representative phone number representative of the related character strings, from the plurality of related character strings.

In general, even when the user makes a phone call to a person having a plurality of telephones (using a plurality of phone numbers), such a person normally uses one particular phone number. According to this image printing method and apparatus, when there exist a plurality of related character strings representative of phone numbers, a related character string representative of a representative phone number representing the phone numbers is selected. This makes it possible to print only one phone number usually used for communication as a representative phone number, thereby saving a printing space in comparison with a case in which a plurality of phone numbers are printed.

In the image printing method as claimed in claim 28, it is preferable that the image printing method further includes an arbitrary character string entry step of entering an arbitrary character string having at least one character string, and that at the regular character string registration step, the arbitrary character string is registered as one type of a regular character string other than the regular character string.

In the image printing apparatus as claimed in claim 11, it is preferable that image printing apparatus further includes arbitrary character string entry means for entering an arbitrary character string having at least one character string, and that the regular character string registration means registers the arbitrary character string as one type of a regular character string other than the regular character string.

According to this image printing method and apparatus, an arbitrary character string having at least one character string is entered, and registered as one type of a regular character string. This makes it possible to print the arbitrary character string at a desired time point through simple operations, similarly to the method and apparatus as claimed in claims 6 and 13.

In the image printing apparatus as claimed in claim 13, it is preferable that the image printing apparatus further includes arbitrary printing instruction means for instructing arbitrary printing for printing the arbitrary character string entered, and arbitrary printing means for printing an arbitrary character string image corresponding to the arbitrary character string as the print image when the arbitrary printing is instructed.

According to this image printing method and apparatus, similarly to the apparatus as claimed in claim 14, by instructing arbitrary printing for printing an entered arbitrary character string, an arbitrary character string image corresponding to the arbitrary character string can be printed as a print image. More specifically, it is possible not only to print a regular character string image by regular printing through simple operations at a given time point but also to print an arbitrary character string image corresponding to an entered arbitrary character string as a print image through simple operations at a desired time point, irrespective of whether or not the entered arbitrary character string is registered as a regular character string. This makes it possible to further increase the operability and functionality of the apparatus.

In the image printing method as claimed in claim 2, it is preferred that the printing object is a tape.

In the image printing method as claimed in claim 4, it is preferred that the printing object is a tape.

According to this image printing method and apparatus, since the printing object to be printed with a print image is a tape, the invention can be applied to a tape printing apparatus.

BRIEF DESCRIPTION OF DRAWINGS

FIG. 13 is carried out;

FIGS. 21A to 21C are diagrams similar to FIGS. 6A to 6F, which illustrate still other examples;

FIGS. 24A and 24B are diagrams similar to FIG. 23, which illustrate other examples;

FIG. 25 a diagram showing an example of entry/registration items and entries registered by address registration, as an example of registration of a regular character string group for use in regular printing;

FIG. 30 is a diagram showing a table of key operations carried out when a screen for address reading is displayed, and results of the key operations;

FIG. 33 is a diagram showing a table of key operations carried out when a screen for address printing or phone book printing is displayed and results of the key operations;

FIGS. 34A to 34D are diagrams which are useful in explaining items entered for printing, and labels printed with print images of the entries when address printing is carried out as regular printing;

FIGS. 37A to 37D are diagrams similar to FIGS. 34A to 34D, which illustrate other examples;

FIG. 39 is a diagram showing a hierarchical structure of display for phone book printing;

FIG. 41 is a diagram showing the relationship between phone number registrations and images of phone numbers displayed on the "PHONE BOOK" screen;

FIG. 42 is a diagram showing a table of key operations carried out when the "PHONE BOOK" screen is displayed and results of the key operations;

BEST MODE OF CARRYING OUT THE INVENTION

The invention will now be described in detail with reference to the drawings showing an embodiment thereof. In the embodiment, an image printing method and apparatus according to the invention is applied to a tape printing apparatus.

Figure 1:
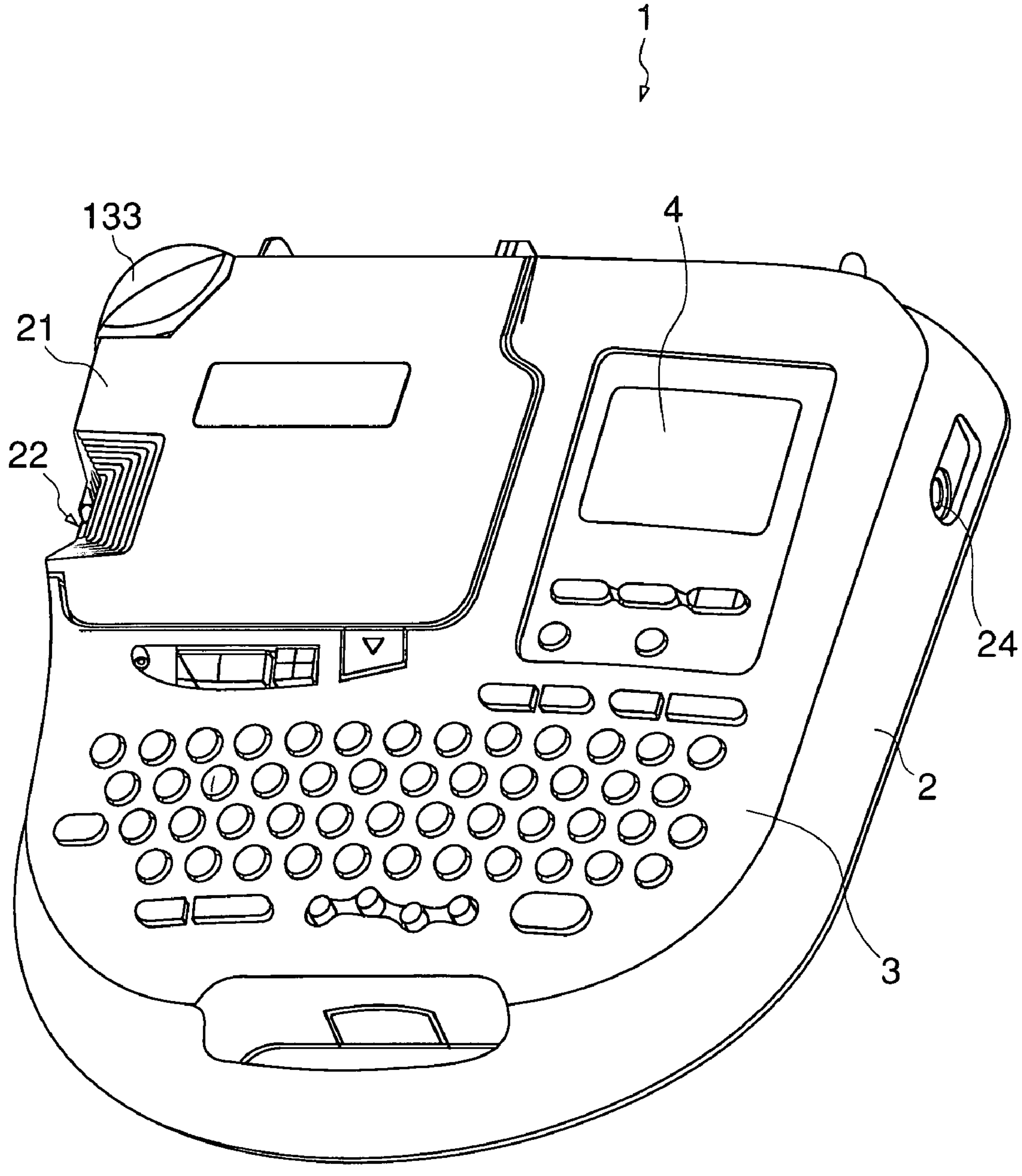
FIG. 1 is a perspective view of an appearance of a tape printing apparatus to which is applied an image printing method and apparatus according to an embodiment of the invention.
Figure 2:
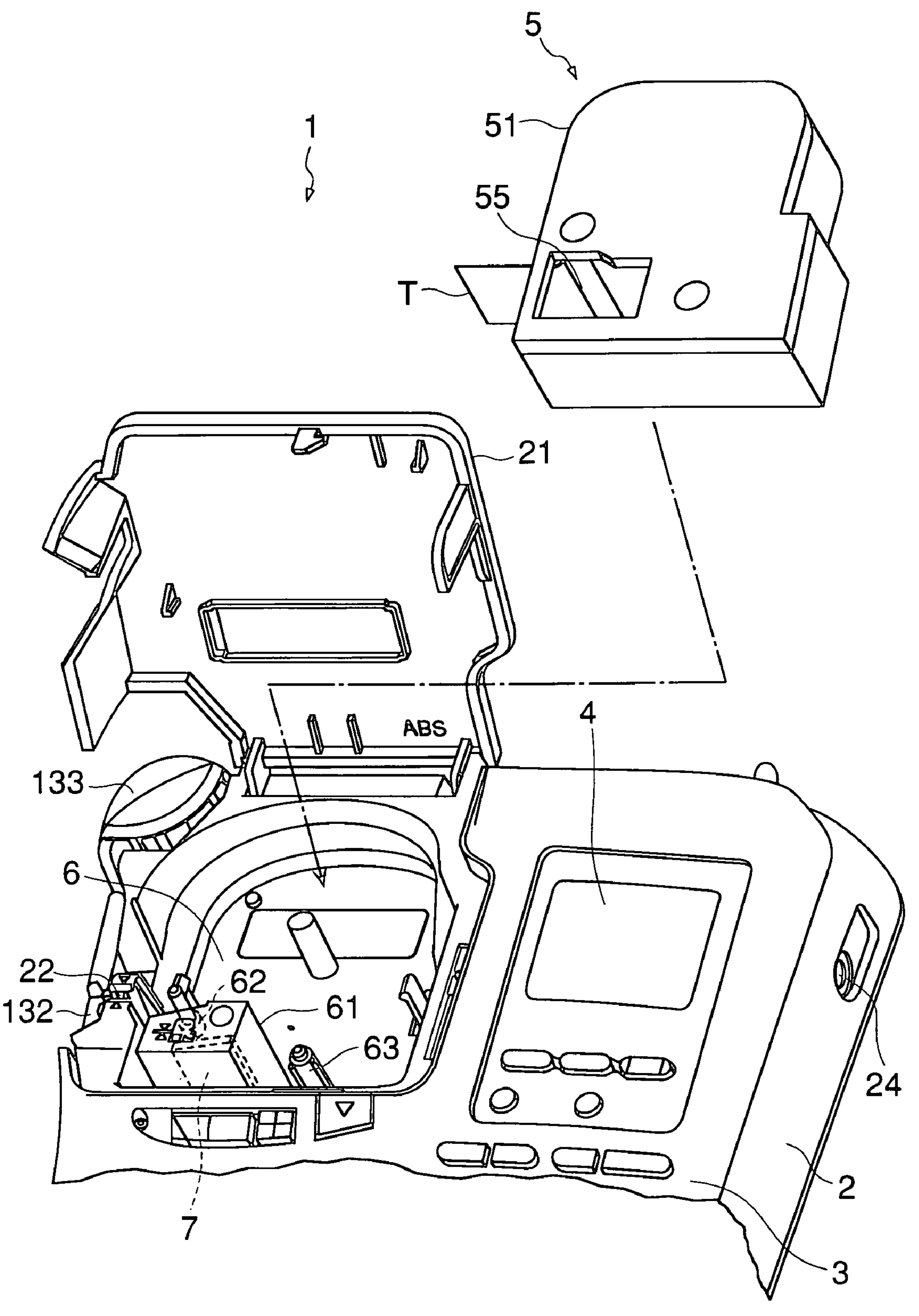
FIG. 2 is a perspective view of an appearance of the tape printing apparatus in a state in which a lid thereof is open and a tape cartridge is removed therefrom, which corresponds to the FIG. 1 tape printing apparatus.
Figure 3:
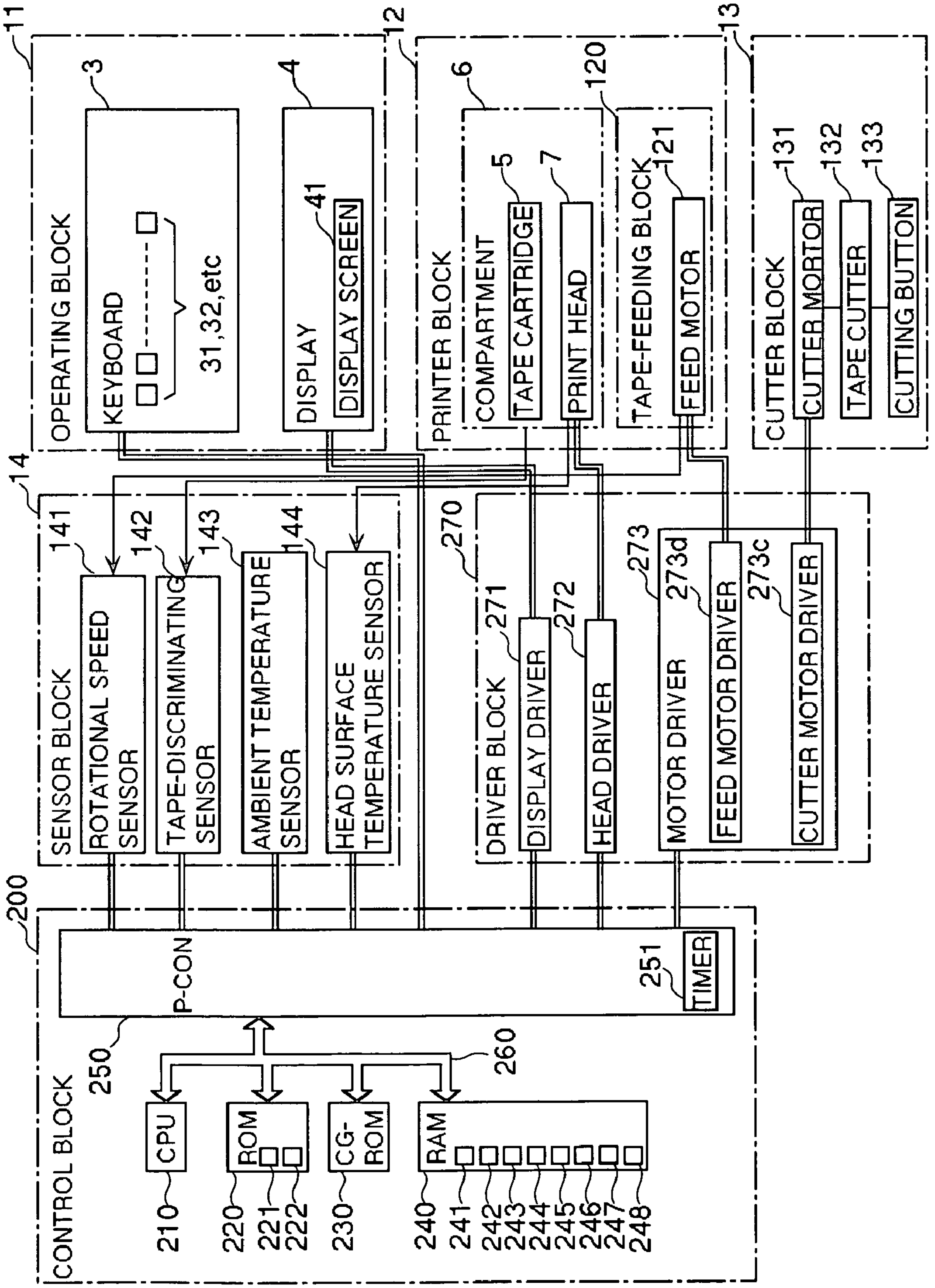
FIG. 3 is a block diagram of a control system of the FIG. 1 tape printing apparatus.

FIG. 1 shows an appearance of the whole of the tape printing apparatus according to the present embodiment, and FIG. 2 shows an appearance of the tape printing apparatus with a lid thereof being open and a tape cartridge being removed therefrom. FIG. 3 is a block diagram of a control system of the tape printing apparatus. As shown in FIGS. 1 and 2, the tape printing apparatus 1 includes a casing 2 having upper and lower divisional portions. The casing 2 includes a keyboard 3, which is comprised of various kinds of entry keys, arranged on the top of the front portion thereof, as well as a lid 21 and a display 4 arranged on the left-hand side and the right-hand side of the top of the rear portion thereof, respectively.

Further, as shown in FIG. 3, the tape printing apparatus 1 is basically comprised of an operating block 11 having the keyboard 3 and the display 4 and interfacing with the user, a printer block 12 which has a print head 7 and a tape-feeding block 120 and prints on a tape T unwound from a tape cartridge 5 loaded in a compartment 6, a cutter block 13 for cutting off the printed portion of the tape T, a sensor block 14 having various sensors for carrying out various detecting operations, a driving block 270 having various drivers for driving circuits of blocks and devices, and a control block 200 for controlling operations of components of the tape printing apparatus 1 including the above-mentioned sensors and drivers. To implement the above construction, the casing 2 accommodates a circuit board, not shown, in addition to the printer block 12, the cutter block 13, the sensor block 14 and so forth. On the circuit board are mounted a power supply unit, not shown, and the circuits of the driving block 270 and the control block 200. The power supply unit is connected to a connector socket 24 connectable with an AC adapter and a battery, not shown, such as a nicad battery, removably mounted from the outside of the casing 2.

In the tape printing apparatus 1, after loading the tape cartridge 5 in the compartment 6, the user enters printing information, such as desired characters (letters, numerals, symbols, simple figures, etc.) via the keyboard 3, while checking on the results of the entry and editing operations of the printing information on the display 4. Thereafter, when the user instructs a printing operation via the keyboard 3, the tape-feeding block 120 unwinds a tape T from the tape cartridge 5, and at the same time the print head 7 prints on the tape T. The printed portion of the tape T is delivered from a tape exit 22 as the printing proceeds. When the desired printing operation is completed, the tape-feeding block 120 sends the tape T until a tape length (the length of a label to be formed) including the length of margins is obtained, and then stops the feeding of the tape.

As shown in FIGS. 2 and 3, the printer block 12 has the compartment 6 arranged under the lid 21 for loading the tape cartridge 5 therein. The tape cartridge 5 is mounted in or removed from the compartment 6 when the lid 21 is open. The tape cartridge 5 has a cartridge casing 51 containing the tape T and an ink ribbon R both having a predetermined width (approximately 4.5 to 48 mm). The tape cartridge 5 is formed with a through hole 55 for receiving therein a head unit 61 arranged in the compartment 6. Further, the tape cartridge 5 has a plurality of small holes formed in the bottom thereof for discrimination of a type of the tape T contained therein from the other types of the tape T having different widths, which are contained in other tape cartridges 5. The compartment 6 has a tape-discriminating sensor 142, such as micro-switches or the like, for detecting the above holes to thereby determine the type of the tape T set for use.

The tape T has an adhesive surface on the reverse side which is covered with a peel-off paper. The tape T and the ink ribbon R are fed or run such that they pass by the through hole 55, in a state lying one upon the other, and the tape T alone is delivered out of the tape cartridge 5, but the ink ribbon R is taken up into a roll within the tape cartridge 5. The head unit 61 contains the print head 7 formed of a thermal head. The print head 7 abuts the reverse side of the ink ribbon R exposed to the through hole 55 of the tape cartridge 5 when the tape cartridge 5 is loaded in the compartment 6 with the print head 7 fitted in the through hole 55. Then, by driving the print head 7 while heating the same, desired letters and the like are printed on the surface of the tape T.

The compartment 6 is provided with an ambient temperature sensor 143, such as a thermistor, which sends information of an ambient temperature detected thereby to the control block 200. Further, the apparatus casing 2 has a left side portion thereof formed with the tape exit 22 for causing the compartment 6 and the outside of the apparatus to communicate with each other. On the tape exit 22 faces a tape cutter 132 for cutting off a dispensed portion of the tape T. Further, the compartment 6 is provided with drive shafts 62, 63 for engagement with driven portions of the tape cartridge 5 loaded in the compartment 6. These drive shafts 62, 63 cause the tape T and the ink ribbon R to be fed or advanced in the tape cartridge 5 by using a feed motor 121 as a drive source therefor, and at the same time the print head 7 is driven in synchronism with the feeding of the tape and ribbon to thereby carry out printing. Further, after completion of the printing operation, the tape T continues to be fed until a predetermined cutting position on the tape T reaches the position of the tape cutter 132.

It should be noted that a head surface temperature sensor 144 formed e.g. by a thermistor is arranged on a surface of the print head 7 in a manner intimately contacting the surface, which sends information of the surface temperature of the print head 7 detected thereby to the control block 200. The feed motor 121 has an end thereof rigidly fixed to a disc, not shown, formed with detection openings, and a rotational speed sensor 141 including a photo sensor or the like is provided to face the path of the detection openings, for sending information of the rotational speed of the feed motor 121 detected thereby to the control block 200.

The cutter block 13 includes the tape cutter 132, a cutting button 133 for being manually operated to cause the tape cutter 132 to carry out a manual cutting operation e.g. in the case of a desired length printing, and a cutter motor 131 for driving the tape cutter 132 for an automatic cutting operation e.g. in the case of a fixed length printing. To selectively carry out one of these two types of cutting operations, the tape printing apparatus 1 is constructed to permit the use to switch between an automatic cutting mode and a manual cutting mode. More specifically, in the manual cutting mode, when the printing operation is completed, the user pushes the cutting button 133 arranged on the apparatus casing 2, whereby the tape cutter 132 is actuated to cut the tape T to a desired length. In the automatic cutting mode, after completion of the printing operation, the tape T is automatically sent for incremental feed by the length of a rear margin, and then stopped, whereupon the cutter motor 131 is driven to cut off the tape T.

The sensor block 14 includes the rotational speed sensor 141, the tape-discriminating sensor 142, the ambient temperature sensor 143 and the head surface temperature sensor 144. It should be noted that the above sensors can be omitted therefrom, so as to suit the actual requirements.

The driving block 270 includes a display driver 271, ahead driver 272, and a motor driver 273. The display driver 271 drives the display 4 of the operating block 11 in response to control signals delivered from the control block 200, i.e. in accordance with commands carried by the signals. Similarly, the head driver 272 drives the print head 7 of the printer block 12 in accordance with commands from the control block 200. Further, the motor driver 273 has a feed motor driver 273*d* for driving the feed motor 121 of the printer block 12 and a cutter motor driver 273*c* for driving the cutter motor 131 of the cutter block 13, and similarly, drives each motor in accordance with commands from the control block 200.

The operating block 11 includes the keyboard 3 and the display 4. The display 4 has a display screen 41 which is capable of displaying display image data of 96×64 dots on a rectangular display area of approximately 6 cm in the horizontal direction (X direction)×4 cm in the vertical direction (Y direction). The display 4 is used when the user enters data via the keyboard 3 to form or edit print image data, such as character string image data, view the resulting data, and enter various commands including selection commands via the keyboard 3.

On the keyboard 3, there are arranged a character key group 31 including an alphabet key group 311, not shown in FIG. 3, a symbol key group 312, not shown in FIG. 3, a number key group 313, not shown in FIG. 3, a kana key group 314, not shown in FIG. 3, for entering Japanese hiragana letters and Japanese katakana letters, and a nonstandard character key group 315, not shown in FIG. 3, for calling nonstandard characters for selection, as well as a function key group 32 for designating various operation modes.

The function key group 32 includes a power key 321, not shown in FIG. 3, a print key 322, not shown in FIG. 3, for instructing a printing operation, a selection key 323, not shown in FIG. 3, for finally determining entry of character data and feeding lines during text entry as well as determining selection of one of modes on a selection screen, a color specification key 324, not shown in FIG. 3, for specifying printing colors including neutral colors (mixed colors) of print image data, a color-setting key 325, not shown in FIG. 3, for setting colors of characters and background colors, and four cursor keys 330 (up arrow key 330U, down arrow key 330D, left arrow key 330L, and right arrow key 330R: hereinafter generically referred to as the “cursor key 330”), not shown in FIG. 3, for moving the cursor or the display range of print image data on the display screen 41 in respective upward, downward, leftward, and rightward directions.

The function key group 32 also includes a cancel key 326, not shown in FIG. 3, for canceling instructions, a shift key 327, not shown in FIG. 3, for use in changing roles of respective keys as well as modifying registered image data, an image key 328, not shown in FIG. 3, for alternately switching between a text entry screen or a selection screen and a display screen (image screen) for displaying print image data, a proportion-changing (zoom) 329 key, not shown in FIG. 3, for changing a proportion between the size of print image data and the size of display image data displayed on the image screen, a form key 331, not shown in FIG. 3, for setting formats of labels to be formed, a regular print key 332, not shown in FIG. 3, for instructing a regular printing operation, and a file key 333, not shown in FIG. 3, for handling files.

Similarly to keyboards of the general type, the above key entries may be made by separate keys exclusively provided for respective key entries and/or by a smaller number of keys operated in combination with the shift key 327 or the like. Here, for purposes of ease of understanding, the following description will be made assuming that there are provided as many keys as described above.

As shown in FIG. 3, from the keyboard 3, various commands and data described above are input to the control block 200.

The control block 200 includes a CPU 210, a ROM 220, a character generator ROM (CG-ROM) 230, a RAM 240, and a peripheral control circuit (P-CON) 250, all of which are connected to each other by an internal bus 260. The ROM 220 has a control program area 221 for storing control programs executed by the CPU 210 as well as a control data area 222 for storing control data including a color conversion table, a character modification table, and the like. The CG-ROM 230 stores font data, i.e. data defining characters, symbols, figures and the like, provided for the tape printing apparatus 1. When code data corresponding to a specific character or the like is input thereto, it outputs the corresponding font data.

The RAM 240 is supplied with power by a backup circuit, not shown, such that stored data items can be preserved even when the power is turned off by operating the power key 321. The RAM 240 includes areas of a register group 241, an edit text data area 242 for storing text data of letters or the like entered by the user via the keyboard 3, a display image data area 243 for storing image data displayed on the display screen 41, a print image data area 244 for storing print image data, a registered image data area 245 for storing registered image data, as well as a regular text data area 246 and buffer areas 247 including a print buffer, a color conversion buffer and the like. The RAM 240 is used as a work area for carrying out control operations.

The P-CON 250 incorporates a logic circuit for complementing the functions of the CPU 210 as well as handling interface signals for interfacing between the CPU 210 and peripheral circuits. The logic circuit is implemented by gate arrays, custom LSI’s and the like. A timer 251, for instance, is also incorporated in the P-CON 250 for the function of measuring elapsed time. The P-CON 250 is connected to the sensors of the sensor block 14 and the keyboard 3, for receiving the signals generated by the sensor block 14 as well as commands and data entered via the keyboard 3, and inputting these to the internal bus 260 directly or after processing them. Further, the P-CON 250 cooperates with the CPU 210 to output data and control signals input to the internal bus 260 by the CPU 210 or the like, to the driving block 270 directly or after processing them.

The CPU 210 of the control block 200 constructed as above receives the signals, the commands, and the data via the P-CON 250, according to the control program read from the ROM 220, processes font data from the CG-ROM 230 and various data stored in the RAM 240, and delivers control signals to the driving block 270 via the P-CON 250 to thereby carry out position control during printing operations, the display control of the display screen 41, and the printing control that causes the print head 7 to carry out printing on the tape T under predetermined printing conditions. In short, the CPU 210 controls the overall operation of the tape printing apparatus 1.

Figure 4:
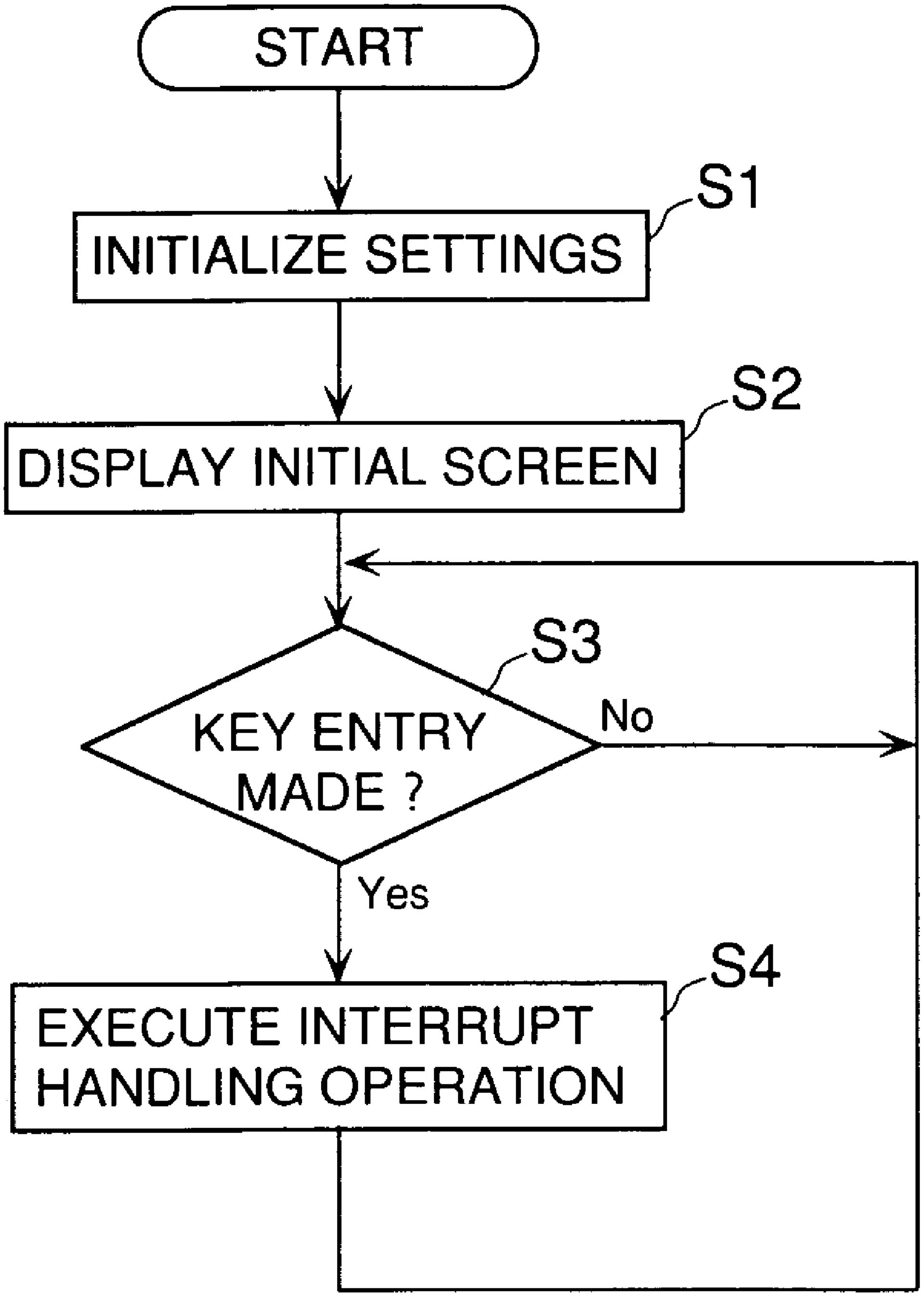
FIG. 4 is a flowchart showing a conceptual representation of an overall control process executed by the FIG. 1 tape printing apparatus.

Next, the overall control process carried out by the tape printing apparatus 1 will be described with reference to FIG. 4. As shown in the figure, when the program for carrying out the control process is started e.g. when the power of the tape printing apparatus 1 is turned on, first, initialization of the system including restoration of saved control flags is carried out to restore the tape printing apparatus 1 to the state it was in before the power was turned off the last time (S1). Then, the image that was displayed on the display screen 41 before the power was turned off the last time is shown as an initial screen (S2). The following steps in FIG. 4, that is, step S3 for determining whether or not a key entry has been made and step S4 for carrying out an interrupt handling routine are a conceptual representation of actual operations. Actually, when the initial screen has been displayed (S2), the tape printing apparatus 1 enables an interrupt by key entry (keyboard interrupt), and maintains the key entry wait state (No to S3) until a keyboard interrupt is generated. When the keyboard interrupt is generated (Yes to S3), a corresponding interrupt handling routine is executed (S4), and after the interrupt handling routine is terminated, the key entry wait state is again enabled and maintained (No to S3).

As described above, in the tape printing apparatus 1, main processing operations by the apparatus are carried out by interrupt handling routines, and hence if print image data for printing is provided or has been prepared, the user can print the image data at a desired time point, by depressing the print key 322 to thereby generate an interrupt by the print key and start a printing process. In short, operating procedures up to the printing operation can be selectively carried out by the user as he desires.

Further, in the tape printing apparatus 1, when a function key for selectively designating a control mode or the like is depressed, an interrupt by the function key is generated to start a corresponding interrupt handling routine, and a selection screen corresponding to the depression of the selected function key is displayed on the display screen 41 of the display 4. When such a selection screen for use in selecting control modes etc. is displayed on the display screen 41, any of a plurality of options of control modes displayed on the selection screen can be displayed in reverse video (highlighted) by operating the cursor key 330. Then, by depressing the selection key 323 in this state, the option displayed in reverse video (highlighted) can be selected.

Next, a regular printing process by the tape printing apparatus 1 will be described. In the tape printing apparatus 1, a character string is registered beforehand as a regular character string, whereby it is possible to print a regular character string image of the registered regular character string (hereinafter referred to as the "regular character string") at a desired time point, irrespective of whether or not another character string is being input or edited. Further, the regular character string image can be printed through a simple operation, simply by instructing a regular printing operation.

It should be noted that in this processing, the regular character string may be registered (stored) beforehand in the ROM 220 or the like, or that the apparatus may be configured such that the regular character string can be input for registration via an input device, such as the keyboard 3, similarly to normal character strings. Therefore, so as to enable the user to register additional regular character strings or change details of registrations, the tape printing apparatus 1 is constructed such that a character string entered as desired via the keyboard 3 (hereinafter referred to as an "arbitrary character string") can be registered as a regular character string.

Further, in the registration of a regular character string, a character string may be registered as a character string image (data item) formed based on text data of the character string, but to save the capacity of the memory device, it is preferred that the text data (text data item) of the character string is registered, and before printing the registered text data is formed into a print image which is then printed. Hence, the tape printing apparatus 1 is configured such that text data of an arbitrary character string can be registered as text data (regular text data) of a regular character string in the regular text data area 246. To this end, before regular printing is carried out, regular text data is formed into a print image based on outline font data stored in the CG-ROM 230, such that it is arranged in the print image data area 244, for printing. Of course, the print image may be formed based on bit map font data or other font data, and when the text data includes characters registered as nonstandard characters, images of the nonstandard characters may be formed based on registered bit map data therefor.

It should be noted that regular printing can be instructed simply by key entry made via the keyboard 3, for instance. In this case, there is no need to check on regular text data by displaying an image thereof on the display 4 before printing (although similarly to the conventional apparatus, it is possible to read out and check on regular text data via the display screen 41 before printing, it is assumed here that there is no need to do the checking). Therefore, in the tape printing apparatus 1, the regular print key 332 is provided to allow the user to instruct a regular printing operation by depressing the key. In the following, description is made assuming that text data of regular character strings are already registered in the regular text data area 246.

Figure 5:
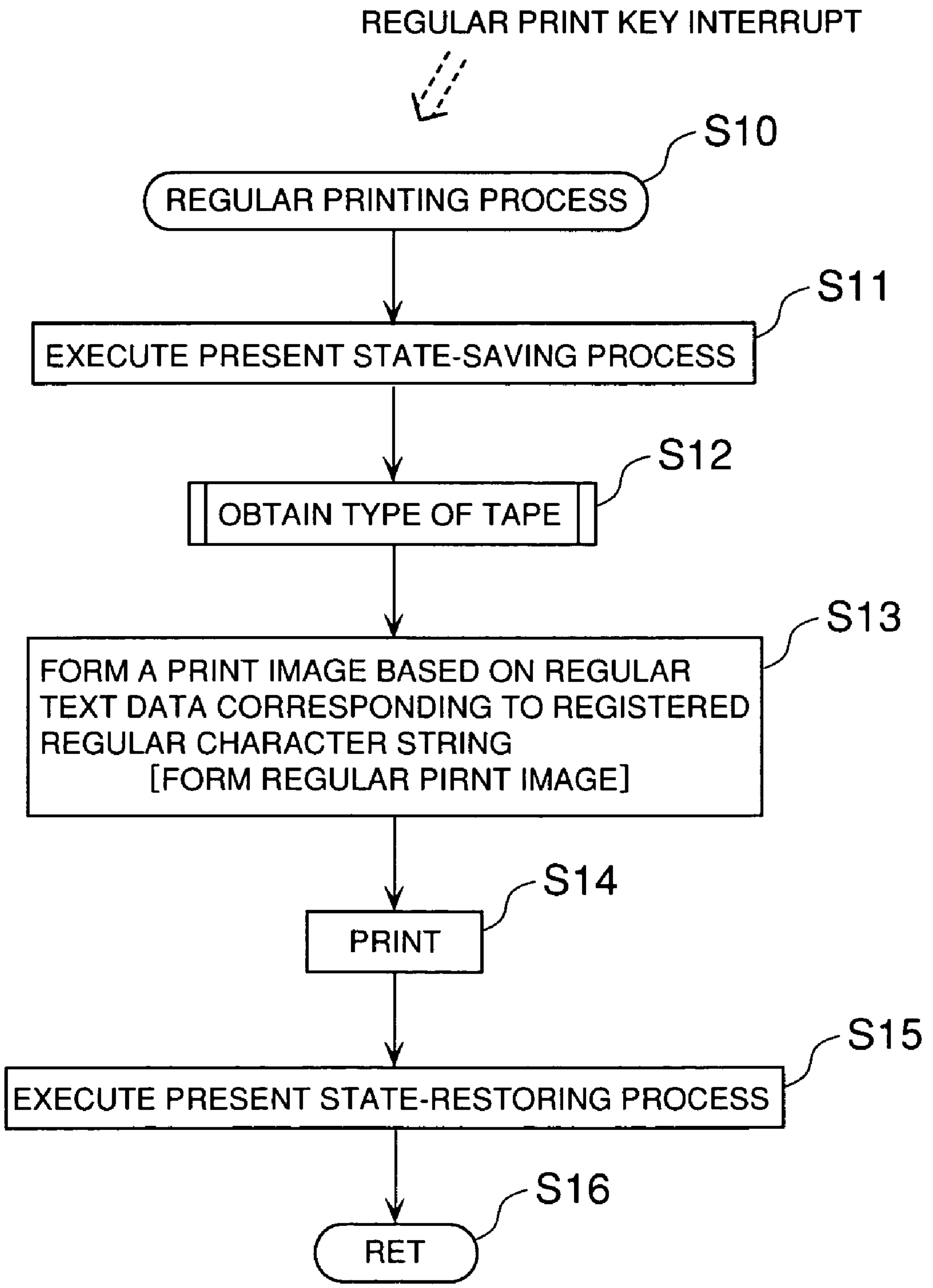
FIG. 5 is a flowchart showing a regular printing process according to a first embodiment.

When the user depresses the regular print key 332 at a desired time point in a state in which text data of regular character strings are already registered in the regular text data area 246, as shown in FIG. 5, a regular print key interrupt is generated, and the regular printing process is started (S10). In this regular printing process (S10), first, restoring information, such as flags and the like, required for a present state-restoring process (S15) described hereinafter is saved (S11). Further, since there is no need to display a screen for carrying out the regular printing process in this example, it is not required to save display information, but it is necessary to save flags indicating modes particularly set after the system (see S1 in FIG. 4) is initialized when the power of the apparatus 1 is turned on, e.g. a fixed length flag in the case of the fixed length printing being set. Needless to say, there is no need to save the same information as set in the initialization, or information having no relation to the following regular printing process (S10). When there is no information related to the regular printing process (S10) (for instance, when printing information e.g. of settings of the fixed length printing is not provided since the apparatus in use is a low-end model), the above present state-saving process (S11) and the present state-restoring process (S15), referred to hereinafter, may be omitted.

Referring to FIG. 5, after the present state-saving process (S11) is terminated, the type of the tape T is obtained or determined based on the detection signal from the tape-discriminating sensor 142 (S12). Since printing information of a size required for a print image-forming area (for instance, a dot size of a print image-forming area, to be secured in the print image data area 244), or a size of a character image (for instance, an enlargement/reduction ratio at which a character image of a regular size is enlarged or reduced) depends on a tape width or the like, various kinds of printing information are set by determining the type of the tape T (S12). Of course, when only one type of tape T can be dealt with (when the apparatus in use is of such a subordinate class), the above process (S12) as well can be omitted.

After obtaining the type of the tape T (S12), a print image for use in regular printing (hereinafter referred to as a "regular print image") is formed (S13). As described above, here, the regular text data registered in the regular text data area 246 is converted to image data based on outline font data such that the image data is arranged in the print image data area 244, whereby a regular print image of the regular text data is formed (S13). After the regular print image-forming process (S13) is terminated, the regular print image formed is transferred to a print buffer for printing (S14), and thereafter, a state in which the tape printing apparatus 1 was at a time point of saving the restoring information is restored (S15) based on the restoring information saved by the above present state-saving process (S11), followed by terminating the regular printing process (S10) at step S16.

FIG. 6 shows examples of images printed by regular printing, that is, examples of regular print images. FIG. 6A shows an example of a regular print image formed from regular text data to full name of a person being registered as a regular character string. For instance, although stationery (notebooks, files, templates, punches, and document files in which company rules or the like are filed) distributed to individual employees in a company are equipment of the company, each employee is usually in charge of them as his own items, so that personal names or the like are usually attached thereto. However, it is sometimes difficult to write names with pen or the like on items of this kind. In such a case, it is convenient to affix thereto labels (name labels) formed by printing personal names by using a tape printing apparatus. When items of this kind are distributed, they tend to be of the same type and given to a plurality of persons, and hence if name labels are not immediately attached thereto when they are supplied and left on desks, they are often used by other persons and are liable to be left at other places than the desks of the persons in charge of them to be lost after all.

In the conventional tape printing apparatus (printing apparatus), assuming that a user whose name is "Yamada Taro", for instance, is given office equipment when he is editing a document (character strings) other than the character string of his name by using the tape printing apparatus, the editing operation prevents him from forming a name label immediately after the equipment is supplied. In order to form the name label, he is required to save (record) the character string being edited once and then read out the regular character string of his name for printing. Moreover, after printing the regular character string, he has to read out (restore) again the character string being edited and continue the editing operation. For instance, when it is required to rapidly form a label printed with the character string being edited due to the business necessity, the priority is inevitably given to the present editing operation, so that supplied items are often lost, since name labels are not affixed to them immediately after they are distributed or supplied. Further, so long as lost items are items supplied as office equipment as described above, they will not cause a serious problem, but if a company's employee, who attends a meeting with document files to be kept secret from anyone outside the company (department, section) without affixing his names to the document files, has his documents gone astray in other employees', to lose them, liability issues can be raised.

Figure 6A:
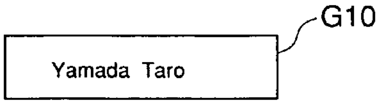
FIGS. 6A to 6F are diagrams showing examples of regular print images and labels printed with the print images.
Figure 6B:
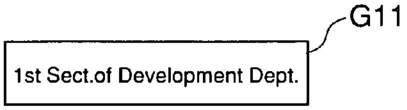

In the above case, even when the user is editing another character string, if he can obtain a name label printed with a regular print image G10, as shown in FIG. 6A, by only depressing the regular print key 332, and at the same time without adversely effecting the editing operation, a time period required for carrying out the interrupting operation (name label-forming operation) can be extremely short. Therefore, even when the user is editing another character string for forming a label with a higher priority, it is possible to immediately form and affix a name label and resume the editing operation. The same applies to a FIG. 6B regular print image G11. For instance, when the above-mentioned Mr. "Yamada Taro", who is assumed to be the head of the "1st Section of Development Department", has a document file distributed to his section by the manager of the development department, if he can form a label (section name label) printed with the regular print image G11 of "1st Sect. of Development Dept.", immediately after the distribution and affix the label to the document file, it is possible to prevent occurrence of the same problem as might be caused without a name label as described above.

Figure 6C:
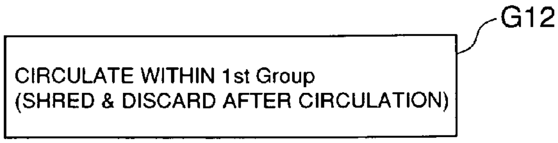
Figure 6D:
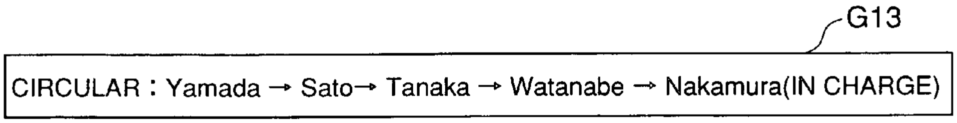
Figure 6E:
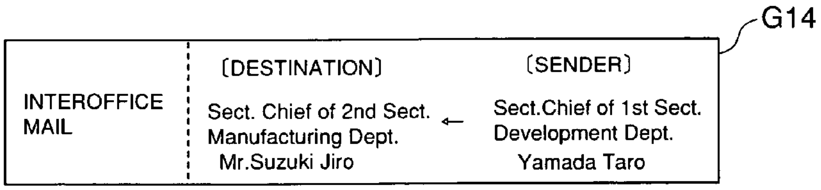

FIGS. 6C to 6F also show examples of regular print images. For instance, when a source material is desired to be circulated to the first group of the above "1st Sect. of Development Dept.", if a label (circulation-instructing label) printed with a FIG. 6C regular print image G12 of "CIRCULATE WITHIN 1st Group (SHRED & DISCARD AFTER CIRCULATION) is affixed to the source material and handed to the clerk of the first group (here the clerk is assumed to be Mr. Nakamura), the source material can be sent around as required with a circulation memorandum or the like bearing the personal names of members of the first group. Further, in place of paper having the circulation memorandum, a label (circular-destination name label) printed with a regular print image G13 representative of personal names as circular-destination names, as shown in FIG. 6D, can be formed and affixed to the source material for circulation. Further, in addition to the above labels, a label (destination label) printed with a FIG. 6E regular print image G14 for use in displaying a destination and the like for inter-office mail can be formed and affixed to an envelope for the inter-office mail. Furthermore, it is possible to form a label (approval label) printed with a FIG. 6F regular print image G15 indicative of "APPROVAL" to affix the same to a document, such as a proposal written by a subordinate, or a document file filing the document.

Although the printing operation described above with reference to FIG. 6 is regularly necessitated, it is not carried out as a reasonable amount of business task, but carried out as one required to be performed in a manner intervening (or interrupting) other operations. For instance, when Mr. Nakamura, clerk in the above office, is asked by Mr. Yamada, chief of the first section, to form labels for sorting out documents in the first section, and is in the course of forming these labels, he is required to print regular print images as described above, in spite of his current operation. Although in the present embodiment, the tape printing apparatus 1 is taken as an example, this is not limitative, but similarly, when the user desires to print a stylized greeting message or a repetitive covering letter of delivery of documents in the course of forming another document by using a more general type documentation system (so-called word processor or the like), it is convenient if he can print the repetitive (regular) document while making another document.

On the other hand, as described above, in the tape printing apparatus 1 according to the present embodiment, it is possible to register beforehand a character string including one or more characters as a regular character string and instruct regular printing for printing the regular character string, irrespective of whether or not a character string other than the regular character string is being input or edited. Further, when regular printing is instructed, a regular character string image corresponding to the regular character string is printed as a print image. That is, by registering beforehand a character string as a regular character string, it is possible to print the regular character string image of the registered regular character string at a desired time point, irrespective of whether or not a character string other than the character string is being input or edited. Further, the regular character string image can be printed through a simple operation, simply by instructing regular printing (i.e. by depressing the regular print key 332).

As clearly shown in the examples described above with reference to FIG. 6, it is convenient if it is possible to register a plurality of types of documents as documents to be printed regularly, more specifically, a plurality of types of images as regular character string images used as the above-mentioned regular print images, even though the printing is regularly or repetitively carried out. For instance, in forming the name label shown in FIG. 6A, Mr. Nakamura, the clerk described above, should be frequently required to form a name label on which are printed the names of Messrs. Satoh, Tanaka, Watanabe (see FIG. 6D) and the like as members of the first group in addition to Mr. Yamada, chief of the first section, described above. Further, in the case of the FIG. 6E label for use in the inter-office mail, a plurality of types of regular print images with different destinations will be desired to be formed. Further, as shown in FIG. 7, there is sometimes a case in which one or a plurality of types of regular character strings and an arbitrary character string are desired to be mixed e.g. such that one of regular character strings representative of respective destinations is arranged in a first block BLK1, an arbitrary character string arbitrarily formed for sending a message (comment) in a second block BLK2, and the name of a division which the sender belongs to and the sender's name in a third block BLK3. Therefore, in the following, the regular printing process which can be applied to these cases will be described as a second embodiment.

In the tape printing apparatus 1 according to the second embodiment, it is possible to register a plurality of types of character strings as regular character strings, and any of the plurality of types of regular character strings is selected as one for regular printing. In other words, a plurality of types of character strings can be registered beforehand as regular character strings, and further, any of the regular character strings can be printed through simple operations, simply by selecting the regular character string at a desired time point and instructing the regular printing. It should be noted that in this case, the regular character string may be selected before the regular printing is instructed or it may be selected as an object to be printed by the regular printing after it is instructed.

Figure 8:
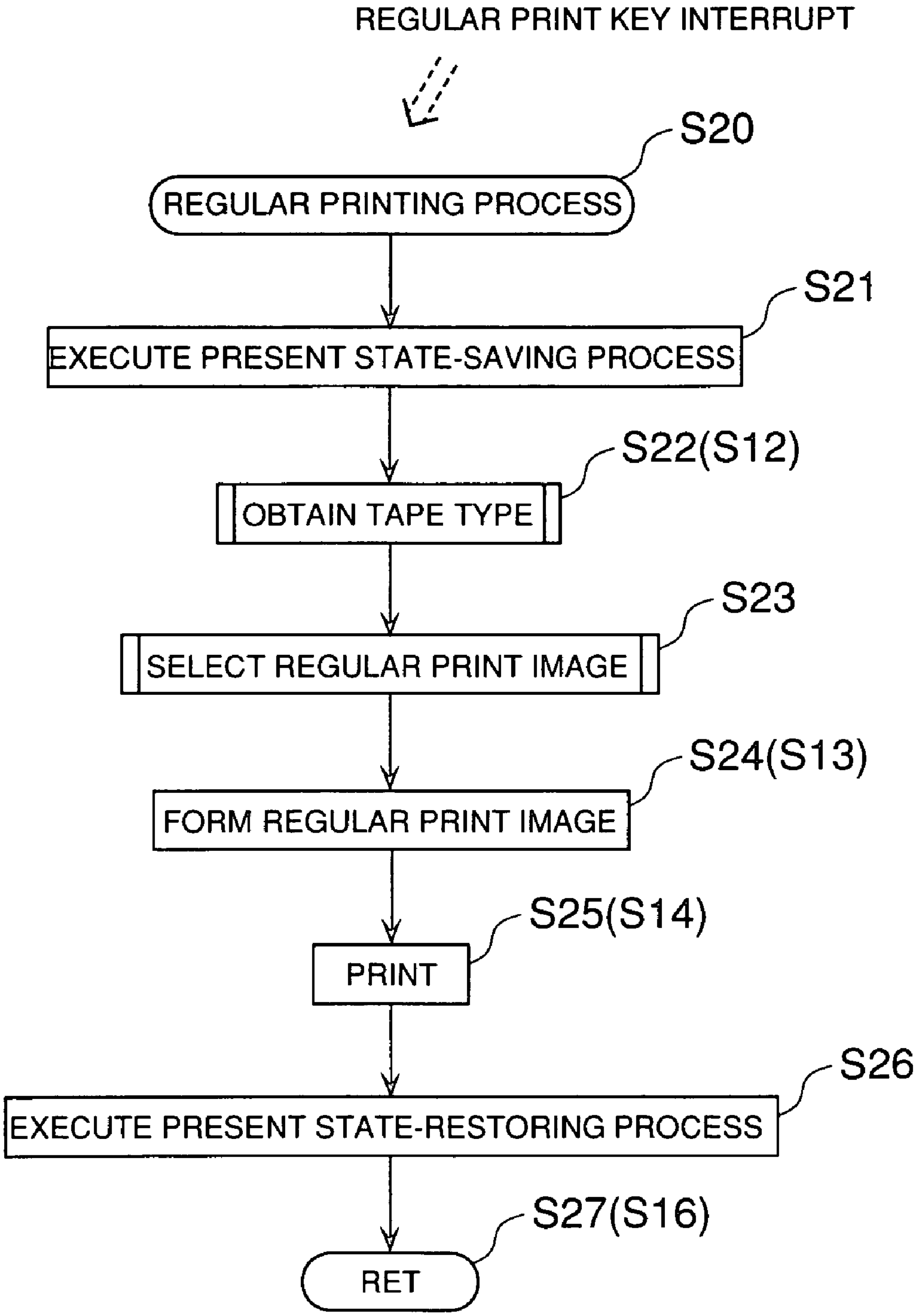
FIG. 8 is a flowchart showing a regular printing process according to a second embodiment.

More specifically, as shown in FIG. 8, when the user depresses the regular print key 332 at a desired time point, a regular print key interrupt is generated, and the regular printing process is started (S20). In this regular printing process (S20), first, restoring information, such as flags and the like, required for a present state-restoring process (S26) described hereinafter is saved (S21). In this example, it is required to display a screen for regular printing, and hence display-restoring information for restoring the state of screen display needs to be stored. However, text data (hereinafter referred to as "edit text data") as a source of a display image of a character string being edited is stored in the edit text data area 242, so that it is only required to set (store) a flag for causing the display image to be formed again from the edit text data, to effect storage of the display-restoring information. This makes it possible to save the capacity of the memory device. As to other information, such as print information, if the fixed length printing is set, for instance, it is only required that the fixed length flag indicative of the fact is saved. Of course, as described hereinabove, there is no need to save the above restoring information when there is not any information related to the above procedures (e.g. when the apparatus in use is a low-end model).

Referring to FIG. 8, after the present state-saving process (S21) is terminated, the type of the tape T is obtained or determined (based on the detection signal from the tape-discriminating sensor 142 (S22: the same as S12 in FIG. 5). Of course, as described above, this operation (S22) as well can be omitted when only one type of tape T can be dealt with (when the apparatus in use is a low-end model). After obtaining the type of the tape T (S22), any of the plurality of types of regular character strings is selected as a regular character string for regular printing (S23). An example of this regular print image-selecting process (S23) will be described hereinafter.

After a regular print image has been selected (S23), the regular print image is formed (S24: the same as S13 in FIG. 5). The regular print image formed is transferred to the print buffer for printing (S25: the same as S14 in FIG. 5), and thereafter, a state in which the tape printing apparatus 1 was at a time point of saving the restoring information is restored (S26) based on the restoring information saved by the above present state-saving process (S21), followed by terminating the regular printing process (S20) at step S27 (the same as S16). In the preset state-restoring process (S26) in this case, however, the flag for causing the display image to be formed again from the edit text data is set (stored) as the display-restoring information by the present state-saving process (S21), so that the display image is formed again from the edit text data based on the flag information, whereby the state of the display screen 41 before the regular printing process (S20) is caused to be restored.

Figure 9:
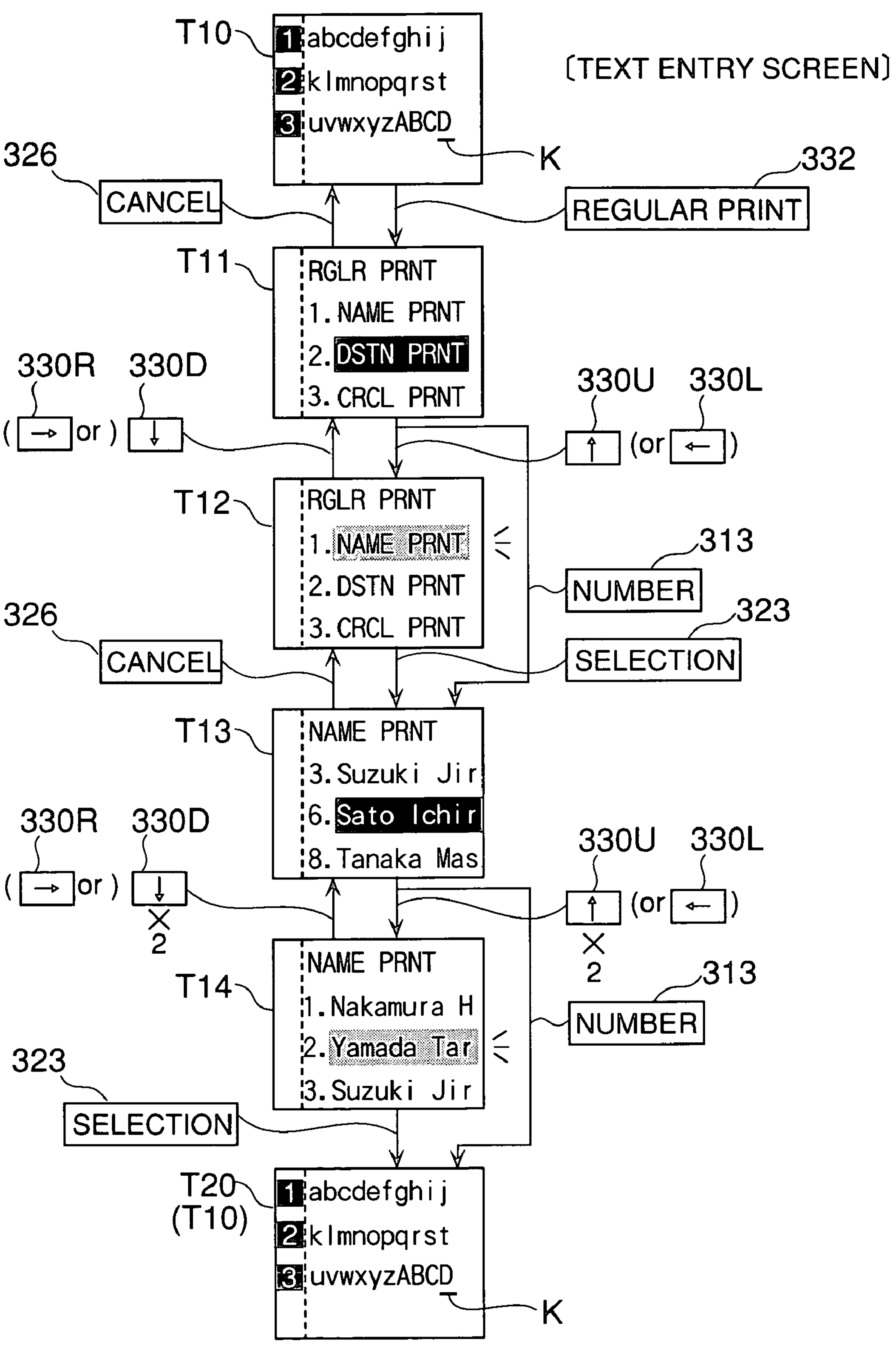
FIG. 9 is a diagram illustrating an example of images of a display screen and operations carried out on the screen when the FIG. 8 regular printing process is carried out.

In the following, the regular print image-selecting process (S23) will be described. First, as shown in FIG. 9, let it be assumed that in a text entry screen (screen T10: hereinafter, displayed contents of the display screen 41 are referred to as the "screen T??" (?represents a digit) and the reference numerals for the screens are shown only by T??, and, a cursor position is indicated by a symbol K), a character string "abcdefghij" is input to a first line, a character string "klmnopqrst" to a second line, and a character string "uvwxyzABCD" to a third line.

In the state of the text entry screen being displayed (T10), when the regular print key 332 is depressed by the user, as described above with reference to FIG. 8, the regular printing process (S20) is started. Next, the present state-saving process (S21), the tape type-obtaining process (S22), and then the regular print image-selecting process (S23) are started, and a selection screen positioned at a first hierarchical level is first displayed (T11) as a selection screen for selecting a regular print image for regular printing, that is, as a selection screen for selecting a regular character string as a source of the regular print image. It should be noted that in the tape printing apparatus 1, the user can cancel instructions provided via the keyboard 3 by operating the cancel key 326. That is, the selection screen can be returned to the original text entry screen (T10) by depressing the cancel key 326 in a state of the screen (T11) being displayed (the cancel key 326 similarly acts unless otherwise specified, and hence description of this operation at each state of the screen will be omitted hereinafter).

On the selection screen (T11), menu options, such as "1. NAME PRNT", "2. DSTNPRNT" (abbreviation of "destination printing" to fit in the display screen; hereinafter abbreviations are explained in the respective following parentheses), "3. CRCLPRNT" (circular printing), "4. CMMNT PRNT" (comment printing), "5. SNDR PRNT" (sender printing), "6. A.R. PRNT" (arbitrary registration printing), and the like are displayed as menu options of "RGLR PRNT". The user can display any one of the menu options in reverse video or in a flashing state (in the illustrated examples, expressed by shading of character images with dots) by operating the cursor key 330, and select and designate the menu option displayed in reverse video or in the flashing state by depressing the selection key 323. As shown in FIG. 9, immediately after the regular print key 332 is depressed, an option selected the last time (or an option selected by default according to the result of initialization of the system, if there is no option selected the last time), such as the option "2. DSTN PRNT" in the illustrated example, is displayed in reverse video (T11). When the selection key 323 is depressed by the user in this state (T11), the option "2. DSTN PRNT" is selected to switch to a selection screen positioned at a second hierarchical level under the option of "2. DSTN PRNT".

Further, when the up arrow key 330U (or the left arrow key 330L) is depressed in the above state (T11), the option "1. NAME PRNT" is displayed in the flashing state (T12). When the selection key 323 is depressed by the user in this state (T12), the option "1. NAME PRNT" is selected to switch to a selection screen positioned at a second hierarchical level under the option of "1. NAME PRNT" (T13). Similarly, in the following, it is assumed that an option selected the last time or an option selectable by default immediately after the screen is switched to a selection screen is displayed in reverse video (shown in reversed representation in the figures), while an option which becomes selectable thereafter by operating the cursor is displayed in the flashing state (dot-shaded in the figures). Further, an option displayed in reverse video or in the flashing state is one to be selected by subsequent user's operation of the selection key 323, and hence an option in one of these states is referred to as an option "highlighted for selection". More specifically, when the up arrow key 330U (or the left arrow key 330L) is depressed with the option "2. DSTN PRNT" being highlighted for selection (T11), the option "1. NAME PRNT" is highlighted for selection (T12).

Similarly, when the down arrow key 330D (or the right arrow key 330R) is operated in a state of the option "2. DSTN PRNT" being highlighted for selection (T11), the option "3. CRCL PRNT" is highlighted for selection. Similarly, following the above, whenever the down arrow key 330D (or the right arrow key 330R) is operated, all the options are sequentially highlighted for selection cyclically in the order of the options "4. CMMNT PRNT", "5. SNDR PRNT", "6. A.R. PRNT", . . . , "1. NAME PRNT", "2. DSTN PRNT" and so on. By depressing (operating) the selection key 323 in a state of any of the options being highlighted for selection, the user can determine the selection of the desired option. Further, from the state of the option "2. DSTN PRNT" being highlighted for selection (T11), whenever the up arrow key 330U (or the left arrow key 330L) is operated, all the options are sequentially highlighted for selection cyclically, that is, in the order of the options "1. NAME PRNT", . . . , "6. A.R. PRNT", "5. SNDR PRNT", "4. Comment PRNT", "3. CRCL PRNT", "2. DSTN PRNT", "1. NAME PRNT", and so on. In short, the user can highlight a desired option for selection by operating the cursor key 330 and finally select or determine the selection of the highlighted option by the selection key 323.

As shown in FIG. 9, when the up arrow key 330U (or the left arrow key 330L) is depressed in a state of the option "2. DSTN PRNT" being highlighted for selection (T11), the option "1. NAME PRNT" is highlighted for selection. When the selection key 323 is depressed in this state (T12), the option "1. NAME PRNT" is selected to switch to the selection screen positioned at the second hierarchical level under the option of "1. NAME PRNT" (T13). On this "NAME PRNT" selection screen i.e. the menu screen under the heading of "NAME PRNT", options, such as "1. Nakamura Hanako", "2. Yamada Taro", "3. Suzuki Jiro", "6. Sato Ichiro", "8. Tanaka Masao", and the like are displayed as options to be selected. These options are regular character strings registered as candidates for names to be printed. The numerals designate registration numbers, and immediately after (on the right side of) each registration number, a first predetermined number of characters of each regular character string, that is, characters of the number which can be displayed at a time on the display screen 41 are displayed. Here, numerals "4", "5", "7", and the like of the registration numbers are unassigned numbers, which represent registration numbers for unregistered regular character strings (including ones which are deleted after being registered once). On the above selection screen, similarly to the selection screen positioned at the first hierarchical level (T11 to T12, etc.), the user can highlight any of all the options for selection, and he can display a desired option for selection and select the same, by operating the cursor key 330 and the selection key 323.

Referring to FIG. 9, by operating the cursor key 330 from the state of the first option "6. Sato Ichiro" being highlighted for selection, the user can highlight the option "2. Yamada Taro" for selection (T14), and by depressing the selection key 323, he can select the regular character string "Yamada Taro" registered to the registration number "2" of the "NAME PRNT", from the registered regular character strings as sources of the regular print images. Thus, as described above with reference to FIG. 8, after the regular print image has been selected (S23), the regular print image is formed (S23: the same as S13 in FIG. 5), and transferred to the print buffer for printing (S24). Then, the state in which the tape printing apparatus 1 was at the time point of saving the restoring information is restored (S26) based on the restoring information saved by the above present state-saving process (S21), and the original text entry screen is displayed (T20 in FIG. 9: the same as T10), followed by terminating the regular printing process (S20) at step S27.

Although in the above case, the example in which an option is highlighted for selection has been described, this is not limitative, but it is also possible to directly specify a desired option by entering a numeral, such as a registration number or the like. For instance, in a state in which the selection screen positioned at the first hierarchical level is displayed (T11 to T12), by inputting desired numeral corresponding to a desired option, that is, in the case of the example illustrated in FIG. 9, a numeral "1", by operating a key of the number key group 313, the option "NAME PRNT" corresponding to the numeral "1" can be directly designated (selected) to switch to the selection screen positioned at the second hierarchical level under the option (T13). Similarly, in a state in which the selection screen of "NAME PRNT" positioned at the second hierarchical level is displayed (T13 to T14), by inputting a desired numeral corresponding to a desired option, that is, in the case of the example illustrated in FIG. 9, a numeral "2', by using a key of the number key group 313, the option "Yamada Taro" corresponding to the numeral "2" can be directly designated (selected), followed by terminating the regular print image-selecting process (S23).

As described above, in the tape printing apparatus 1 according to the present embodiment, a plurality of types of character strings can be registered beforehand as regular character strings, and further, any of the regular character strings can be printed through simple operations, simply by selecting the regular character string at a desired time point and instructing regular printing. Further, in this case, a plurality of types of identifiers corresponding to the plurality of types of regular character strings displayed on the predetermined display screen 41 to permit selection from the plurality of types of identifiers. In this case, identifiers are only required to enable discrimination of regular character strings from each other based on their images displayed on the display screen 41. For instance, as shown in the above examples, the first predetermined number of characters of each regular character string may be used as identifiers. Further, nicknames or the like, or mere registration numbers may be used. In these cases, a small-sized display screen will suffice, since it is only required to display identifiers. Further, since the identifiers can be easily displayed in a manner listed in order, they can be selected with ease through simple operations.

Further, in this tape printing apparatus 1, as described above with reference to FIG. 8, at a time point before the above plurality of types of identifiers (registration numbers, the first predetermine number of characters, or the like) are displayed, display-restoring information for restoring contents displayed on the predetermined display screen at the time point is stored (S21), and after selecting identifiers, the displayed contents of the predetermined display screen at the time point of storing the display-restoring information are caused to be restored based on the display-restoring information (S26). Therefore, even when the display screen is used to display the identifiers, it is possible to return the display screen to the state of the screen being displayed before the identifiers are displayed, whereby even if the user prints a regular character image (by regular printing) in the course of editing a character string other than the regular character string on the display screen, it is possible to easily restore the display screen to the state of the screen being displayed during the editing operation. In the above case, since text data as a source of the display image (T10 in FIG. 9) of the character string being edited, for instance, is stored in the edit text data area 242, so that it is only required to set (store) a flag for causing the display image to be formed again from the text data, as the display-restoring information, which enables the capacity of the memory device to be saved.

Further, to print the example described above with reference to FIG. 7, in the tape printing apparatus 1, first, the above-mentioned regular printing process (S20) is carried out to select and print one of the regular character strings representative of destinations for use in the "DSTN PRNT", in the first block BLK1 shown in the figure. Then, by depressing the print key 322 (to carry out the arbitrary printing), arbitrary character strings which are being edited and displayed on the text entry screen, that is, the three lines of character strings "abcde . . . zABCD" in the example illustrated in FIG. 9 (see T10 and T20 in FIG. 9) can be printed in the second block BLK2. Next, one of the regular character strings representative of senders for use in the "SNDR PRNT" can be selected and printed in the third block BLK3. In short, a plurality of (two, in this example) types of regular character strings and an arbitrary character string can be printed as a mixture. It should be noted that also in the tape printing apparatus 1 according to the first embodiment, it is possible to print one type of regular character string (the FIG. 7 first block BLK1, for instance) and an arbitrary character string, e.g. as represented by the first block BLK1 and the second block BLK2 of FIG. 7.

Further, in the tape printing apparatus 1 according to the second embodiment, the above three lines of character strings "abcde . . . zABCD" are registered once as regular character strings for use in the "CMMNT PRNT", and then regular printing for printing the regular character strings representative of the destination for use in the "DSTN PRNT", regular printing for printing the regular character strings representative of the comment for use in "CMMNT PRNT", and regular printing for printing the regular character strings representative of the sender for use in "SNDR PRNT" are carried out, whereby it is also possible to print the print image G20 in the example illustrated in FIG. 7. In the following, registration of regular character strings will be described. Registration of regular character strings for the comment printing will be described first.

Figure 10:
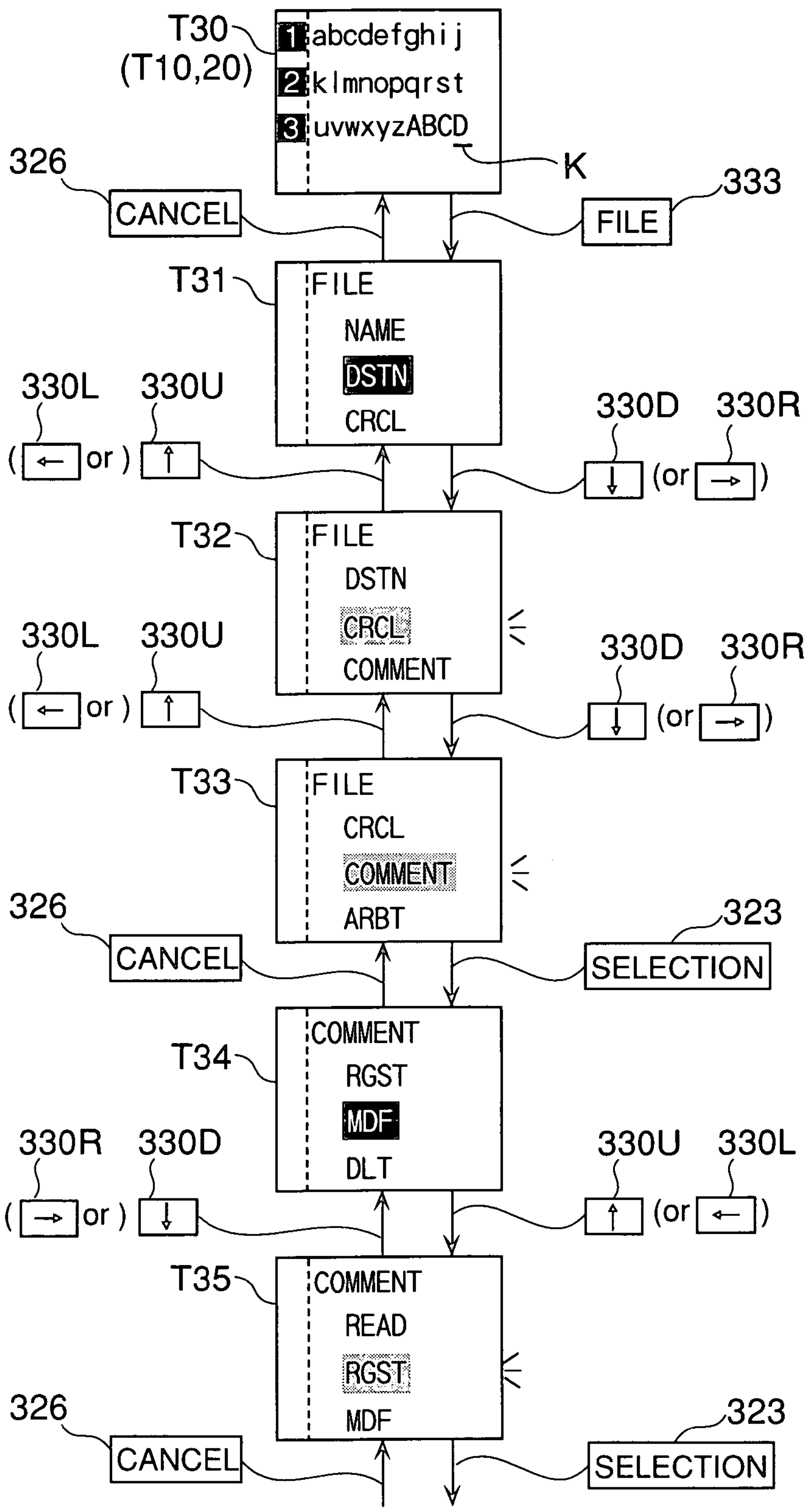
FIG. 10 is a diagram illustrating an example of images of the display screen and operations carried out on the screen when a regular character string is registered for printing of a comment.

As shown in FIG. 10, when the user is editing the above three lines of character strings "abcde . . . zABCD", if the file key 333 is depressed by the user in the state of the text entry screen being displayed (T30: the same as T10, T20 in FIG. 9), a "FILE" selection screen, i.e. a menu screen under the heading of "FILE" (for file handling operations) is displayed (T31). On this selection screen (T31), for instance, "NAME", "DSTN" (destination), "CRCL" (circular), "COMMENT", "ARBT" (arbitrary), "RGLR SLCT" (regular selection), "RGLR CNCL" (regular cancellation), and the like are displayed as options hierarchically immediately under the option "FILE" (T31 to T33: see T70 in FIG. 15 as well). On the selection screens (T31 to T33, etc.) as well, the user can highlight and select a desired option by operating the cursor key 330 and the selection key 323. For instance, when the selection key 323 is depressed in a state of the option "COMMENT" being highlighted for selection, a "COMMENT" selection screen, i.e. a menu screen under the heading of "COMMENT" is displayed (T34).

Figure 11:
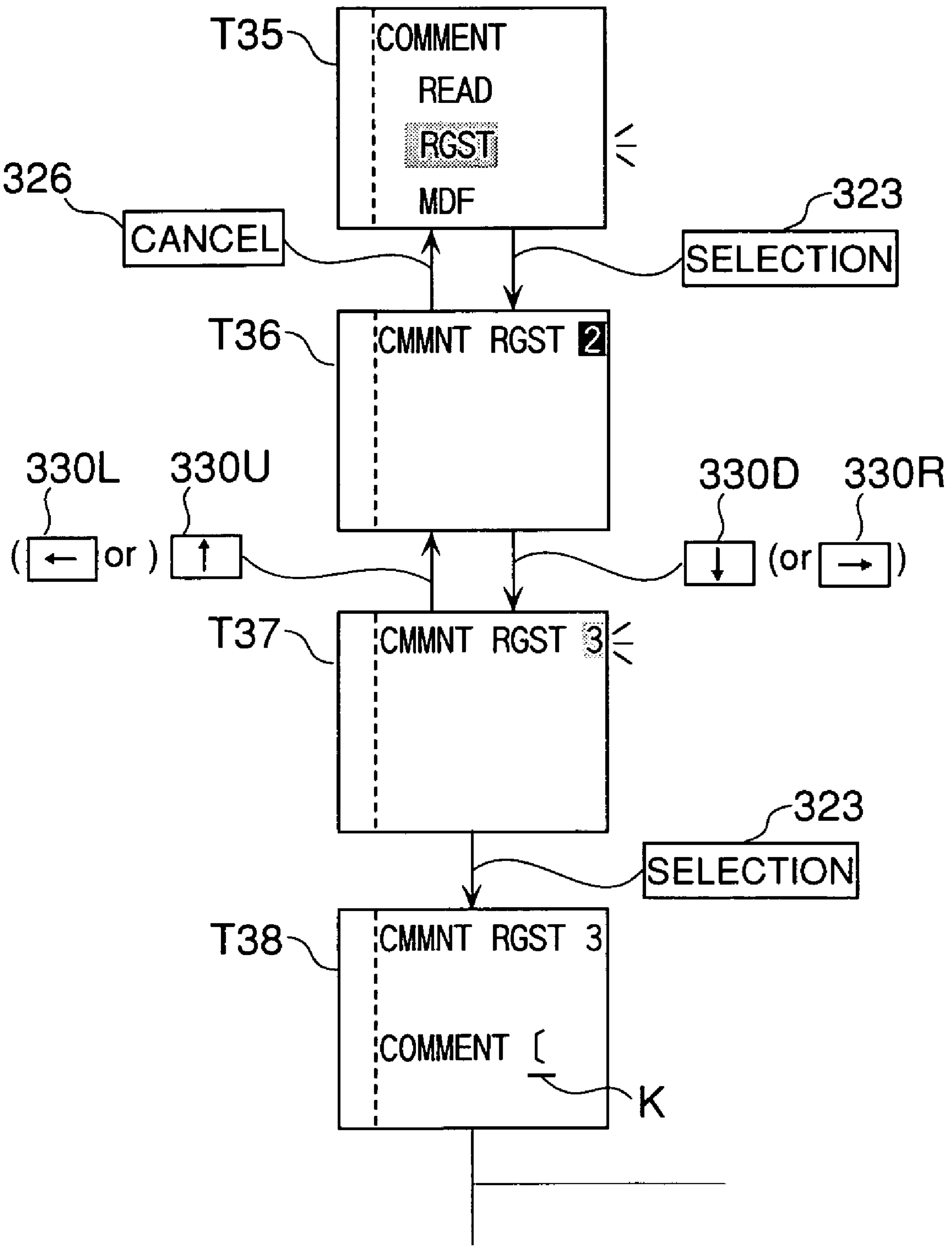
FIG. 11 is a continuation of FIG. 10.

On the "COMMENT" selection screen, for instance, "READ" (reading), "RGST" (registration), "MDF" (modification), "DLT" (delete), and the like are displayed as options hierarchically immediately under the option "COMMENT" (T34 to T35), so that the user can highlight and select a desired one of the above options by operating the cursor key 330 and the selection key 323. For instance, when the selection key 323 is depressed with the option "RGST"

being highlighted for selection (T35: commonly shown in FIGS. 10 and 11), as shown in FIG. 11, a first one of registration screens for carrying out the "CMMNT RGST" (comment registration) is displayed (T36).

The first screen of the "CMMNT RGST" registration screens is a registration number selection screen. First, the smallest one of registrable registration numbers for registration in a registration area as a default value, e.g. registration number "2" in the FIG. 11 example is displayed in reverse video immediately after (on the right side of) the heading of "CMMNT RGST" (T36). On this selection screen as well, by operating the cursor key 330 and the selection key 323, the user can highlight and select a desired registration number as an arbitrary option. For instance, when the selection key 323 is depressed with a registration number "3" being highlighted for selection (T37), a character string entry (registration) screen permitting input in a registration area corresponding to the registration number "3" is displayed (T38: commonly shown in FIGS. 11 and 12).

Figure 12:
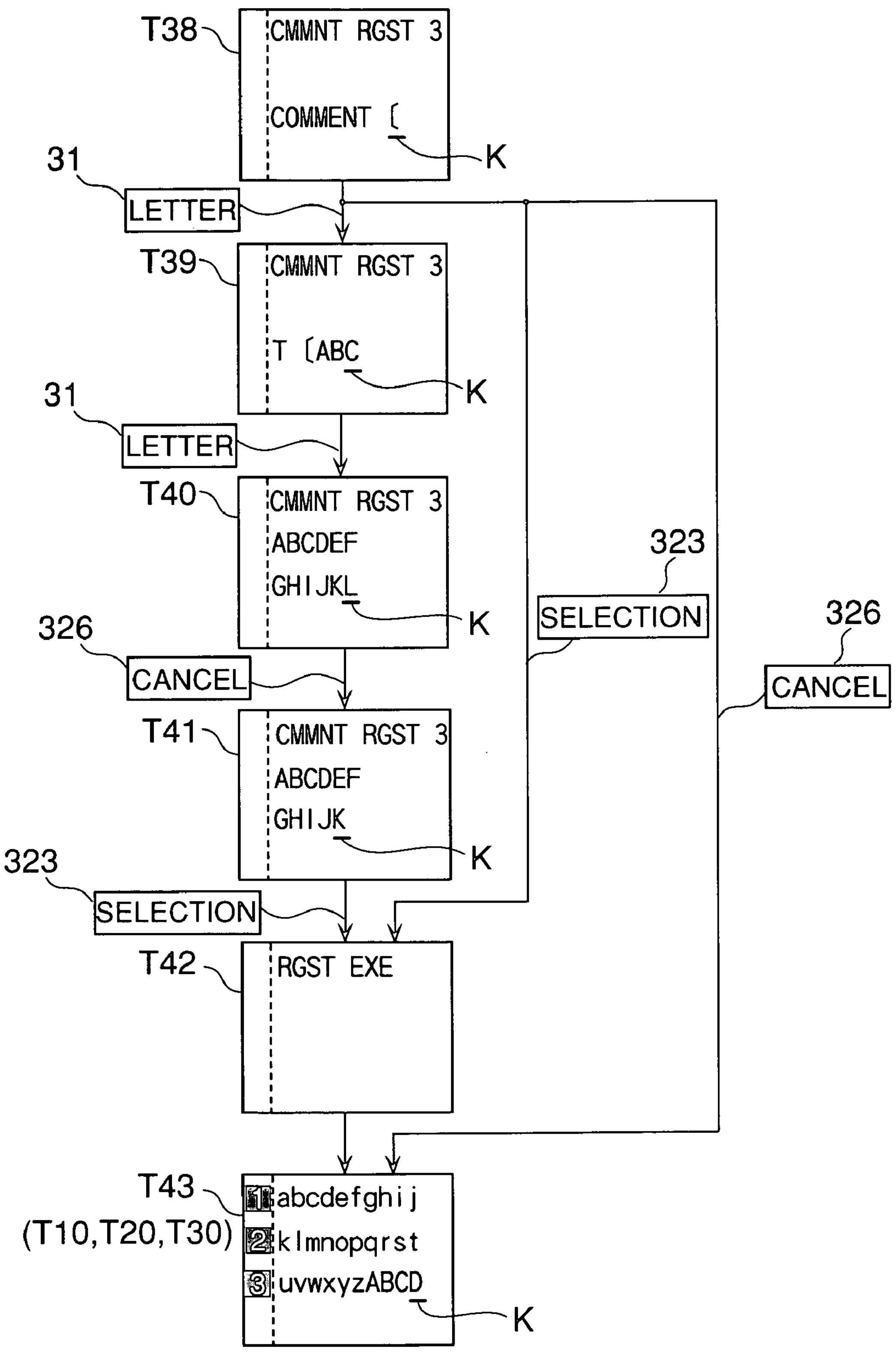
FIG. 12 is a continuation of FIG. 11.

On this character string registration screen for carrying out the "CMMNT RGST" (T38), as shown in FIG. 12, a character string and a bracket "COMMENT [" are displayed to prompt the user to enter a desired character string, and a cursor K is placed under the bracket "[", such that desired characters can be entered immediately after the bracket "[" via the keyboard 3. Therefore, as shown in FIG. 12, by operating the character key group 31 from this state, the user can enter a character string "ABC", for instance (T39). Further, after entering a character string "ABCDEF" on a first line, the user starts a new line by depressing the selection key 323 to enter a character string "GHIJKL" or the like on a second line. Further, a key entry made by the cancel key 326 after entering one or more characters (including a space) serves as a key entry for deleting a character at the position of the cursor K. This makes it possible to cancel an erroneous key entry (e.g. "L" in this example) (T40).

Further, a first key entry made by the selection key 323 after entering one or more characters serves as a key entry for finally determining a line on which the one or more characters are entered (in the case of the Japanese-language type of the apparatus which can input and edit Japanese-language character strings, when Kana/Kanji conversion is carried out, the converted Kanji is finally determined by a first key entry, and a next key entry made by the selection key 323 serves as a key entry for finally determining a line on which the kanji is entered), and a next key entry successively made by the selection key 323 serves as a key entry for starting a new line. After the new line is started, when the selection key 323 is depressed without entering a character, character strings which have been entered up to the line immediately preceding the new line are finally determined as character strings to be registered (T41). Then, the character strings determined are registered as one type of regular character strings or one for "CMMNT PRNT", and a message notifying the user of the fact is displayed (T42). When the registration operation is terminated, the display screen returns to the original text entry screen (T43: the same as t10, T20, T30).

On the other hand, according to this tape printing apparatus 1, it is also possible to register an arbitrary character string being edited on the text entry screen as it is as a regular character string. For instance, in the case of the above registration for "CMMNT PRNT", as shown in FIG. 12, when the selection key 323 is depressed without entering one or more characters in a state of the character string registration screen for use in carrying out the "CMMNT RGST" (T38), character strings being edited, that is, the three lines of character strings "abcde . . . zABCD" in the above example (see T30 in FIG. 10) are finally determined as character strings to be registered. Then, the character strings determined are registered as the one type of regular character strings for use in "CMMNT PRNT", and the message notifying the user of the fact is displayed (T42). When the registration operation is terminated, the display screen returns to the original text entry screen (T43). Further, on the same character string registration screen for use in carrying out the "CMMNT RGST" (T38), when the cancel key 326 is depressed without entering one or more characters, the registration operation is stopped, followed by returning to the original text entry screen (T43).

Figure 13:
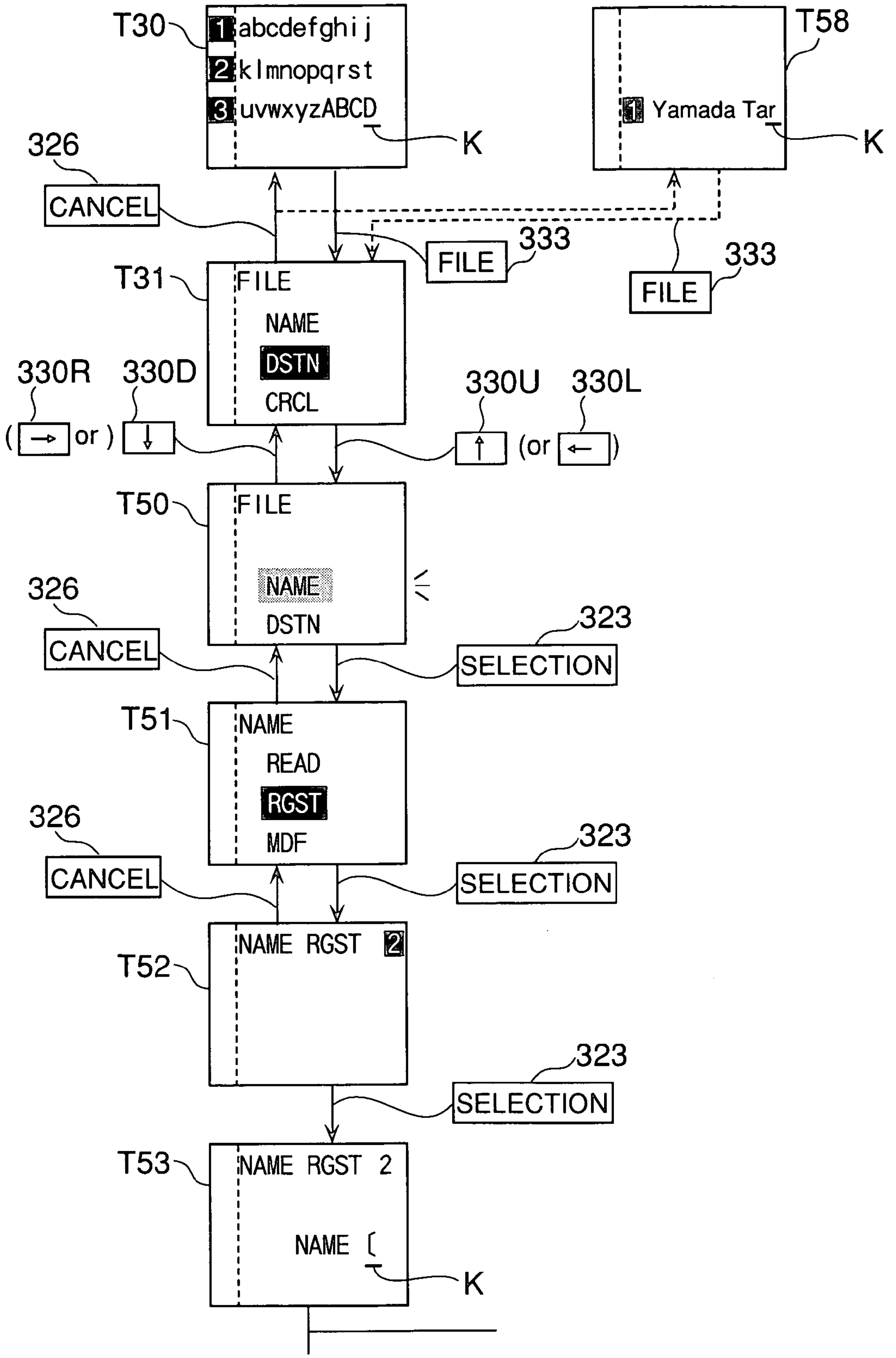
FIG. 13 is a diagram illustrating an example of images of the display screen and operations carried out on the screen when a regular character string is registered for printing of a name.

Next, registration of a regular character string for use in the name printing will be described. As shown in FIG. 13, in a state of the text entry screen editing the character strings "abcde . . . zABCD" described hereinabove with reference to FIG. 10 (T30), the file key 333 is depressed by the user, and from the state of the "FILE" selection screen being displayed (T31), the option "NAME", for instance, is highlighted for selection by operating the cursor key 330 (T50). Then, by operating the selection key 323 (T51), a "NAME" selection screen, i.e. a menu screen under the heading of "NAME" is displayed. On this "NAME" selection screen, options, such as "READ", "RGST", "MDF", "DLT", and the like, are displayed as options hierarchically immediately under the option "NAME". Hence, the option "RGST", for instance, is highlighted for selection by operating the cursor key 330 (T51), and a registration number selection screen for "NAME RGST" (name registration) is displayed by operating the selection key 323 (T52). On this selection screen as well, by operating the cursor key 330, the user can highlight a desired registration number, such as the registration number "2", as an arbitrary option, and select the same by operating the selection key 323, whereby a character string registration screen permitting input a registration area corresponding to the registration number "2" is displayed (T53: commonly shown in FIGS. 13 and 14).

Figure 14:
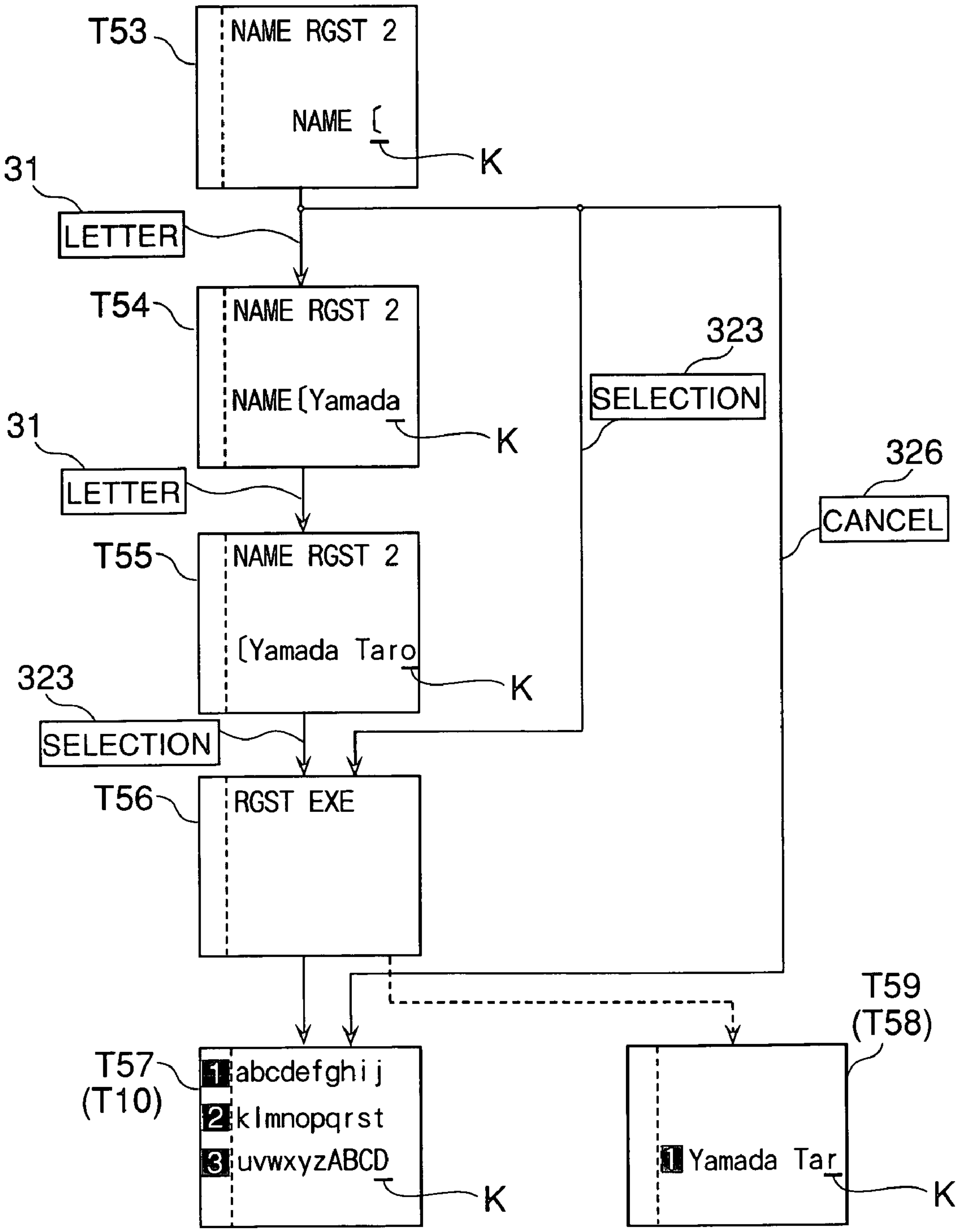
FIG. 14 is a continuation of FIG. 13.

On this "NAME REG" character string registration screen (T53) as well, similarly to the above "CMMNT RGST", as shown in FIG. 14, a character string and a bracket "NAME [" are displayed to prompt the user to enter a desired character string, and the cursor K is placed under the bracket "[", such that desired characters can be entered immediately after (on the right side of) the bracket "[" via the keyboard 3. Therefore, as shown in FIG. 14, by operating the character key group 31 from this state (T53), the user can enter a character string "Yamada Taro", for instance (T54 TO t55). Deletion effected by using the cancel key 326 is carried out in the same manner as described hereinbefore. Further, a key entry made by the selection key 323 after entering one or more characters also serves the same purpose as described above. When the selection key 323 is depressed without entering any characters on the new line, the characters entered are finally determined as a character string to be registered (T55). Then, the character string determined is registered as a regular character string for use in "NAME PRNT", and a message notifying the user of the fact is displayed (T56). When the registration operation is terminated, the display screen returns to the original text entry screen (T57: the same as T10 and so forth).

Further, similarly to the above "CMMNT RGST", it is also possible to register an arbitrary character string being edited on the text entry screen as it is as a regular character string. For instance, as shown in FIG. 14, when the selection key 323 is depressed without entering one or more characters in a state of the character string registration screen for the "NAME REG" (T53), the three lines of character strings "abcde . . . zABCD" being edited (see T30 in FIG. 13) are finally determined as character strings to be registered. Then, the character strings determined are registered as a regular character string for use in the "NAME PRNT", and a message notifying the user of the fact is displayed (T56). When the registration operation is terminated, the screen returns to the original text entry screen (T57: the same as T30 in FIG. 13).

Actually, it is difficult to assume that the three lines of character strings "abcde . . . zABCD" are registered as a name, and hence description is made in line with an actual registration process. For instance, as shown in FIG. 13, when the text entry screen displays the character string "Yamada Taro" entered and edited (T58), the user operates the file key 333 and carries out the same processing as described above to thereby display the character string registration screen for the "NAME REG" (T53). Thereafter, when the selection key 323 is depressed without entering one or more characters, the character string "Yamada Taro" being edited (see T58 in FIG. 13) is finally determined as a character string to be registered, and the character string determined is registered as a regular character string for use in the "NAME PRNT". Then, the message notifying the user of the fact is displayed (T56), and when the registration operation is terminated, the display screen returns to the original text entry screen (T59: the same as T58 in FIG. 13).

As described above, in the tape printing apparatus 1, it is possible to enter an arbitrary or desired character string including one or more characters, and register the arbitrary character string as a regular character string. More specifically, if only one (type of) character string can be registered as a regular character string, a desired arbitrary character string entered can be registered as the regular character string. Further, if a plurality of (types of) character strings can be registered regular character strings, the arbitrary character string entered may be registered as a new or additional regular character string. This makes it possible to print an arbitrary or desired character string entered through a simple operation at a desired time point. Further, if arbitrary printing for printing an entered arbitrary character string is instructed by depressing the print key 322, an arbitrary character string image corresponding to the arbitrary character string can be printed as a print image. Further, in this case as well, printing operation can be carried out through a simple operation, simply by instructing the arbitrary printing at a desired time point. More specifically, it is possible not only to print a regular character string image by regular printing through simple operations at a desired time point but also to print an arbitrary character string image corresponding to an entered arbitrary character string as a print image through simple operations at a desired time point, irrespective of whether or not the entered arbitrary character string is registered as a regular character string. This makes it possible to further improve the versatility and operability of the apparatus.

Figure 15:
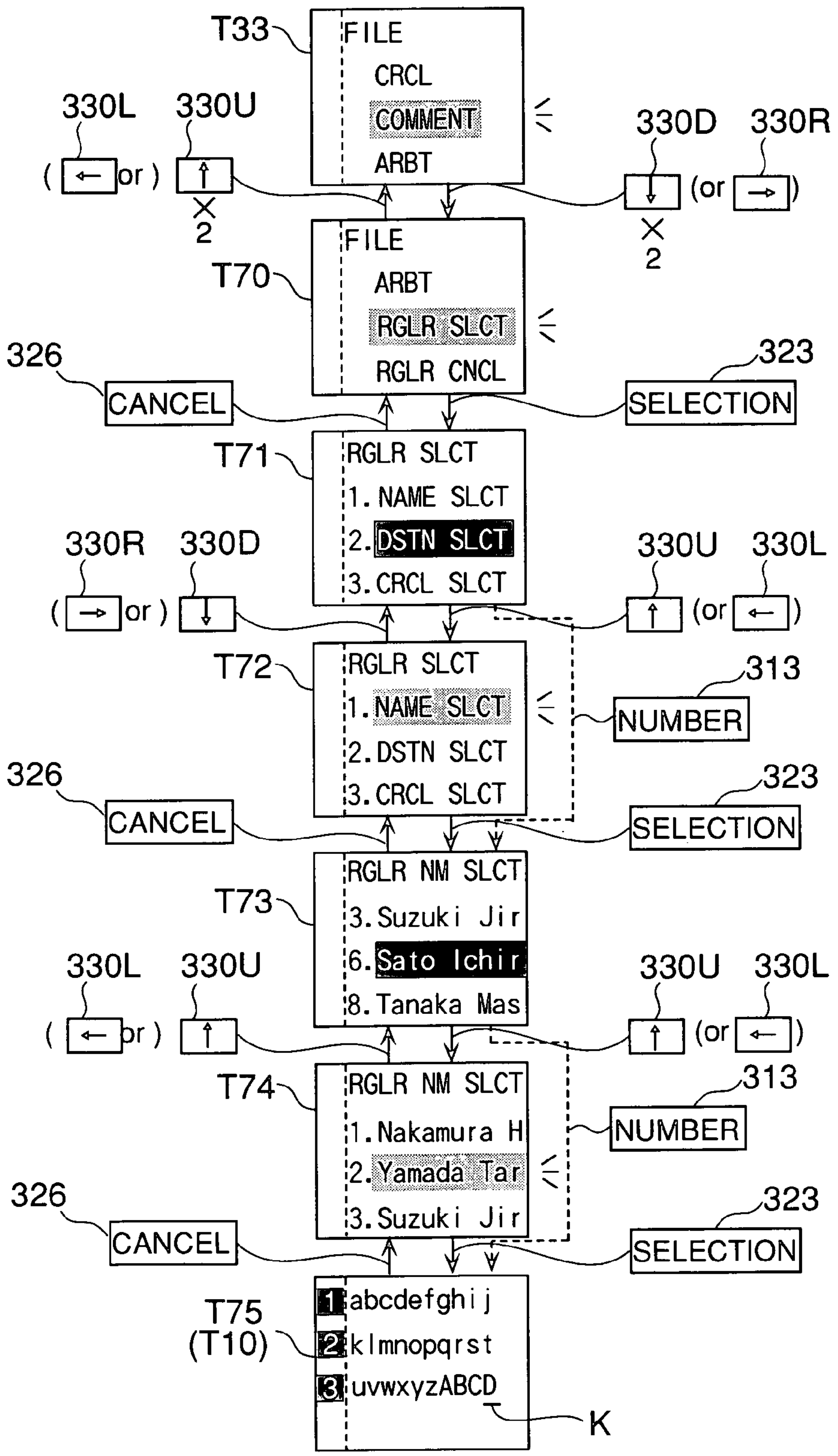
FIG. 15 is a diagram illustrating an example of images of the display screen and operations carried out on the screen when a print image is selected before instructing regular printing.

Although in the examples described above with reference to FIGS. 8 and 9, regular character strings as objects to be printed are selected after regular printing has been instructed, they may be selected before instructing regular printing. In the following, selection of regular character strings before instructing regular printing will be described. Referring to FIG. 15, on the "FILE" selection screen (T33: the same as shown in FIG. 10), the user can highlight the option "RGLR SLCT" (T70) (regular selection), and select the same. Further, similarly, by selecting an option "RGLR CNCL" (regular cancellation) it is possible to cancel the result of selection made by the "RGLR SLCT", which is effective until the processing of the "RGLR CNCL" is carried out.

When the selection key is operated by the user in the state of the "RGLR SLCT" being highlighted for selection, in the tape printing apparatus 1, a selection screen for carrying out the regular selection is displayed (T71). Similarly to the selection screen of "RGLR PRNT" (T11) described above with reference to FIG. 9, on this selection screen of "RGLR SLCT", options, such as "1. NAME SLCT" (name selection), "2. DSTN SLCT" (destination selection), "3. CRCL SLCT" (circular selection), "4. CMMNT SLCT" (comment selection), "5. SNDR SEL" (sender selection), 6. A.R. SLCT" (arbitrary registration selection), and the like are displayed as options to be selected for "RGLR SLCT" (T71 to T72), so that the user can highlight and select a desired option, e.g. the option "1. NAME SLCT". In the tape printing apparatus 1, by the above selection operation, the user displays a selection screen of "RGLR NM SLCT" (regular name selection), which is hierarchically immediately under the option of "1. NAME SLCT" (T73). On this selection screen for "RGLR NM SLCT", similarly to the selection screen of "NAME PRNT" described hereinabove with reference to FIG. 9, options, such as "1. Nakamura Hanako", "2. Yamada Taro", "3. Suzuki Jiro", "6. Sato Ichiro", "8. Tanaka Masao", and the like are displayed as options to be selected for "RGLR NM SLCT" (T73 to T74), so that the user can highlight and select a desired option, e.g. "2. Yamada Taro" (T72). In the tape printing apparatus 1, by the above selection operation, the processing of the 'RGLR SLCT' is terminated, followed by returning to the original text entry screen (T75: the same as T10, etc.).

As described above, the result of "RGLR SLCT" remains effective until the processing of "RGLR CNCL" is carried out, and hence in this case, even if the regular print key 332 is depressed by the user in the state of the same text entry screen as shown in FIG. 9 being displayed (T10), the screen is not switched to the selection screen of "RGLR PRNT" (T11), but the regular character string image of the regular character string "Yamada Taro", which is already selected by the "RGLR SLCT", is printed as a regular print image. That is, in this case, a regular character string to be printed by the regular printing operation is selected not after regular printing has been instructed, as described above with reference to FIG. 8, but before regular printing is instructed. Accordingly, the regular printing process in this case is different from the process described above with reference to FIG. 8, but the same as the process shown in FIG. 5, described above in the first embodiment.

As described hereinabove, in this tape printing apparatus 1, by registering beforehand a character string as a regular character string, it is possible to print the regular character string image of the registered regular character string at a desired time point, irrespective of whether or not a character string other than the character string is being input or edited. Further, the regular character string image can be printed through a simple operation, simply by instructing regular printing. Further, a plurality of character strings can be registered beforehand as regular character strings, and further, any of the regular character strings can be printed through simple operations, simply by selecting one of the regular character strings at a desired time point and instructing regular printing. It should be noted that in this case, one of the regular character strings may be selected before regular printing is instructed or it may be selected as a character string to be printed by the regular printing after the printing is instructed.

Further, it is possible to contemplate various applications of the invention other than the above examples. In the following, such applications will be described. For instance, although in the examples described above with reference to FIGS. 12 and 14, only "RGST EXE" (T42, T56) is used as a message indicative of execution of registration, this is not limitative, but if a registration number is added to the message to display the message as "RGST EXE 3" (in the case of T42) or "RGST EXE 2" (in the case of T56), a registration number being registered can be clearly indicated to permit the user to be assured. Further, the apparatus may be configured such that in the above cases, for instance, when the user comes to be aware of wrong operations, he is permitted to stop the registration in the course of executing the same by depressing the cancel key 326, and in response to this cancellation, a message notifying the user of the fact is displayed while restoring the state of the screen immediately preceding the execution of the registration which is backed up. If the apparatus can be configured as described above to prevent inconveniences due to wrong operations, the operability and usefulness of the apparatus are further improved.

Figure 16:
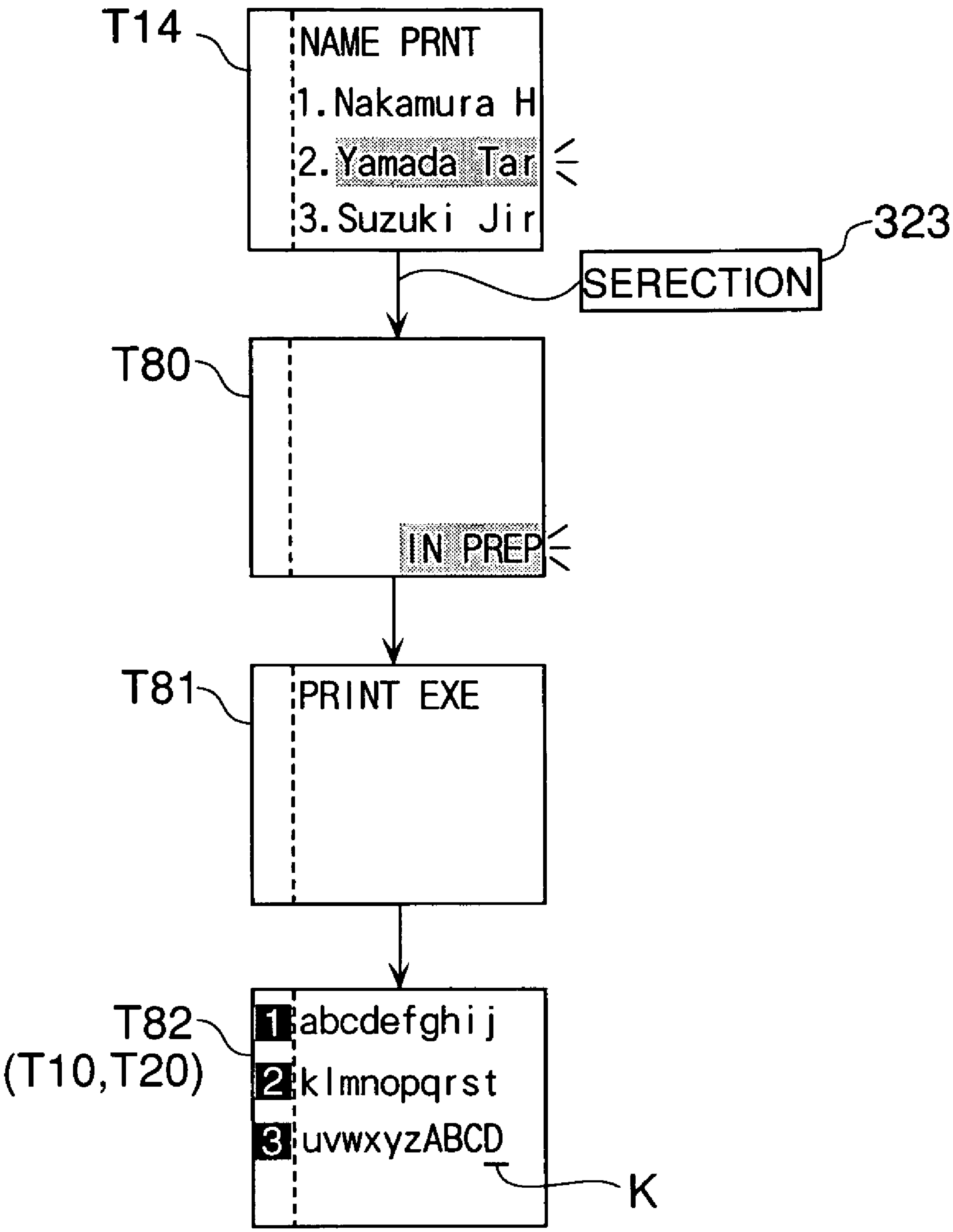
FIG. 16 is a diagram showing an example of images of the display screen and an operation carried out on the screen when printing is executed with a message displayed on a message screen.

Further, although in the example described above with reference to FIG. 9, the screen returns to the text entry screen (T20) immediately after selection (regular print image-selecting process: T14) of the regular character string for the regular printing, this is not limitative, but it is also possible to display the same message as the message for execution of registration appearing in FIGS. 12 and 14. More specifically, as described hereinbefore with reference to FIG. 8, after the regular print image-selecting process (S23) has been terminated, a regular print image is formed (S24), and printed (S25). In this case, for instance, as shown in FIG. 16, a variation is possible in which a message "IN PREP" (in preparation) indicating forming of the regular print image (S24) (T80) is displayed after termination of the regular print image-selecting process (S14), and then the message "PRINT EXE" (printing execution) (T81) is displayed when printing (S25) is started after termination of the regular print image-forming process (S24). In this case as well, similarly to the message "RGST EXE", the user can add a registration number of a regular character string to be printed to the message "PRINT EXE", or alternatively when he comes to be aware of wrong operations in the course of a printing operation, it is possible to stop the printing operation in the course thereof by depressing the cancel key 326, and display a message to the effect that the printing operation is cancelled.

Figure 17:
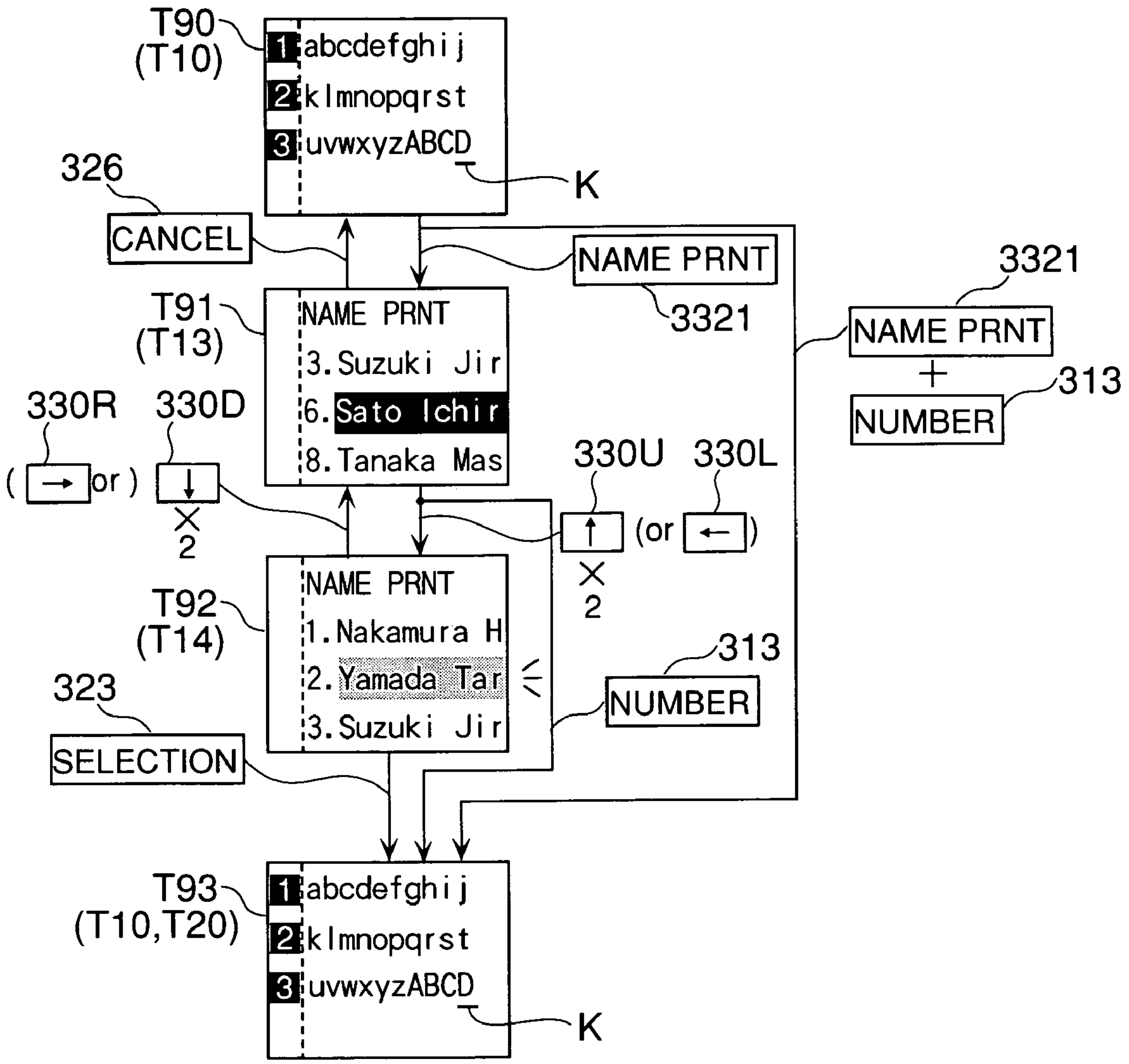
FIG. 17 is a diagram illustrating an example of the display screen and operations carried out on the screen, when a regular printing process other than that shown in the FIG. 9 example is carried out.

Further, although in each of the above examples, regular printing is started by depressing the regular print key 332, this is not limitative, but it is also possible to start the regular printing by making a key entry which enables amore specific instruction to be given, or inversely employ the regular print key 332 and the normal print key 322 in combination. In the former case, for instance, a name print key, a destination print key or the like may be provided, and as shown in FIG. 17, and by depressing the name print key 3321 in the state of a text entry screen being displayed (T90: the same as T10 and the like), operations from the regular printing to selection of the name printing (T11 to T12) appearing in FIG. 9 can be omitted for causing the program to directly proceed to operations on the selection screen of "NAME PRNT" (T91 to T93: the same as T13 to T14 and T20 in FIG. 9). Further, when the key entry permitting a more specific instruction to be given is made, the apparatus may be configured such that by depressing not only the above name print key 3321 but also a number key of the number key group 313 indicating the number of an option hierarchically immediately under the option "NAME PRNT", that is, a registration number, such as a numeral "2" in the case of the name "Yamada Taro", it becomes possible to directly designate (directly select) a regular character string ("Yamada Taro" in this example) and further omit the operations (T91 to T93) on the selection screens of "NAME PRNT". Of course, it is also possible to configure the apparatus such that the messages displayed in the course of execution of printing (T80 to T81), described above with reference to FIG. 16, are inserted for display before returning to the text entry screen (before T93).

Figure 18:
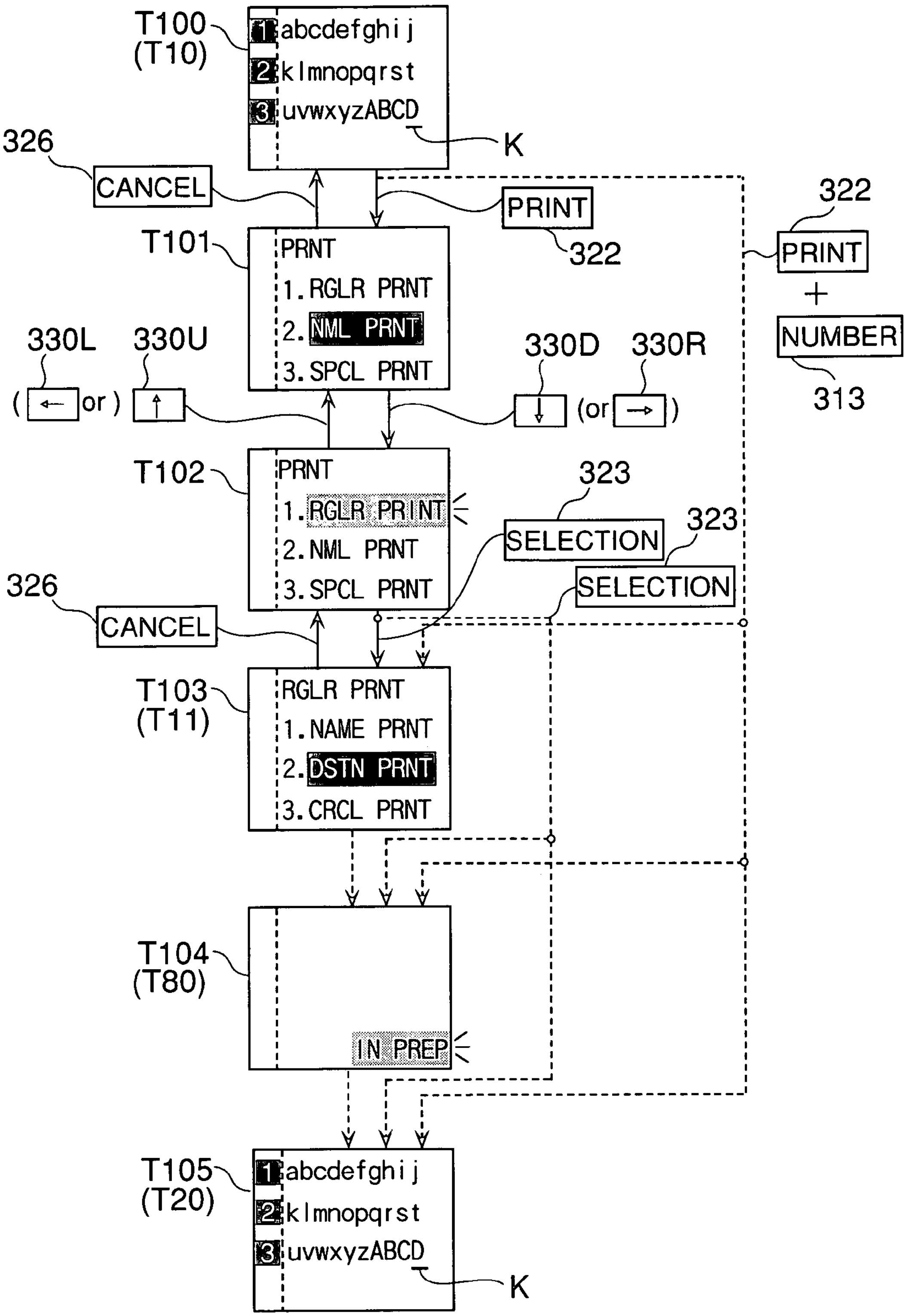
FIG. 18 is a diagram similar to FIG. 17, which illustrates still another example.

On the other hand, in the latter case, as shown in FIG. 18, the apparatus may be configured such that also when regular printing is instructed in the state of the text entry screen being displayed (T100: the same as T10 and so forth), first, options, such as "1. RGLR PRNT", "2. NML PRNT", "3. SPCL PRNT" and the like, are displayed on a selection screen for setting the kind of printing, which is hierarchically immediately under the option of "PRNT", by operating the normal print key 322 (T101), and then after selecting the option "1. RGLR PRNT" (T102) through an operation for highlighting same for selection (T101 to T102), the operation (T103: the same as T11) described above with reference to FIG. 9 and the following steps are carried out.

Further, similarly to the case of the name printing described above with reference to FIG. 17, it is also possible to directly designate regular printing by depressing a number key of a numeral "1" or the like, of the number key group 313 simultaneously with the print key 332. Further, in this case, if a 2-digit number, for instance, can be entered by operating number keys 313 such that a number "11", for instance, can be instructed to thereby directly specify the option "1. NAME PRNT" hierarchically immediately under the option "1. RGLR PRNT", selection of the option "1. NAME PRNT" may be omitted. Further, the apparatus may be constructed such that a 3-digit number, for instance, can be entered such that a number "112", for instance, can be instructed to thereby directly designate the option "2. Yamada Taro" immediately under the hierarchical level of the option "1. NAME PRNT" under the option "1. RGLR PRNT". Further, as described above with reference to FIG. 15, in a case in which a regular character string has been selected before instruction of regular printing, it is also possible to cause the program to directly proceed from the instruction to a printing operation. Further, in any of the above cases, similarly to the case described above with reference to FIG. 16, the apparatus may be configured such that the message "IN PREP" (in preparation) (T104: the same as T80) is displayed and then the screen returns to the text entry screen (T105: the same as T10 and the like).

Although in each of the above examples, operations are carried out through multiple levels for selecting from among a relatively large number of options, this is not limitative, but it is also possible to change menus, the number of options of a menu, and depth (number) of levels of the options as required. For instance, although in the examples described above with reference to FIGS. 10, 13 and the like, the options immediately under the hierarchical level of the option "FILE" are "NAME", "DSTN", "CRCL", "COMMENT", "ARBT", "RGLR SLCT", "RGLR CNCL", and so forth (T31 to T33 in FIG. 10, T31, T50, and so forth in FIG. 13), the options of "RGLR FILE" (regular file), "ARBT", "RGLR SLCT", and "RGLR CNCL" may be provided such that any of "NAME", "DSTN", "CRCL", and "COMMENT" can be selected at a level hierarchically immediately under the option of "RGLR FILE". Further, it is also possible to set options of the menu "FILE" to only the options of "RGLR" and "ARBT", and cause the option "RGLR" (menu) to include the options of "NAME", "DSTN", "CRCL", "COMMENT", "SLCT" (regular selection), and "DLT" (regular delete) as options immediately under the hierarchical level thereof.

Further, the apparatus may be configured such that even regular character strings different in use or nature can be equally (equivalently, uniformly, freely) registered, selected, and printed without discriminating the options as members of the menus of "NAME", "DSTN", "CRCL", "COMMENT", and the like. Further, instead of selecting the above options of "RGLR" and "ARBT" at a level hierarchically immediately under the option of "FILE", i.e. at the menu of "FILE" it is also possible to use the file key 333 as a key for use in arbitrary (normal) file handling operations, and use a regular file key 3331, for instance, additionally provided for use in regular character string file handling operations, to handle files of regular character strings. Of course, in this case, when the file key 333 and the shift key 327 are operated simultaneously in combination, they may serve as the regular file key. In this case, options displayed on a first selection screen ("FILE" selection screen) through operation of the file key 333 can be set to "READ", "RGST", "MDF", "DLT" (delete) and the like. Similarly, in this case, options displayed on a first selection screen ("RGLR FILE" selection screen) through operation of the regular file key 3331 can be set to "READ", "RGST", "MDF", "DLT", "SLCT", "CNCL" and the like.

Figure 19:
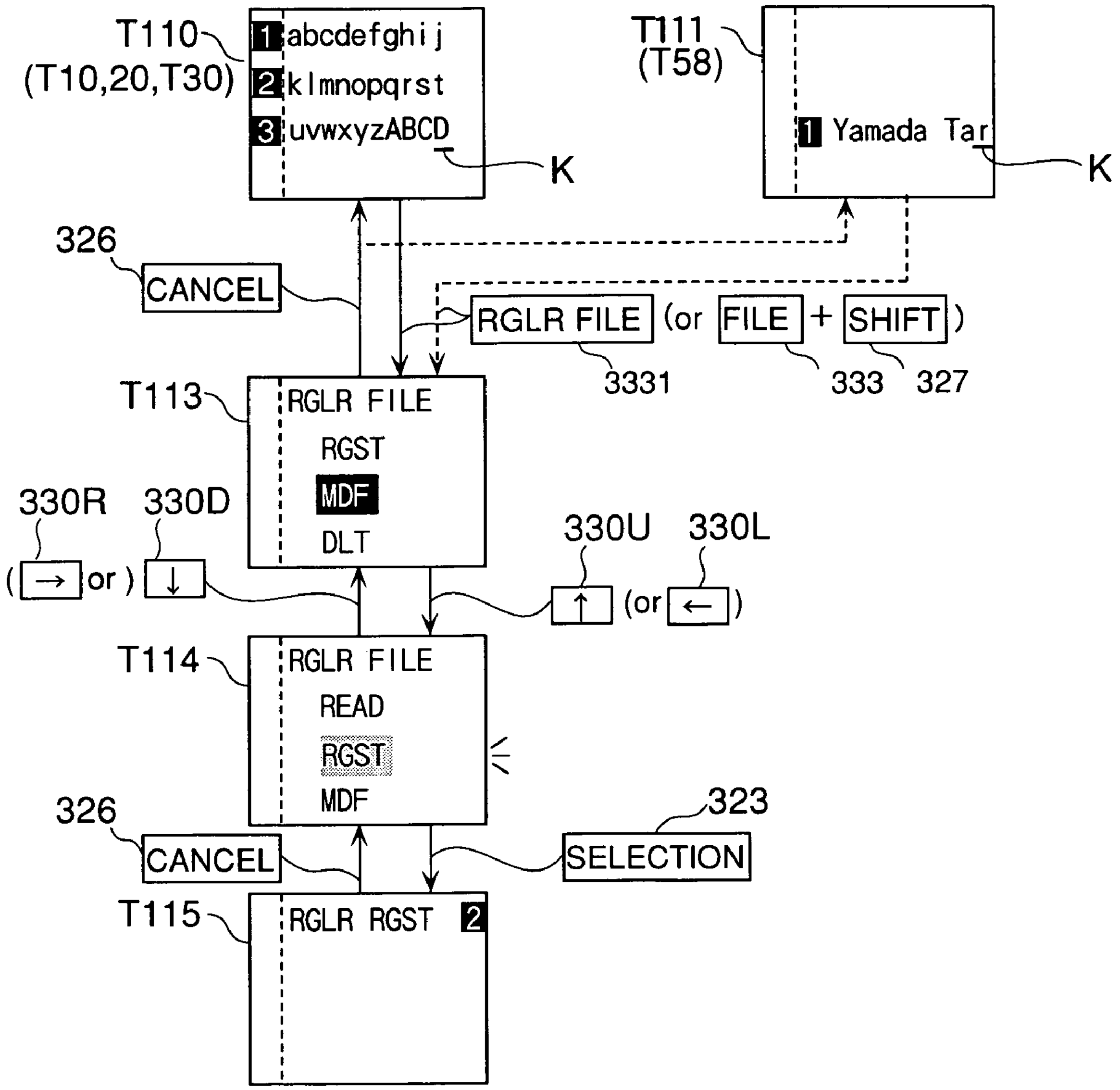
FIG. 19 is a diagram illustrating an examples of images of the display screen and operations carried out thereon when a regular character string is registered for a regular printing process other than those shown in FIG. 10

For instance, as shown in FIG. 19, when the regular file key 3331 (or the file key 333+the shift key 327) is depressed by the user in the state of a text entry screen being displayed (in a state of an arbitrary text entry screen, such as T110 (the same as T10, T20, T30, etc.), Till (the same as T58 in FIG. 13)), a ("RGLR FILE") selection screen for file handling operations for handling files of regular character strings is displayed (T113). On this selection screen (T113), the options of "READ", "RGST", "MDF", "DLT", "SLCT", "CNCL" and the like are displayed as options of the "RGLR FILE", so that the user can highlight and select a desired option by operating the cursor key 330 and the selection key 323. For instance, when the selection key 323 is depressed with the option "RGST" being highlighted for selection (T115), a first selection screen of "RGLR RGST" registration screens is displayed (T115). The following displayed screens and operations are the same as the sequence of screens and operations (T36 to T42) described above with reference to FIGS. 10 to 12, or the sequence of screens and operations (T52 to T57 or T59) described above with reference to FIGS. 13 to 14, and hence description thereof is omitted.

Figure 20:
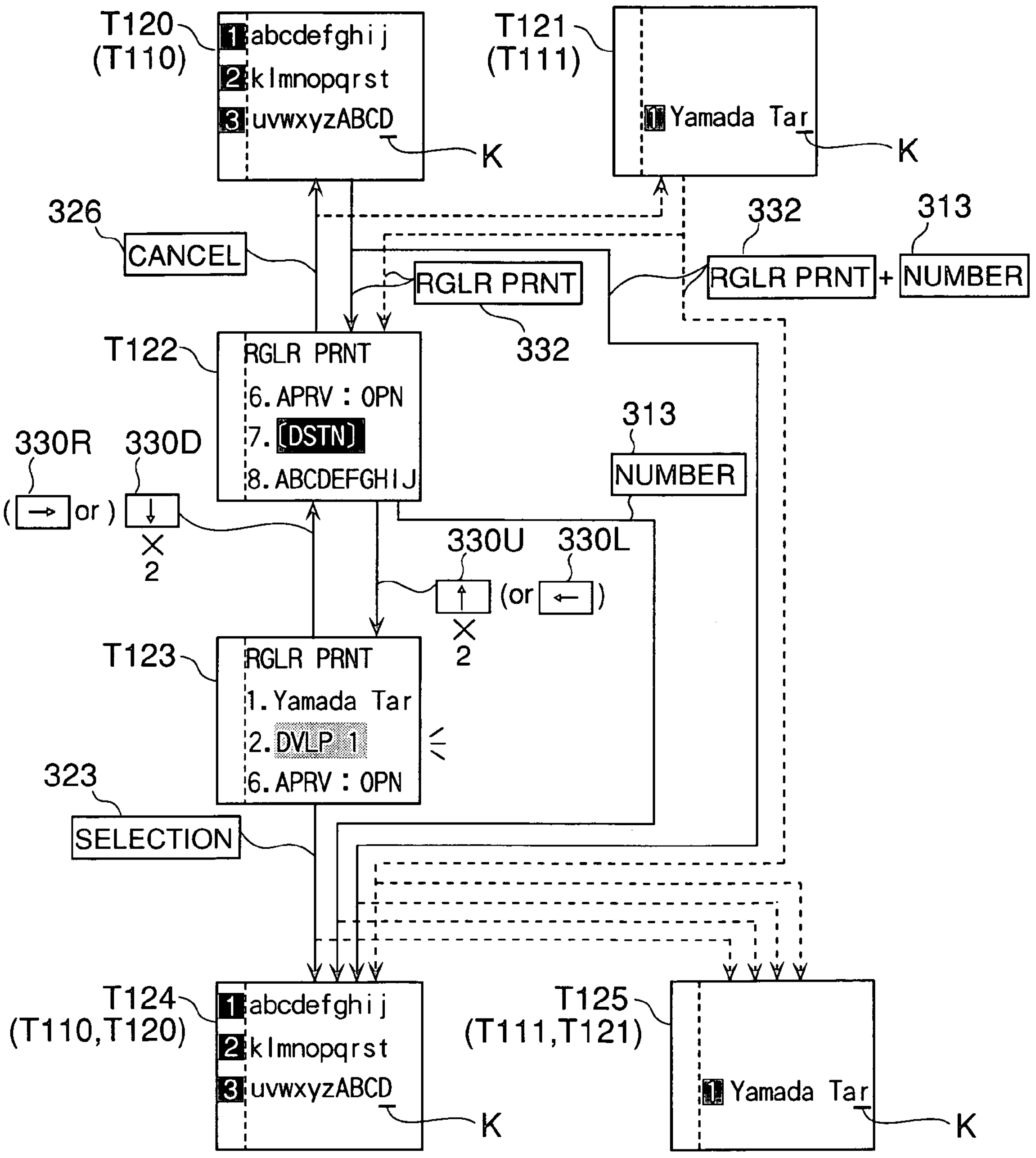
FIG. 20 is a diagram similar to FIG. 17, which illustrates still another example.

Further, when the option "SLCT" is displayed on the "RGLR FILE" selection screen, it is possible to select the regular character string image of a desired regular character string as a regular print image by carrying out the same operation (T73 to T75) as described above with reference to FIG. 15. In this case, as described hereinbefore, the result of "RGLR SLCT" remains effective until the option "CNCL" is selected and "RGLR CNCL" is carried out, so that after the regular print image is selected, the image can be printed simply by depressing the regular print key 332. Needless to say, as described above, it is possible to select the regular print image after or simultaneously with instruction of regular printing (operation of the regular print key 332). For instance, let it be assumed that the regular character strings of the regular print images described above with reference to FIGS. 6 and 7 are registered. Then, as shown in FIG. 20, after the regular print key 332 is operated (regular printing is instructed) in the state of the text entry screen being displayed (T120 (the same as T110 and the like), T121 (the same as T111 and the like)), a regular pint image can be selected through operations on regular printing selection screens (T122 to T123: the same as T13 to T20 in FIG. 9 and T91 to T93 in FIG. 17). Further, as shown in the figure, by depressing a number key of the number key group 313 indicating the number of an option (i.e. a registration number, such as a numeral "2" in the case of the "1st Sect. of Development Dept.") simultaneously with the regular print key 332, a regular character string ("1st Sect. of Development Dept." in this example) can be selected.

That is, in the tape printing apparatus 1, as described above with reference to FIGS. 19 and 20, even regular character strings different in use or nature are dealt with equally (equivalently, uniformly, freely) without discriminating the options "NAME", "DSTN", "CRCL", "COMMENT", and the like from each other, whereby the regular character strings can be registered, selected and printed through simpler operations. In addition, it is possible to change menus, the number of options of a menu, and depth (member) of levels of the options as required.

Further, it is possible to contemplate not only the above processing and operating applications (variations) but also various applications in respect of practical uses. More specifically, although in the examples described above with reference to FIGS. 6 and 7, the tape printing apparatus 1 is mainly used in offices (for business purposes), this is not limitative, but examples (practical examples) of use in other circumstances can be contemplated. For instance, in families having kindergarteners, schoolchildren in the lower grades of elementary schools, and the like, it is required to attach their names to almost all their belongings. In this case, name labels can be regularly used to which is added information of a class and school they belong to, such as "□□ΔΔ" of Class ◊ of ○ GRADE" and further "◎◎ Primary School" as well as "☆☆ Municipal (Metropolitan) School". There is other information to be printed on labels, as enumerated below: telephone numbers (including cellular phone numbers), phone numbers for contact in case of emergency, mail addresses, internet addresses, information for use with a business card (including the use of printing the information for memorandums), TV channel numbers, special password, ID's for logging on to EWS or the like, membership numbers, bank account numbers, instructions such as "DISCARD", "STORAGE" and the like, indications such as "FOR CIRCULATION", "CIRCULATED" and the like, labels indicating that a document or the like is obsolete, or checked off, caution labels indicating that a document or the like is to be kept secret from outsiders, important, and so forth. There are examples too numerous to enumerate.

Further, especially, the following are possible examples of practical applications of mixtures of a regular character string and an arbitrary character string. For instance, when a serial number is to be added as an arbitrary character string after a regular character string "EQUIPMENT TAKEN OUT IN AN EMERGENCY No.", the regular print key 332 is depressed, and then serial numbers, such as "1", "2", "3" and so forth, are entered for arbitrary printing by operating number keys of the number key group 313. Thereafter, simply by depressing the print key 322, labels printed with character strings "EQUIPMENT TAKEN OUT IN AN EMERGENCY No. 1", "EQUIPMENT TAKEN OUT IN AN EMERGENCY No. 2", "EQUIPMENT TAKEN OUT IN AN EMERGENCY No. 3" and the like can be easily formed. In this case, the apparatus can be configured such that a function (process) of incrementing serial numbers whenever a label is printed can be selected. Further, when a school teacher (particularly, in charge of a class in the lower grades) distributes to students notebooks or the like bearing their names, if only he prints a regular character string "Name:", for instance, by depressing the regular print key 332, and then depresses the print key 322 after entering a personal name as an arbitrary character string next to the name, he can easily form a label printed with "Name: Lucy", "Name: John" or the like. In this case, a list (table) of names can be prepared and stored beforehand an additional function of the apparatus is used for inserting or printing a next name of the table on a next label whenever a label is printed.

Further, although in the above examples, attention is mainly paid to the menus, the number of options, and depth (number) of levels of options, this is not limitative, but various modifications of the methods of registration and selection (retrieval) are possible.

For instance, the apparatus may be configured such that when an arbitrary character string (representative character string) as one of regular character strings and one or more items (character strings related thereto: related character strings) related to the representative character string are registered beforehand as one group (regular character string group), and the representative character string is selected as one of options to be selected for regular printing, or alternatively when a predetermined key (one of regular print keys) for carrying out the regular printing is depressed, (1) a predetermined item or a plurality of predetermined items (one or more predetermined related character strings) related to the representative character string can be displayed and printed with the representative character string. Further, similarly, the apparatus may be configured such that one regular character string group is registered in advance, and (2) after the representative character string is selected from options of regular character strings, one or more arbitrary related characters may be selected (at a level hierarchically immediately under the representative character string, for instance), such that not the one or more predetermined related character strings but the selected one or more arbitrary related characters can be displayed and printed with the representative character string.

Further, (3) after character strings correlated to each other, including corresponding representative character strings, are registered in the form of multi-dimensional matrix data retrievable under a selecting (retrieving) condition that an option (identifier) is selected for regular printing (or one kind of a regular print key is depressed), only selected or designated character strings corresponding to the retrieving condition may be displayed and selected for printing, or automatically printed without displaying the character strings. Further, (4) if representative character strings corresponding to predetermined options of regular printing are registered in the form of a list of data, and related character strings related to each of the representative characters are registered as attribute information in the list, it is also possible to carry out the regular printing in the same member as in the above method (3), or a display operation for performing the regular printing.

In this case, when one the above predetermined options of regular printing is carried out, each of the representative characters serves as retrieving conditions, whereas when one of other options of regular printing is carried out, each related character string representative of attribute information, corresponding to the option of regular printing, serves as a retrieving condition. It should be noted that since the data in the form of a list employed in the method (4) can be regarded (grasped) as data in the form of a two-dimensional matrix, formed with reference to the representative character strings corresponding to the options to be selected for the predetermined regular printing, which will be described in detail hereinafter, it is also possible to regard (grasp) the method (4) as one kind of the above method (3) (if a predetermined precondition, referred to hereinafter, is fulfilled).

In the following, examples of the above methods (1) to (4) will be described. First, let it be assumed that options, such as "1st Sect." (first section), "2nd Sect." (second section), "3rd Sect." (third section) and so forth, are provided as options at a level hierarchically immediately under the option of the "CRCL PRNT" (circular printing) described above with reference to FIG. 7, for instance, and that at a level hierarchically immediately under the option of "1st Sect.", the family names of all the members of the "1st Sect." including the family name "Yamada" of MR. "Yamada Taro", section chief of the first section, are provided as options. In this case, assuming that Mr. "Nakamura", referred to hereinbefore, is a clerk of the whole "Development Dept.", the option "CRCL PRNT" is selected from options of the regular printing (of course, a predetermined key for instructing "CRCL PRNT" (printing of a document for circulation) may be provided for depression), the option of "1st Sect." is selected at a level hierarchically immediately under the option "CRCL PRNT", and then "Yamada", "Sato", and "Tanaka", for instance, are selected at a level hierarchically immediately under the option "1st Sect.", whereby similarly to FIG. 6D, described above, it is possible to perform regular printing for printing a label bearing circular-destination names, as shown in FIG. 21A. This case is the example of the method (2).

In the above case, "1st Sect." is an identifier, "1st Sect. of Development Dept." is a regular character string (representative character string), and "CIRCULAR [ ]:" placed at the head of a line of the label, arrowheads "→" interposed at intermediate portions of the line, and "Nakamura (IN CHAEGE)" at the end of the line are predetermined or formulaic portions. Further, in this case, when "Yamada", "Sato", and "Tanaka" (a plurality of arbitrary related character strings), for instance, are selected, it is only required that a plurality of related character strings can be selected by highlighting "Sato", "Tanaka" and "Watanabe" (in reverse video or in a flashing state) for selection (by operating the shift key 327 (or another predetermined key or the combination of them) (or some marks are added thereto), and then depressing the selection key 323 (see FIGS. 35 to 36). Of course, only "Yamada" (one arbitrary related character string) may be selected, or inversely a method of not selecting "Yamada" may be made available.

Further, assuming that options, such as "1st Group", "2nd Group", and so on, are provided as options at a level hierarchically immediately under the option of the "1st Sect.", for instance, and the three of "Sato", "Tanaka", and "Watanabe" are all the members of the "1st Group", by selecting the option "1st Group" at the level hierarchically immediately under the option of the "1st Sect.", it is possible to perform regular printing for printing a label bearing circular-destination names, as shown in FIG. 21B. This case is the example of the method (1). In the above case, "1st Group 1st Sect." is an identifier, "1st Group 1st Sect. of Development Dept." is a regular character string (representative character string), and "CIRCULAR:" placed at the head of a line of the label, arrowheads "→" interposed at intermediate portions of the line, and "Nakamura (IN CHARGE)" at the end of the line are predetermined regular or formulaic portions. In this case, "Yamada", "Sato", "Tanaka", and "Watanabe", correspond to a plurality of predetermined related character strings in the case of "1st Group 1st Sect. of Development Dept." being registered as the representative character string.

Figure 6F:
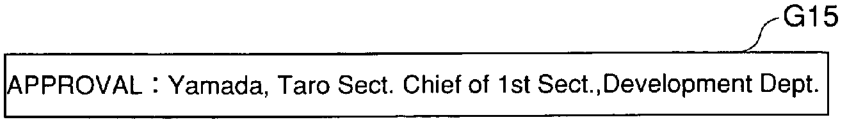
Figure 7:
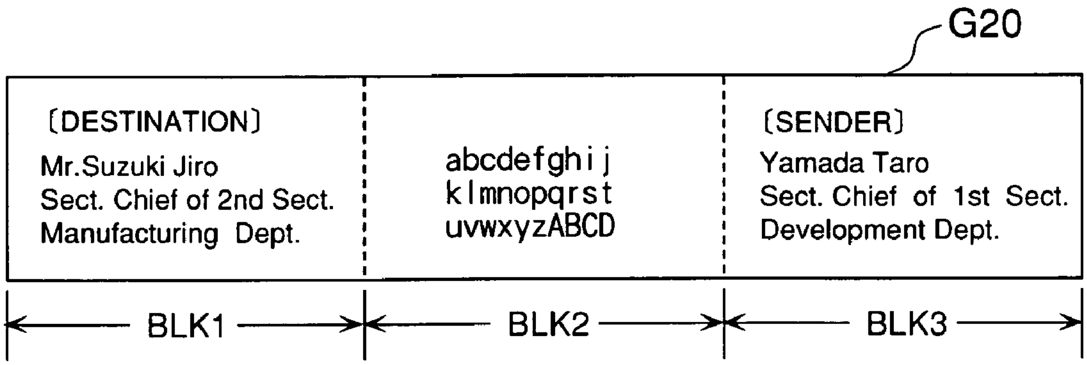
FIG. 7 is a diagram similar to FIGS. 6A to 6F, which shows another example of a regular print image and a label printed with the print image.

Further, when an option "APPRVL PRNT" (approval printing) or the like is provided, for instance, as an option of regular printing, and the option "APPRVL PRNT" is selected (of course, a predetermined key for instructing "approval printing" may be provided for depression), and when the option of "1st Sect." is selected at a level hierarchically immediately under the option "CRCL PRNT", it is also possible to unconditionally perform regular printing to print an approval label, as shown in FIG. 6F referred to hereinabove. This case as well is the example of the above method (1).

In the above case, "1st Sect." is an identifier, "1st Sect. of Development Dept." is a regular character string (representative character string), and "APPROVAL:" placed at the head of a line of the label, ", Chief of" interposed at an intermediate portion of the line are predetermined regular portions. In this case, "Yamada Taro" corresponds to a predetermined related character string related to the registered representative character string of "1st Sect. of Development Dept.". Further, at a level hierarchically immediately under the option "1st Sect.", for instance, "Sato", a chief of the first section, may be selected in addition to "Yamada", section chief of the first section. This case as well is the example of the above method (2). In this case, an approval label as shown in FIG. 21C, for instance, can be formed. "Yamada Taro, Sect. Chief of 1st Sect.", "Sato Ichiro, Chief of 1st Sect." and the like correspond to a plurality of related character strings in the case of "1st Sect. of Development Dept." being registered as a representative character string, and one desired related character string "Sato Ichiro, Chief of 1st Sect." of the plurality of related character strings is selected in the above case.

As described above, in the examples of the methods (1) and (2), a character string group having a regular character string as a representative character string is registered as one regular character string group, and when a representative character string image is printed as a regular character string image, one or more of related character string images are printed such that the one or more of the related character string images accompany the representative character string image. Therefore, similarly to the case of only a regular character string being printed, described above with reference to FIG. 9 and the like, irrespective of whether or not another character string is being input or edited, not only the regular character string image of a registered regular character string but also one or more of the related character string images of related character strings related to the regular character string can be printed through simple operations at a desired time point such that the one or more of the related character string images accompany the regular character string image.

Further, in the above example of the method (1), one or more predetermined related character string images of related character strings are printed such that the one or more predetermined related character string images accompany a representative character string image as a regular character string image, so that predetermined related character string images related to a regular character string image can be printed through simple operations at a desired time point along with the regular character string image. Further, in the above (2) example, a plurality of types of character strings can be registered as related character strings, and one or more desired related character strings of the related character strings are selected and printed such that the one of more desired related character strings accompany a representative character string image. Hence, one or more related character string images can be arbitrarily selected and printed through simple operations at a desired time point such that the one or more related character string accompany a regular character string image.

Further, in any of the above cases, similarly to the above-described cases of only a regular character string being printed, a plurality of character strings can be registered as regular character strings, and any of them can be printed through simple operations, simply by selecting the same at a desired time point and instructing regular printing. It should be noted that in this case as well, a regular character string can be selected before, simultaneously with, or after instruction of regular printing. Further, in these cases, a regular character string group is registered such that related character strings can be retrieved by using an identifier corresponding to a representative character string as a retrieving condition, and a regular character string is selected based on the identifier. This makes it possible to select a regular character string and retrieve related character strings to be printed with the regular character string with ease, by selecting an identifier.

Further, in the above cases, similarly to the above-described cases of only a regular character string being printed, an identifier may be each regular character string itself, or e.g. a predetermined number of characters placed at the head of each regular character string, a nickname or the like, or simply a registration number. In this case, since it is obvious that a representative character string is a related character string related to the representative character string itself, the representative character string is registered as related character strings separately from an identifier (or similarly to the same), whereby the identifier can be in the form of, for instance, a registration number, a nickname, or a predetermined number of characters at the head of each regular character string. This makes it easy to simplify an identifier.

Next, let it be assumed, for instance, that the above "Development Dept." is registered as a regular character string (representative character string) with "Akai Ichiro", manager of the development department, registered as a related character string, that "1st Sect. of Development Dept." is registered as a regular character string (representative character string) with the names of all the members of the "1st Sect." including "Yamada Taro", section chief of the first section, registered as related character strings related to the regular character string, that similarly, the "2nd Sect. of Development Dept." is registered as a representative character string together with the names of all the members of the "2nd Sect." including Mr. "Aoki", section chief of the second section, and that the "3rd Sect. of Development Dept." is registered as a representative character string together with the names of all the members of the "3rd Sect." including Mr. "Sirasawa", section chief of the third section, i.e. that all the members of the "Development Dept." are registered (see FIG. 23).

In the above case, a regular character string group is defined in which the "Development Dept." form a representative character string, and the names of all the members of the "Development Dept." including "Akai Goro", manager of the development department, form related character strings, and at the same time a regular character string group (hereinafter referred to as an "superordinate regular character string group") at the upper level in hierarchy is defined which includes a regular character string group (hereinafter referred to as a "subordinate regular character string group") at the lower level in hierarchy, in which the "1st Sect. of Development Dept." forms a representing character string, and the names of all the members of the first section including "Yamada Taro", section chief of the first section, form related character strings, a similar subordinate regular character string group of the "2nd Sect. of Development Dept.", a similar subordinate regular character string group of the "3rd Sect. of Development Dept.", and the like.

In the above case as well, after the option of "CRCL PRNT", for instance, is selected (or instructed by depressing a predetermined key), by selecting the option "1st Sect." at the level hierarchically immediately under the option "CRCL PRNT", and then "Yamada" and the like at the level hierarchically immediately under the option "1st Sect.", the label printed with the circular-destination names, described above with reference to FIG. 21A, can be formed. Alternatively, if the option "1st Group" is selected at the level hierarchically immediately under the option "1st Sect.", it is possible to form the label bearing the circular-destination names, described above with reference to FIG. 21B. Further, after the option of "APPRVL PRNT" is selected (or instructed by depressing a predetermined key), if the option "1st Sect." is selected at the level hierarchically immediately under the option "APPRVL PRNT", it is possible to form the approval label described above with reference to FIGS. 6F and 21C. In short, in this case as well, regular printing by the above methods (1) and (2) of selection (retrieval) can be carried out.

Figure 22A:
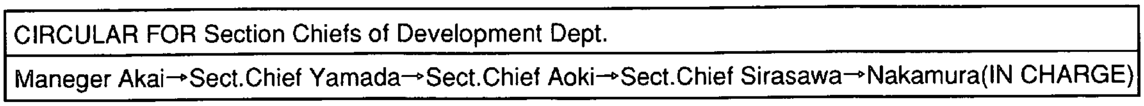
FIGS. 22A to 22C are diagrams similar to FIGS. 6A to 6F, which illustrate still other examples.

On the other hand, in addition to the above options (identifiers) of "1st Sect." to "3rd Sect.", for instance, if an option of "Section Chief" or the like is provided at the level hierarchically immediately under the option "CRCL PRNT" (or an option of "Sect. CHF C. PRNT" (section chief circular printing) is provided at the same level in hierarchy, or a predetermined key for instructing "Sect. CHF C. PRNT" is provided), that is, instruction means for instructing "section chief circular printing" is provided, and the specific printing is selected (instructed), it is possible to carry out "section chief circular printing" to form a label printed with circular-destination names (circular-destination name label), as shown in FIG. 22A. This case is an example of regular printing by the above method (3).

In the above case, for instance, the chief of each section may be registered at the head of the related character string of the each of the subordinate regular character string groups of "1st Sect." to "3rd Sect.". More specifically, when the "Sect. CHF C. PRNT" is instructed, retrieval is carried out across the subordinate regular character string groups to automatically select a related character string positioned at the head of each subordinate regular character string group (this example is also an example of regular printing by the method (1) since one character string at the head of each group, that is, a predetermined one character string is selected), and the related character strings selected are sequentially arranged in order as circular-destination names. In this case, since "Section Chief" is discriminated from the other numbers, the names (correlated character strings) of all the members of the department one managed (registered) in the form of two-dimensional matrix data in which for instance, items (retrieving conditions) in a row (or a column) are set to "Sect. Chief" and "OTHERS", while items (retrieving conditions) in a column (or a row) are set to "1st Sect." to "3rd Sect." (in this sense, this example is an example of regular printing by the method (3)). Of course, the above names and the like may be stored (registered) literally in the form of matrix data on a memory. This is preferable since it is easy to carry out control and retrieval of the data. Further, in the above case, the retrieving conditions of "OTHERS" in the column may be made more specified into "Chief", "Group Leader", "Group Members", "Clerk", and so forth, and registered for management. This makes it possible to set, as required, and easily carry out other types of regular printing, such as "CHF CRCL" (chief circular), "G. L. CRCL" (group leader circular), "CLRK CRCL" (clerk circular), etc., in a manner further suiting practical conditions under which the apparatus is used.

Figure 22B:
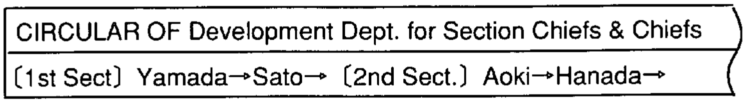
Figure 22C:
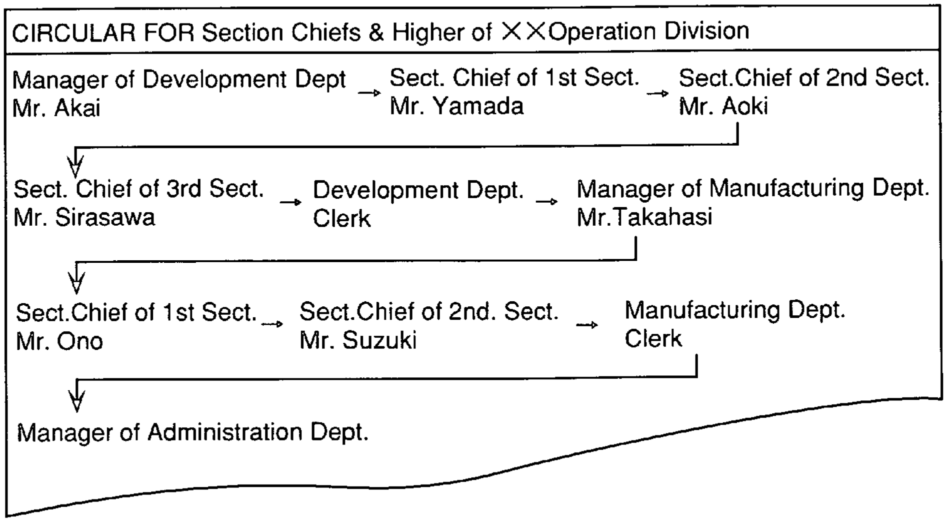

It should be noted that if options, such as "1st Sect." to "3rd Sect." and the like, are further provided at a level hierarchically immediately under the option "Sect. Chief" (or "Sect. CHF CRCL", "Sect. CHF C. PRNT" or the like), circular destinations (section chiefs), such as only "Sect. Chief of 1st Sect." and "Sect. Chief of 3rd Sect.", or only "Manager" and "Sect. Chief of 2nd Sect.", can also be selected (this example is also an example of regular printing by the method (1) since only "Sect. Chief" of each section is selected, while also being an example of regular printing by the method (2) since circular destinations (section chiefs) can be selected in arbitrary combination as described above). Further, although in the above examples, the term "Sect. CHF CRCL" (section chief circular) is used to mean "circular to be circulated to section chiefs or higher positions (including the manager of the department)", this is not limitative, but the option may be used to literally mean a circular to be circulated only to "section chiefs" (not including the manager of the department), or alternatively a separate option "Sect. CHF/HIGHER CRCL" (section chief and higher circular), for instance, may be provided so as to distinguish the same from the option "Sect. CHF CRCL". The same applies to the above "CHF CRCL", "G. L. CRCL", and the like (which may be distinguished from options "CHF/HIGHER CRCL" and "G.L./HIGHER CRCL" (group leader and higher circular), or separate options "CHF/HIGHER CRCL" and "G.L./HIGHER CRCL" may be arranged). Further, for instance, if retrieving conditions, such as "Section Chief"+"Chief", is provided, it is also possible to carry out regular printing to form a circular-destination name label bearing "Section Chief & Chief". Further, a circular-destination name label, as shown in FIG. 22C, for the whole "XX Operation Dept." that integrates departments can also be formed by carrying out an option of regular printing, "Sect. CHF/HIGHER CRCL" (section chief and higher circular).

Further, for instance, the above-mentioned Mr. "Yamada Taro" belongs to the "1st Sect. of Development Dept.", and works as the "Section Chief" of the section (or he may be considered to be the "Sect. Chief of 1st Sect." belonging to the "Development Dept."), and at the same time he is a "male". Therefore, if character strings which are registered based on a three-dimensional matrix under three retrieving conditions of affiliation (corporate affiliation), post and sex, are put in order (managed), the character string "Yamada Taro" is, for instance, one of the related character strings of a regular character string group having the character string "1st Sect. of Development Dept." indicative of his affiliation, as a representative character string, one of the related character strings of a regular character string group having the character string "Sect. Chief" indicative of his post, as a representative character string, and at the same time one of the related character strings of a regular character string group having the character string "Male" indicative of his sex, as a representative character string. Therefore, for instance, when a circular-destination name label printed with a character string "Circular only to Males" is formed for notifying male staff of the company of a checkup day or the like, if "Male" is used as a retrieving condition, the name "Yamada" (or "Yamada Taro") can be included in the names of circular destinations.

More specifically, for instance, let it be assumed that items (retrieving conditions) are arranged three-dimensionally i.e. in the X, Y and Z directions, such that "1st Sect. of Development Dept.", "2nd Sect. of Development Dept.", "3rd Sect. of Development Dept." and the like as the items (retrieving conditions) of affiliation are arranged in the X direction, "Manager", "Sect. Chief", "Chief", "Group Leader", "Group Members", "Clerk" and the like as the items (retrieving conditions) of post in the Y direction, and "Male" and "Female" as the items (retrieving conditions) of sex in the Z direction. In this matrix form, the names of the members of the department are registered (stored) in the form of three-dimensional matrix data. In this case, the above name of "Yamada Taro" is registered in a box (satisfying all the retrieving conditions) at which intersect all of a column or row (group) of "Affiliation": "1st Sect. of Development Dept.", a column or row (group) of "Post": "Sect. Chief", and a column or row (group) of "Sex": "Male". If a matrix (table or the like) of the above-mentioned kind is provided not only for the "Development Dept." but also for the whole "XX Operation Division." and retrieving conditions for retrieving the operation division are contrived such that options of regular printing based on results of retrievals can be carried out, the labels described above with reference to FIGS. 6, 21, 22 can be formed through some of the options of regular printing.

As described above, in the example by the method (3), when predetermined two identifiers included in a plurality of types of identifiers are registered as a first identifier (the above identifier of "1st Sect. of Development Dept.", for instance) and a second identifier (the above identifier of "Sect. Chief", for instance), and regular character string groups corresponding to the first and second identifiers are set to a first regular character string group and a second regular character string group, respectively, at least one (the above "Yamada Taro", for instance) of the related character strings of the second regular character string group is included in the related character strings of the first regular character string group, as a common related character string, so that this common related character string can be retrieved based on the first identifier as well as based on the second identifier.

It should be noted that in the above case, it is also possible to set all the related character strings of the second regular character string group to common related character strings. Further, as described hereinabove, when a representative character string is contained in the related character strings, the representative character string may be designated as a common representative character string. In this case, the representative character string may be set to a common representative character string, or a representative character string of only one of the first and second regular character string groups. When the representative character string is set to a common representative character string, related character strings related to the representative character string in a different manner (having different attributes from each other) are registered in the respective regular character string groups, and identifiers are selected discriminatively, whereby regular character strings accompanying the same representative regular character string can be discriminatively used. Further, in this case, if all the related character strings including the representative character string of the second regular character string group are set to common related character strings, the second regular character string group can be set to a subordinate regular character string group with respect to the first regular character string group as a superordinate regular character string group.

For instance, the character string "Yamada Taro" in the above-mentioned example is one of the regular character strings, and at the same time can be a representative character string. Therefore, if the above regular character string group corresponding to the identifier "1st Sect. of Development Dept." is regarded as the group of the names of the members of the section to which "Yamada Taro" belongs, and the above regular character string group corresponding the "Sect. Chief" is regarded as the group of members at the same rank of posts as that of "Yamada Taro", "Yamada Taro" is a common representative character string, and related character strings related to the representative character string in a different manner (e.g. having different attributes from each other) are registered in the respective regular character string groups. Hence, by discriminating the identifier of "1st Sect. of Development Dept." and the identifier of "Chief" from each other in selection, regular character strings accompanying the same representative character string "Yamada Taro" can be discriminatively used. Further, for instance, the above regular character string group corresponding to the identifier "1st Sect. of Development Dept." corresponds to a superordinate regular character string group with respect to the regular character string group corresponding to the identifier "Development Dept.". Further, in this example as well, by setting "Yamada Taro" to a common representative character string, the former group can be understood as a group of the names of the members of the section to which "Yamada Taro" belongs, while the latter group can be understood as a group of the names of the members of the department to which "Yamada Taro" belongs. Furthermore, it is also possible to grasp the former group as a group of the names of the members of the section to which "Yamada Taro" belongs, and the latter group as a group of the names of the department members, which includes "Yamada Taro" as a common character string and the "Development Dept." as a representative character string thereof.

In the above (3) example, each of the related character strings is registered in the form of matrix data which can be retrieved by any of predetermined multi-dimensional retrieving conditions including the first identifier and the second identifier, so that it becomes easy to carry out registration and retrieval based on identifiers, such as the first identifier, the second identifier and the like. Particularly, common related character strings are registered in the form of data which can be retrieved based on either of the first identifier and the second identifier as retrieving conditions, so that any of them can be registered and retrieved more easily as related characters which simultaneously satisfies the retrieving conditions of the first and second identifiers.

Figure 23:
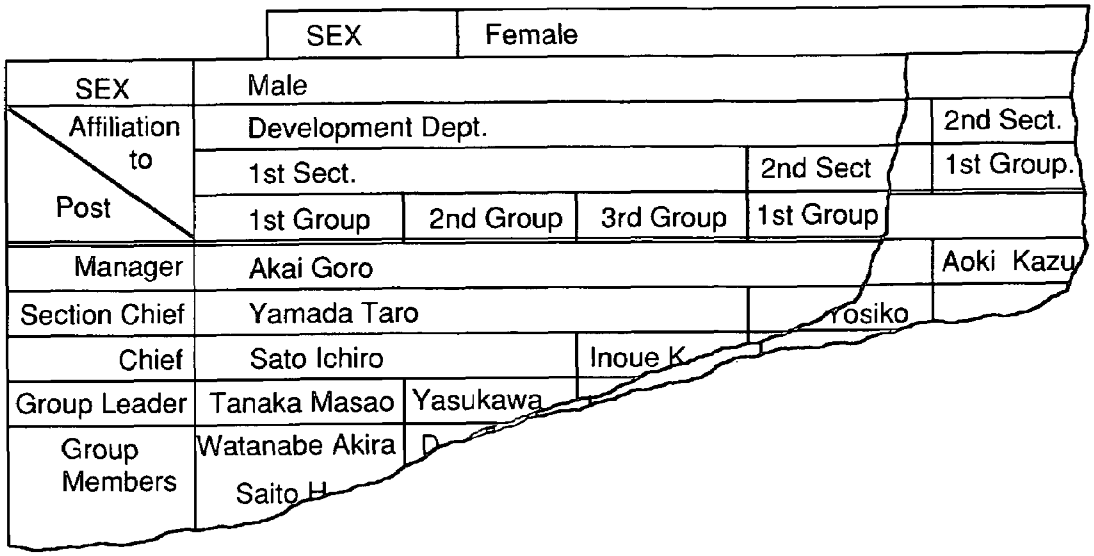
FIG. 23 is a diagram showing an example of a registration format for registering a regular character string group including regular character strings for use in regular printing.

Now, the same advantageous effects as provided by each of the examples of regular printing by the method (3) can be obtained by adopting a registration/retrieval method which uses a list (or a table) of predetermined attribute information. This is the above-mentioned method (4) of registering/retrieving related characters. For instance, as shown in FIG. 23 (method (3)), if the name of each employee as an option to be selected for regular printing is registered (stored) in the form of matrix data of options (affiliation, post, and sex) to be selected for the same regular printing, it becomes possible to carry out regular printing in the same number as described as to the above examples. Instead, e.g. as shown in FIG. 24 (method (4)), also when attributes (affiliation, post, sex) of each employee are added to the list of the employees' names for registration (recording), it becomes possible to carry out the same regular printing. That is, in the method (4), a regular character string group is registered in the form of a list of data permitting character strings related to an identifier to be retrieved by using the identifier as a retrieving condition. This makes it easy to carry out registration and retrieval of character strings. Particularly, it becomes easy to continuously register and retrieve a plurality of related character strings corresponding to one identifier.

It should be noted that FIG. 24A and FIG. 24B are distinguished from each other by whether or not items of affiliation as attribute information are hierarchically specified. As other examples of the list, the attributes (attribute information) of "Tanaka Masao" designated by Registration Number (REGISTRATION No.) 8 may be compactly represented as "Development Dept.-1st-Sect.-1st Group-Group Leader", or for purposes of convenience of retrieval or the like described hereinafter, items may be separated from each other by inserting blanks (spaces) therebetween, as "Development Dept. 1st Sect. 1st Group Group leader". Further, for instance, although in FIG. 24A, "Group" of "Sato Ichiro" at REGISTRATION No. 6 has an entry of "1st 2nd", showing that Mr. "Sato", Chief, is in charge of a first group (1st G.) and a second group (2nd G.), this is not limitative, but similarly to FIG. 24B, a character string "1st Sect. (1st, 2nd)" may be shown in the column of "Sect." (section) in FIG. 24A. Alternatively, a character string Chief (1st, 2nd), for instance, may be shown in the column of "Post".

In the following, an example of regular printing in a case in which representative character strings and related character strings related thereto, as shown in FIG. 23 (registration example by method (3)) or FIG. 24 (registration example by method (4)), will be described.

For instance, assuming that representative and related character strings are registered as shown in FIG. 23, if the option "NAME PRNT" described above with reference to FIG. 9 is selected (instructed) by selecting a character string of a desired name ("Yamada Taro" for instance) for regular printing from the options of all the character strings of names (or identifiers, such as numbers or the like, added to the names), such as "Akai Goro", "Yamada Taro" and the like, arranged in the form of the matrix data shown in FIG. 23, it is possible to form a label bearing the desired name (see FIG. 6A). Of course, after one of options of affiliation is selected at a level hierarchically immediately under the option of "NAME PRNT", names may be selected (instructed). On the other hand, FIGS. 24A and 24B actually show an example in which representative and related character strings are registered according to the example illustrated in FIG. 9, and if the character string of a name as a representative character string (or REGISTRATION No. as an identifier of the character string) is selected and printed, a name label can be formed similarly to the case of FIG. 9.

Further, it is also possible to set regular printing, such as "AFFL PRNT" (affiliation printing), or in a more specific form, "SCT NAME PRNT" (section name printing), "G NAME PRNT" (group name printing) and the like. When representative and related character strings are registered as shown in FIG. 23, if regular printing thereof is instructed, character strings representative of affiliation are represented as options as they are or in a hierarchical manner. More specifically, for instance, by directly selecting e.g. an option "1st Group 1st Sect. Development Dept.", or alternatively by selecting, for instance, options "Development Dept.", "1st Sect." and "1st Group" sequentially and hierarchically, it is possible to print a group name, such as "1st Group 1st Sect. Development Dept.", to thereby form a label (group name label) printed with the group name (see FIG. 6B as to a label (section name label) printed with up to a section name). On the other hand, when representative and related character strings are registered as shown in FIG. 24B, if regular printing thereof is instructed, character strings registered as attributes of affiliation, more specifically, "Development Dept.", "1st Sect. Development Dept.", "1st Group 1st Sect. Development Dept." and so forth become options. Needless to say, in this case as well, if configured in advance, only the department name can be printed, or it is possible to print up to the section name or up to the group name. Further, the apparatus may be configured such that any of such names can be selected, or names of departments, sections, groups and so forth can be hierarchically selected.

In both of the case of FIG. 23 and the case of FIG. 24A, if, in "CRCL PRNT", an option "ONLY SECTION NAME" or "ONLY GROUP NAME" can be made selectable, and the option "1st Sect." or "1st Group" is selected for carrying out regular printing such tat a character string "CIRCULATE WITHIN" is printed immediately before the section name or group name, and such that a character string" (SHRED & DISCARD AFTER CIRCULATION)" is printed immediately under the character string "CIRCULATE WITHIN 1st Group", for instance, it is also possible to form a circulation-instructing label shown in FIG. 6C. Further, in "CRCL PRNT", if it is possible to select an option of affiliation, such as "1st Sect. Development Dept." or the like (representative character string), and retrieve corresponding names (circular-destination personal names) for printing, a circular-destination name label as shown in FIG. 6D can be formed. Further, after an option or specific name of affiliation i.e. an attribute in this classification has been selected, a desired personal name may be selected from one or more names (personal names) corresponding to (retrieved based on) the option at a level hierarchically immediately under the option.

Next, in the "DSTNPRNT" described above with reference to FIGS. 6E and 7, after a specific name of affiliation as a destination has been selected first (from options), a desired personal name may be selected from one or more personal names (retrieved) corresponding to the specific name of affiliation for printing the same. Alternatively, after selecting an addressee's personal name from options first, the specific name of affiliation of the person may be (retrieved) added to the personal name for printing. From the viewpoint of ease of retrieval, the former is relatively advantageous when data are registered as shown in FIG. 23, whereas when data are registered as shown in FIG. 24, the latter is relatively advantageous. Further, the same applies to the "SNDR PRNT" described above with reference to FIGS. 6E and 7 and the "APPRVL PRNT" (printing for forming an approval label) described above with reference to FIGS. 6F and 21C. In short, in the case of FIG. 23 and in the case of FIG. 24A or 24B, regular printing can be similarly carried out, and at the same time which method is more advantageous depends on a selection/retrieval method (order of selection/retrieval and the like) of selecting/retrieving character strings to be printed.

Here, for instance, when from a character string group whose character strings having the same attribute concerning e.g. affiliation, in each of the above examples, one or more character strings having the same attribute are retrieved for selecting one for printing, if data (character strings) are registered in the form of multi-dimensional matrix data with character strings representative of respective attribute for use as retrieving conditions, as if the character strings representative of the respective attributes correspond to indexes (suffixes or the like: for instance, [i, j, k], where i represents any x, j represents any y, and k represents any z)) of an array (F[x,y,z], for instance), it is easier to carry out retrieval by using any of retrieval character strings representative of the respective attributes, and hence this registration method in relatively advantageous. On the other hand, when there is a regular character string which is likely to be printed, such as the character string "NAME" in each of the above examples, and printed together with one or more predetermined or desired ones of character strings related therewith, if character strings are registered in the form of a list of data arranged with reference to the regular character string as a representative character string, it becomes easier to carry out retrieval when the representative regular character string is selected, which makes the registration method relatively advantageous.

In other words, the former registration methods corresponds to the method (3), and the latter registration methods corresponds to the method (4). Here, if there is no difference between them except that a predetermined representative character string is defined, that is, if both the representative character string and related character strings become options (retrieving conditions) for regular printing, the list of data used by the method (4) as well can be a two-dimensional (multi-dimensional) matrix data to be retrieved under the retrieving conditions, which means that in this case the method (4) can be regarded (understood) as one kind of the method (3). Further, in the method (3), if it is possible to select one option constructed by mixing hierarchically different levels of affiliation, post, and sex, for instance, more specifically, if a character string "1st Sect. Development Dept. Group Leader Female" and the like can be selected as one option, by setting the character string to a representative character string indicative of "Affiliation, Post, Sex", and registering the character string "NAME" as a related character string corresponding thereto (setting the same as a related character string having an attribute of "NAME"), registration and retrieval effected by the method (3) can be carried out by the method (4).

Further, when none of related character strings related to the predetermined representative character string are selected as options (retrieving conditions) for regular printing, the list of data used by the method (4) is not in the form of a two-dimensional (multi-dimensional) matrix data to be retrieved under the retrieving conditions, so that the method (3) can not be applied to the list of data, and hence the data is inevitably registered and retrieved by the method (4). Further, when there are a lot of types of (related character strings representative of) attributes corresponding to the predetermined representative character string, if most of the related character strings are designated as options (retrieving conditions) for regular printing, a matrix for registering them becomes complicated, whereas also when most of the related character strings are not selected as options (retrieving conditions) for regular printing, there is less reason for registering the related character strings in the form of a matrix. Consequently, when there are a lot of types of (related character strings representative of) attributes corresponding to the predetermined representative character string, the method (4) becomes relatively advantageous.

Here, if registration methods illustrated in FIGS. 23 and 24A, 24B are compared with reference to each example described above, in FIGS. 6B to 6D, FIGS. 21A to 21B, FIG. 22, etc., regular printing is carried out based on predetermined and distinct attributes, such as affiliation, post and the like, and hence it is advantageous to adopt the FIG. 23 method. Further, in carrying out the "DSTN PRNT" and the "SNDR PRNT" in FIGS. 6E and 7, or the "APPRVL PRNT" in FIGS. 6F and 21C, the two methods provide the same advantageous effects, and as described above, which method is more advantageous depends on a selection/retrieval method (order of selection/retrieval and the like) of selecting/retrieving character strings to be printed.

It should be noted that although in the above examples, use of the tape printing apparatus 1 in offices is mainly shown, this is not limitative, but as described above, examples of use in other circumstances can be shown. For instance, although in the above example of use by a school teacher, it is assumed that a personal name is entered as an arbitrary character string after the regular character string "NAME" is printed through regular printing, or that a list of names is prepared in advance to automatically insert a personal name after the character string "NAME", this is not limitative, but even by registering personal names in advance in the same manner as shown in FIGS. 23, 24A or 24B, it is possible to print the character string "NAME: John" or the like, as described above, as well as form a label bearing the same with ease.

Further, when a teacher who is in charge of a plurality of classes or grades as to a subject affixes name labels of students to the same text book or the like, it is possible to select an entry in affiliation (Class ◇ of ○ GRADE) as an attribute first, and select all or part of the names (personal names) of students corresponding to the entry in the "Affiliation". In this case, for instance, by repeatedly printing a character string "Class 1 of 1st Grade" and then a personal name by sequentially changing the personal name from one to another, it is possible to easily form labels printed e.g. with "Class 1 of 1st Grade Miss Lucy Smith", "Class 1 of 1st Grade Mr. John Miller", and so forth, respectively. Further, if it is required to form name labels for another class, the name of the class can be selected in succession to thereby print the names of the students of the class in the same fashion. Further, in the above case, if a sex can be selected as an attribute, it becomes possible to easily distinguish "Mr." and "Miss" to print one of them before each personal name. Further, this also makes it possible to easily print name labels only for boy students or only for girl students. Of course, it is also possible to easily print name labels, for instance, only for boy students in "Class 1 of 1st Grade" by combining the entry in "Affiliation" (Class 1 of 1st GRADE) and sex (male).

Inversely, when a parent having a plurality of children forms name labels for his children, after selecting the names of the children first, attributes required at the time point may be selected. For instance, assuming that the "Tanaka" family has children whose names are "Taro", "Jiro" and "Hanako", labels bearing "Taro", "Kawakami Taro", "Kawakami Taro of Class 1 of 1st Grade", "Kawakami Taro of Class 1 of 1st Grade ◎◎ Primary School", "Kawakami Taro of Class 1 of 1st Grade ◎◎ Municipal Primary School ☆☆ City", "Kawakami Taro ◎◎ Primary School", etc. may be formed by selecting one or more attributes when name labels printed with the name "Taro" are formed. Alternatively, they can form a label printed with "Kawakami Taro XX House No. □□ Town ○○ City ΔΔ Pref." and so forth. In this case, family name "Kawakami", class/grade "Class 1 of 1st Grade", school name "◎◎ Primary School", school attribute "Municipal . . . ☆☆ City", address "XX House No.

□□ Town ○○ City ΔΔ Pref." are all attribute information (related character string) of "Taro" (representative character string).

In the above examples in which the tape printing apparatus 1 is used in offices, it is often more advantageous in regular printing to retrieve character strings based on predetermined, distinct (and easily-generalized) attributes, such as "Affiliation", post and the like (in this sense, the above method (3) is more advantageous), so that in the following, description will be made of examples in which character strings are more easily retrieved if retrieval is carried out from the side of an individual character string, such as name or the like (in this sense, the above method (4) is more advantageous). First, in the "DSTN PRNT" and the "SNDR PRNT" in FIGS. 6E and 7, or the "APPRVL PRNT" in FIGS. 6F and 21C, for instance, a proportion between the side of affiliation indicative of general attributes, such as "Sect. Chief of 1st Sect. Development Dept.", and the side of "Name" indicative of an individual attribute, such as "Yamada Taro" is approximately equal. Consequently, from whichever side selection (retrieval) may be carried out, it does not make almost any difference in ease of selection (retrieval), but, e.g. when a department code, an office name, the address and phone numbers thereof and the like are desired to be added, the method (4) is comparatively advantageous since it is only required to register them as attributes of name (personal name), and retrieval can be performed more easily.

Further, examples of regular printing easily used at offices and families include address printing ("ADD PRNT") which is capable of printing a postal address (hereinafter referred to as "address") for forming an address label, phone number printing which is capable of printing a phone number for forming a phone number label usable as a memorandum of phone numbers, and the like. Therefore, in the following, these examples are described as a third embodiment. Although in the following description, the method (4), which is considered comparatively advantageous, is adopted as a registration/retrieval method, this method is considered to be one kind of the method (3), as described hereinabove, if attributes can be selected as options for regular printing.

First, registration of a regular character string group commonly used in the "ADD PRNT" (address printing) and the phone number printing (hereinafter referred to as "phone book printing", as required) will be described. Here, a representative character string is basically a character string indicative of "NAME", and a identifier is a registration number (REGISTRATION No.) corresponding to the representative character string. However, since it is obvious that the representative character string itself is a related character string related to the representative character string, the representative character string as well is dealt with as one of related character strings. As a result, all the entry/registration items shown in FIG. 25 become related character strings corresponding to "REGISTRATION No." (identifier). Further, in the following, when "NAME" has no entry, "FIRM" (firm name) is dealt with as the representative character string instead. Further, in the following description of the manner of registration, as shown in FIG. 25, it is assumed that all the items (all the related character strings) are entered (registered) in REGISTRATION No. "2".

In this example, when the representative character string is a character string representative of a "NAME" (which means in the illustrated example "personal name") or a "FIRM" (which means in the illustrated example "firm name" including organization name; generically referred to "appellation" in claims appended hereto), as shown in the figure, if character strings (in the illustrated example, "RESIDENCE" "PSTL CODE (postal code)", "BARCODE") indicative of an address concerning the "NAME" or the "FIRM" are included in the related character strings, this regular character string group serves as a so-called "address book", and the related character strings indicative of the address are printed such that they accompany the representative character string representative of the name or the firm name, whereby a mailing address or the like can be printed with ease. Further, especially when at least one of a "PSTL CODE" and a "BARCODE" is included in the regular character string group, a mailing address and the like can be printed more easily. It should be noted that the term "BARCODE" is used here to indicate the numerical value information of the "CUSTOMER BARCODE" (see FIG. 34B) which is adopted in the new mail processing system put into effect from Feb. 2, 1998, in Japan, by the Japanese Government, and printed as part of a mailing address.

Further, similarly, when the representative character string is a character string representative of a "NAME" or a "FIRM", if character strings representative of phone numbers (in the illustrated example, "TEL1", "TEL2", etc,.) related to the "NAME" or the "FIRM" are included in the related character strings, this regular character string group serves as a so-called "PHONE BOOK". By printing the related character string representative of the phone number such that it accompanies the representative character string representative of the name or the firm name, the resulting print can be lightly used as a memorandum of phone numbers. Further, particularly as in this example, when a character string representative of an attribute of a phone number (here, "Home", "Cellular" and the like: in addition to these, "Home Ground Floor", "Office", "Representative", "Direct Dial", etc. are other examples) is added to the related character string representative of the phone number, the attribute or relevant feature of the phone number can be easily grasped, simply by printing the phone number having the attribute added thereto.

Figure 26:
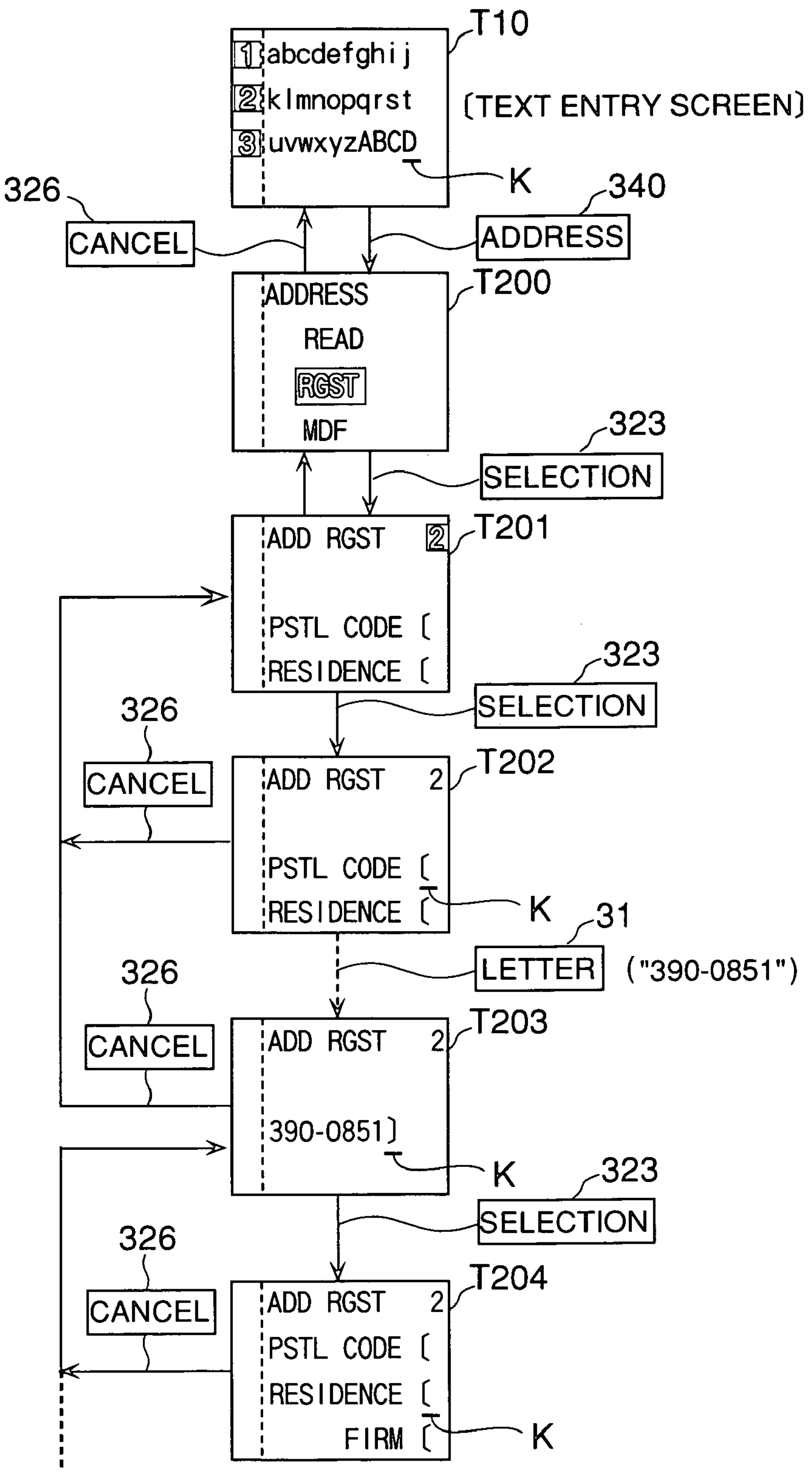
FIG. 26 is a diagram illustrating an example of images of the display screen and operations carried out on the screen when address registration is carried out in the case of the FIG. 25 example.

As shown in FIG. 26, in the state of the text entry screen displayed during editing of the character strings "abcde . . . zABCD" described hereinabove with reference to FIG. 9 and so forth, when an address key 340 is depressed by the user, an "ADDRESS" selection screen (menu screen under the heading of "ADDRESS") is displayed (T200). Although similarly to the case of the "CMMNT RGST" (comment registration) described above with reference to FIG. 10 and the like, and the "NAME RGST" (name registration) described above with reference to FIG. 13 and the like, an option "ADDRESS" is added to the options displayed on the "FILE" selection screen (T31 to T33) to which the display screen is switched by operating the file key 333, whereby the "ADDRESS" selection screen may be displayed in the same manner as the "COMMENT" selection screen (T35) in FIG. 10 or the like and the FIG. 13 "NAME" selection (T51), here, description is made assuming that an option "ADD PRNT" (address printing) described hereinafter as well can be selected by operating the address key 340.

More specifically, on the "ADDRESS" selection screen in FIG. 26, options, such as "READ", "RGST" (registration), "MDF" (modification), "PRNT", "DLT" (delete) and so forth, are displayed as options at a level hierarchically immediately under the option of "ADDRESS" (see T212 to T214 in FIG. 31) i.e. as options of the menu "ADDRESS", so that the user operates the cursor key 330 to highlight the option "RGST" (T200). When the selection key 323 is depressed in this state, an "ADD RGST" registration number selection screen is displayed (T201). On this selection screen as well, the user can highlight a desired registration number, such as "1", as a desired option by operating the cursor key 330, and select the same by operating the selection key 323. Here, it is assumed that another address has already be entered to the registration number "1", and a registration number selection screen for selecting a registration number "2", which is the smallest one of unregistered registration numbers, is displayed (T201). When the selection key 323 is depressed in this state, a character string registration screen corresponding to the registration area of the registration number "2" is displayed (T202).

On the above "ADD RGST" character string registration screen (T202) as well, similarly to the case of the above "CMMNT RGST" and "NAME RGST", a message is displayed to prompt the user to enter a desired character string. In the case of "ADD RGST", as shown in the figure, first, a character string and a bracket "PSTL CODE [" are displayed to prompt the user to enter a first entry/registration item, and the cursor K is placed under the bracket "[", such that desired characters can be entered immediately after (on the right side of) the bracket "[" via the keyboard 3. Therefore, by operating the character key group 31 from this state (T202), the user can enter a character string of a postal code "390-0851", for instance, shown in FIG. 25, (T203: commonly shown in FIG. 27). Deletion or the like effected by using the cancel key 326 is carried out in the same manner as described hereinbefore. Further, a key entry made by the selection key 323 after entering one or more characters also serves in the same manner as described above. However, a postal code is entered here, and when an attempt is made to enter a numeral over 7 digits or characters other than numerals, a weak (soft) warning is given by generating a voice alarm, such as a beep sound, or flashing the whole display screen on and off for a predetermined time period. When the selection key 323 is depressed without entering any characters, the character string entered is finally determined as the character string of the "PSTL CODE" to be registered, and then the user is prompted to enter a character string of "RESIDENCE" by the cursor K (T204: commonly shown in FIGS. 26, 27).

Figure 27:
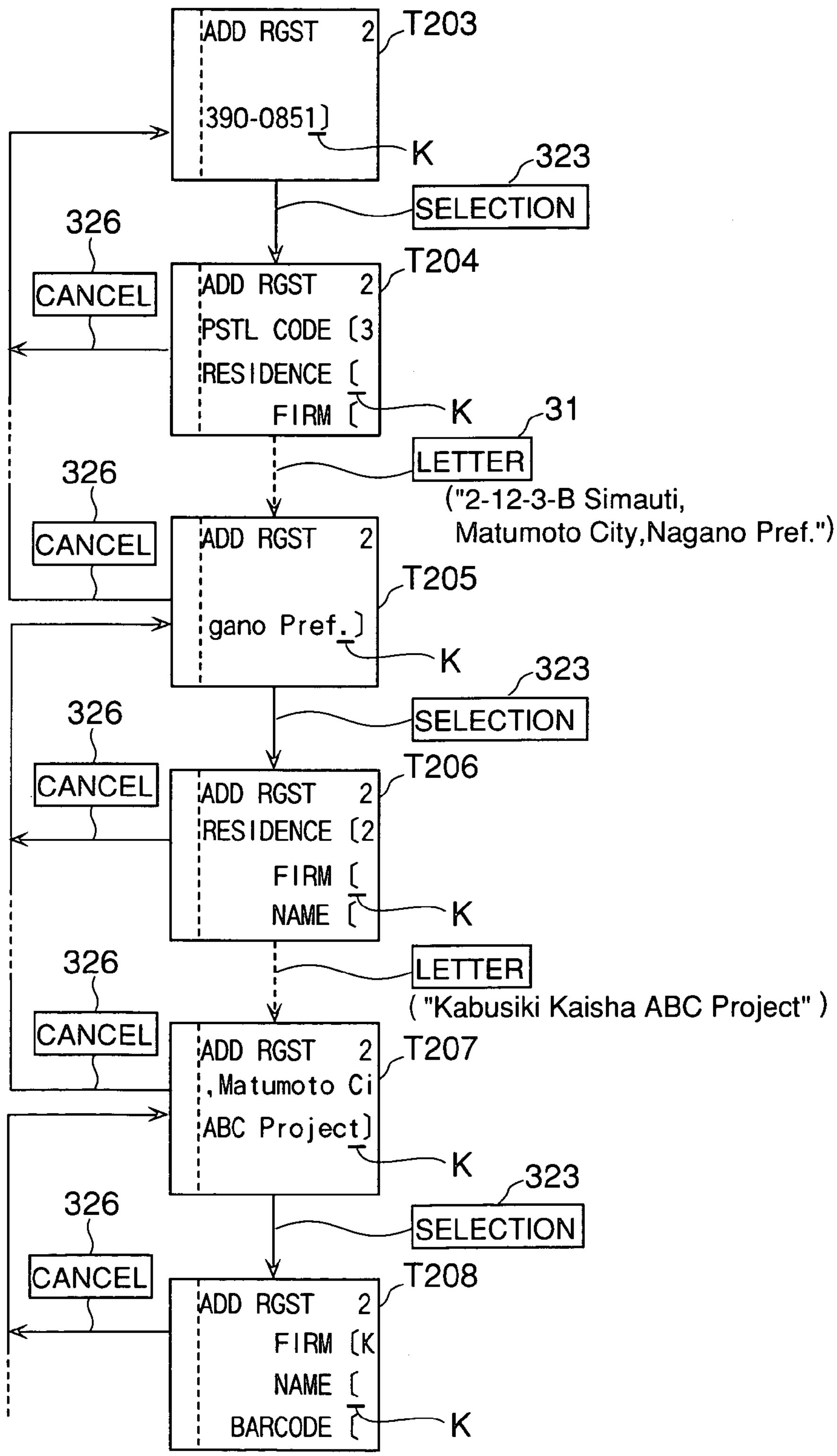
FIG. 27 is a continuation of FIG. 26.
Figure 28:
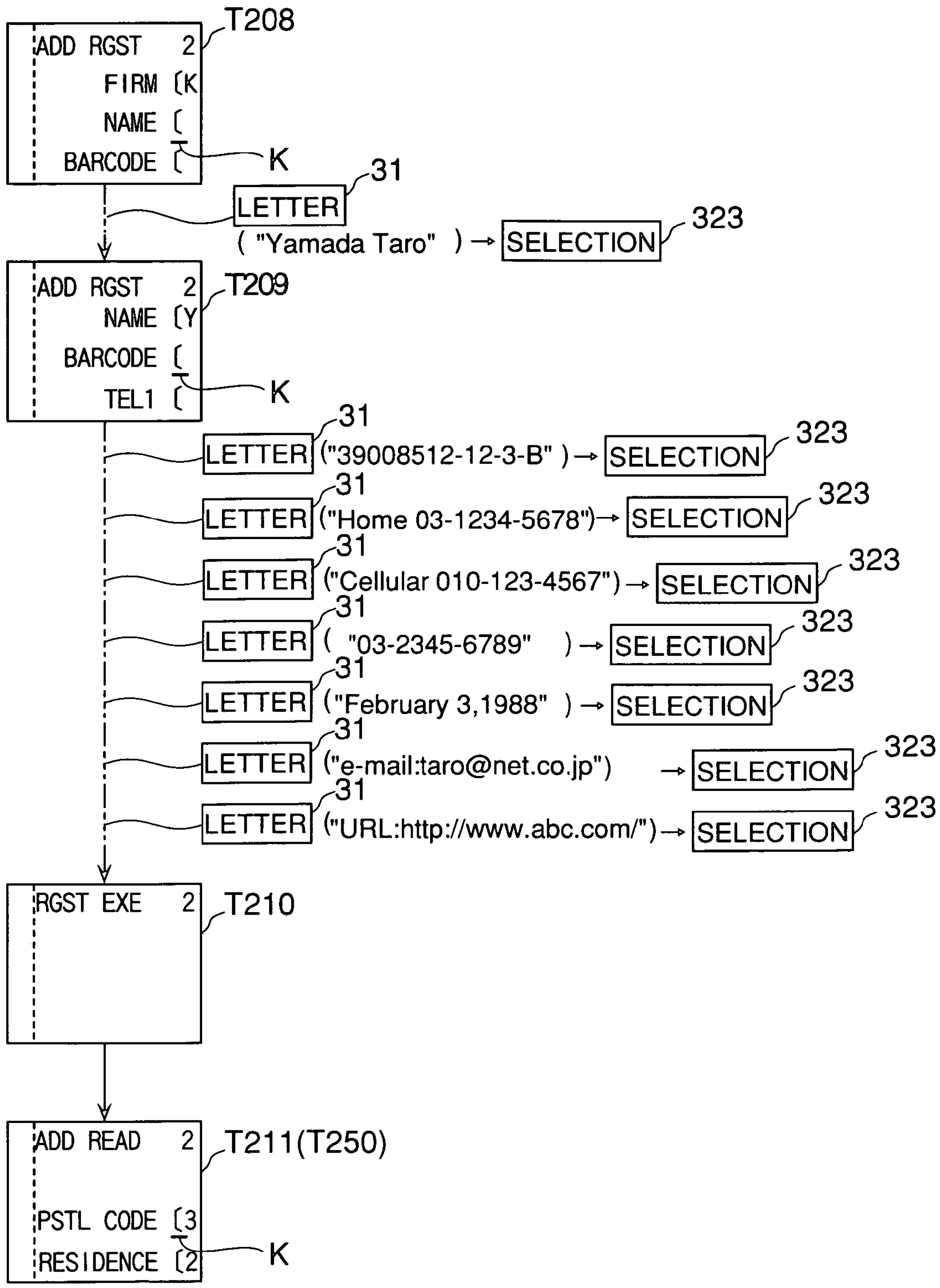
FIG. 28 is a continuation of FIG. 27.

Referring to FIG. 27, after the character key group 31 is operated by the user from the above state (T204), a character string (address) "2-12-3-B Shimauti, Matumoto City, Nagano Pref." (see FIG. 25), for instance, is entered (T205), and when the selection key 323 is depressed, the user is prompted to enter a character string of "FIRM" (firm name) by the cursor K (T206). Next, when the character key group 31 is operated by the user from this state (T205), a character string (corporate name) "Kabushiki Kaisha ABC Project" (see FIG. 25), for instance, is entered (T207), and when the selection key 323 is depressed, the user is prompted to enter a character string of "NAME" by the cursor K (T208: commonly shown in FIGS. 27, 28). As shown in FIG. 28, after the character key group 31 is operated by the user from the above state (T208), a character string (name) "Yamada Taro" (see FIG. 25), for instance, is entered, and when the selection key 323 is depressed, the user is prompted to enter a character string of "BARCODE" (numerical value information of customer barcode) by the cursor K (T209).

Similarly, next, after the character key group 31 is operated by the user from the above state (T209), the character string (postal code: where the hyphen "-" thereof is omitted to form the postal number into barcode numerical value information) "3900851" and continuously the character code (address display number) "2-12-3-B" (see FIG. 25) are entered, and when the selection key 323 is depressed, the user is prompted to enter "TEL1" (phone number 1) by the cursor K (T209). In the following, similarly, after the character key group 31 is operated by the user, a character string (TEL1) "Home03-1234-5678", for instance, is entered, and when the selection key 323 is depressed, the user is prompted to enter "TEL2" (phone number 2) by the cursor K (T209). After a character string (TEL2) "Cellular 010-123-4567" is entered and the selection key 323 is depressed, the user is prompted to enter "FAX" (facsimile number). After a character string (FAX) "03-2345-6789" is entered and the selection key 323 is depressed, the user is prompted to enter "BIRTHDAY". After a character string (birthday) "Feb. 3, 1998' is entered and the selection key 323 is depressed, the user is prompted to enter MEMO1". After a character string (MEMO1) "e-mail: taro@net.co.jp/" is entered and the selection key 323 is depressed, the user is prompted to enter "MEMO2".

Figure 29:
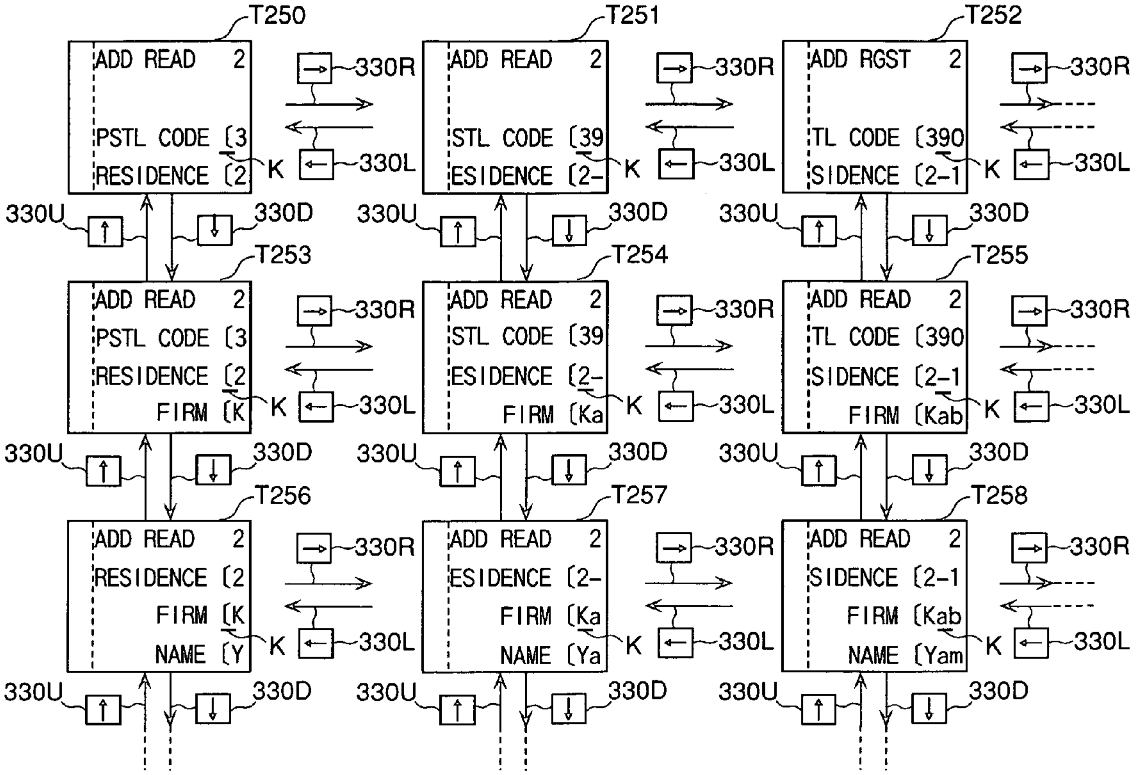
FIG. 29 is a diagram illustrating an example of images of a display screen and operations carried out on the screen, when registered contents shown in the FIG. 25 example are read as an example of address reading.
Figure 31:
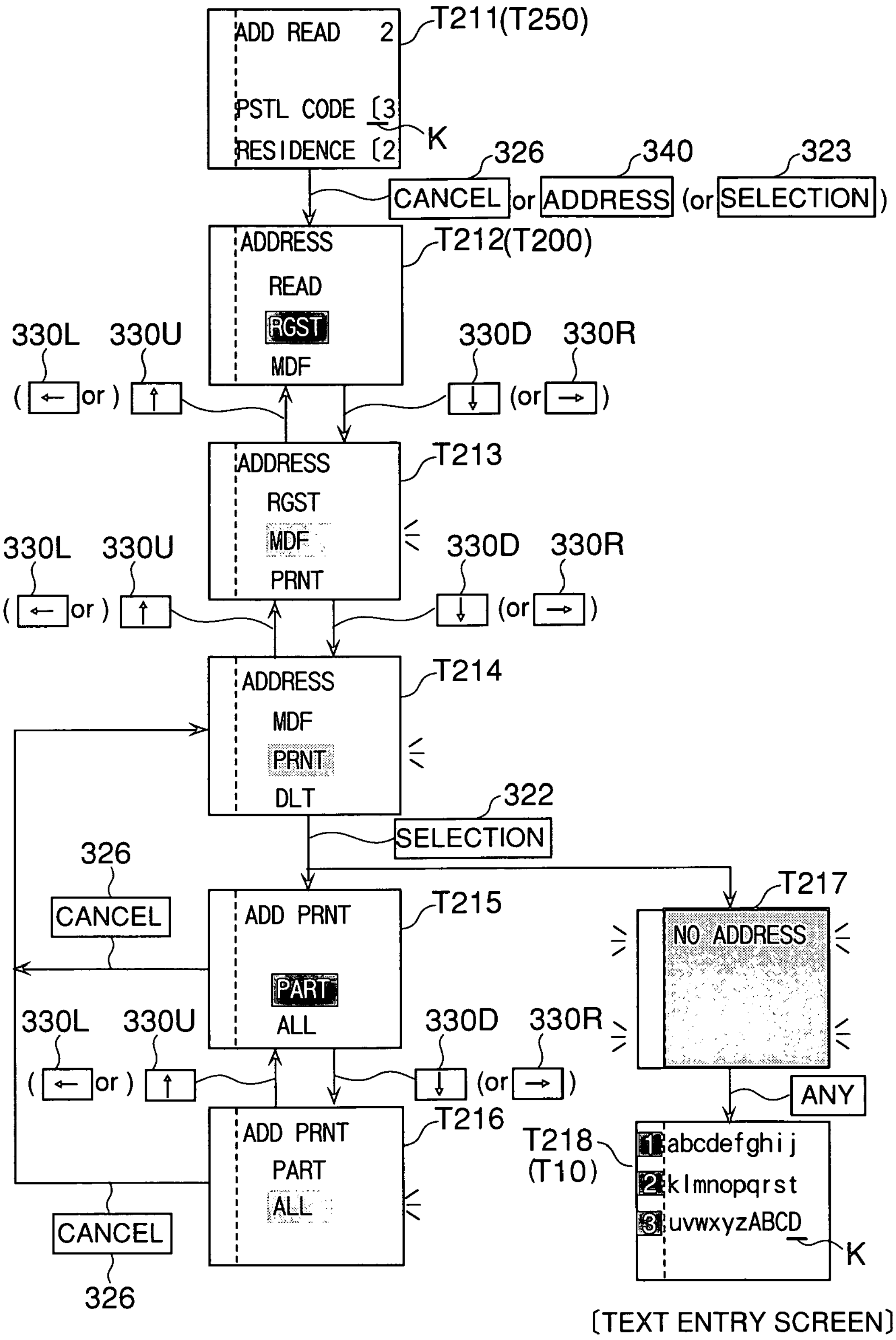
FIG. 31 is a diagram illustrating an example of images of the display screen and operations carried out on the screen when address printing is carried out as regular printing.

From the state of entry of "MEMO2" being prompted, after the character key group 31 is operated by the user, a character string (MEMO2) "URL: http://www.abc.com", for instance, is entered, and when the selection key 323 is depressed, the whole entry process of the address registration has been terminated to execute the registration, and a message for notifying the user of the fact is displayed (T210). After the registration has been terminated, a confirmation screen (address reading screen) for confirming registered address information (character strings corresponding to the respective entry/registration items shown in FIG. 25) is displayed (T211: commonly shown in FIGS. 28, 31). In this state, similarly to the address reading screen appearing in FIG. 29, the user operates the cursor key 330 and scrolls the display screen to thereby confirm all the address information. After terminating the confirmation (reading), as shown in FIG. 31, by operating a predetermined key, such as the cancel key 326 or the like, the user can change the confirmation screen to the selection screen at the level hierarchically immediately above the confirmation screen (T212).

Figure 32:
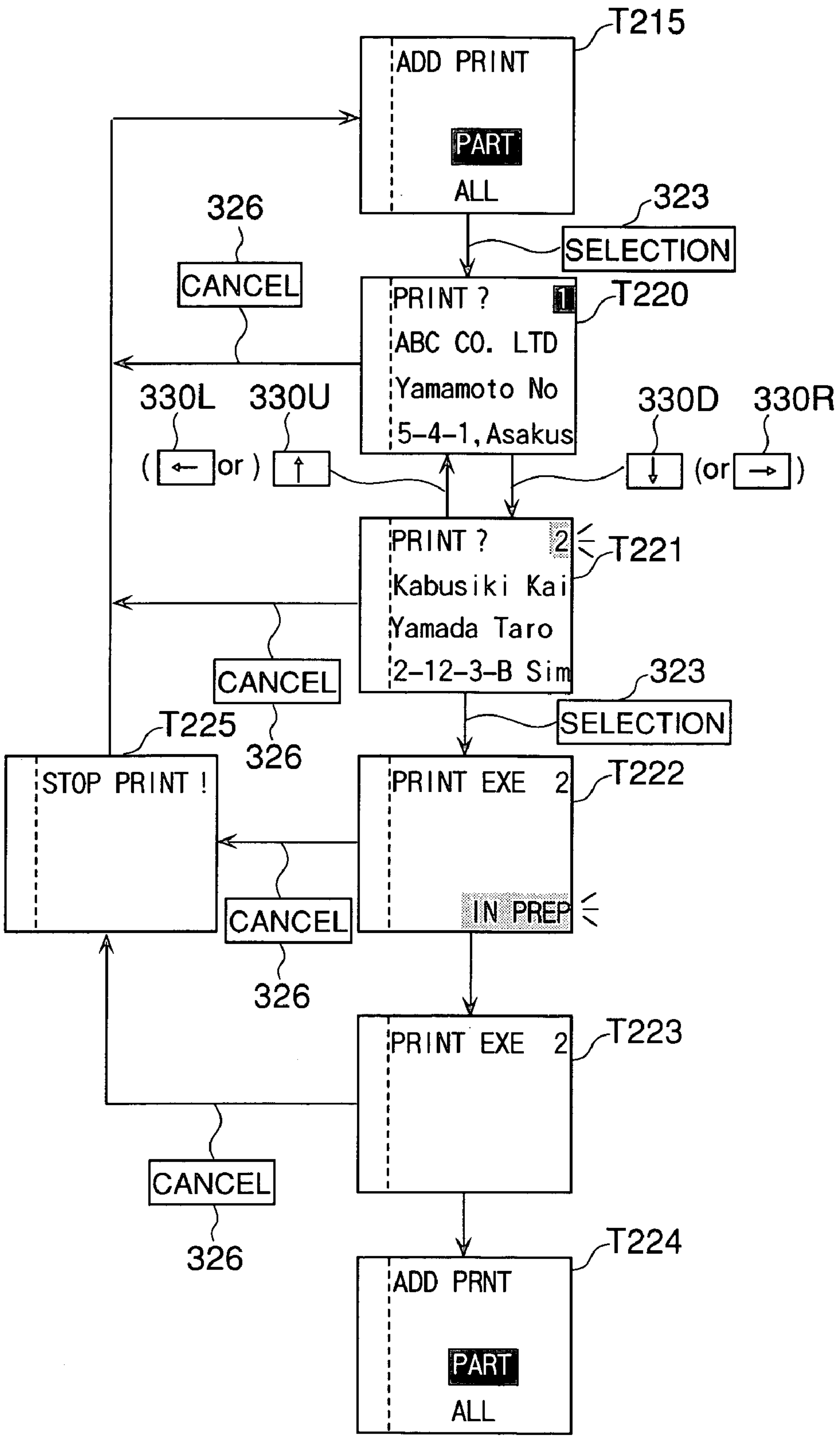
FIG. 32 is a continuation of FIG. 31.

Since the above address information confirmation screen (T211) is a screen for confirming results of the "ADD RGST", "ADD RGST" may be continuously used for the indication of the selection screen (menu screen), but the function of confirmation (reading) on this screen is quite the same as that of reading addresses (address reading ("ADD READ")), and moreover the function of the "ADD READ" is also employed in phone book printing, described hereinafter, and hence for purposes of helping simplify the following description, as shown in FIG. 28 or 32, in the present embodiment, "ADD READ" is displayed on the above address information confirmation screen (T211). Here, processing operations responsive to key operations in the state of the "ADD READ" screen being displayed are defined as shown in FIG. 30 (in a row of [ADDRESS]/[PHONE BOOK] under the heading of "EFFECTIVE KEY(S)" in FIG. 30, the address key 340 is an effective key for instructing via the "ADDRESS" selection screen, whereas for instructing via a "PHONE BOOK" selection screen, described hereinafter, a phone book key 341 is an effective key)

Further, although in the present embodiment, as described above, the confirmation screen for confirming registered address information is displayed (T211) after the "ADD RGST" (address reading) is terminated, and the confirmation screen is switched to the selection screen at the upper level in hierarchy, when the cancel key 326 or the address key 340 (or the selection key 323 used in a case of the cursor K being placed at the lowest line: see FIG. 30) is operated, this is not limitative, but the confirmation screen may be switched (returned) to the selection screen at the upper level in hierarchy upon completion of the registration processing, or alternatively the confirmation screen may be directly switched (returned) to the text entry screen (T10 in FIG. 26 and so forth).

In the present embodiment, however, the confirmation screen (T211) is displayed, thereby enabling the address information to be confirmed immediately after the registration, and further the confirmation screen is switched (returned) to the "ADDRESS" selection screen (T212: the same as T200 in FIG. 26) hierarchically immediately above the same, so that when the address information is desired to be modified or corrected, an option "MDF" (on this screen, it means ADD MDF (address modification)) can be selected to select a registration number of address information to be modified corrected, in the same manner as described above in the "ADD RGST" (only registration numbers already registered can be used as options), and then similarly to the case of the above confirmation screen being displayed (T211: the same as T250 in FIG. 29), the display screen is scrolled by operating the cursor key 330 to specify a portion to be modified by the cursor K, thereby permitting the portion to be modified. Further, when address information is desired to be confirmed or checked again, the option "ADD READ" is selected (more specifically, the option "READ" is selected from the "ADDRESS" selection screen), and after selecting a registration number of address information to be modified (only registration numbers already registered can be options), the cursor key 330 is operated to scroll the display screen, whereby confirmation can be carried out. Further, when address printing is desired to be performed immediately after terminating the confirmation, address printing can be carried out by selecting the option "ADD PRNT" (more specifically by selecting the option "PRNT" from the "ADDRESS" selection screen) described hereinbelow, and selecting all or part of address information already registered selected by selecting corresponding registration numbers of information (only registration numbers already registered can be options).

Next, the "ADD PRNT" (address printing) will be described. For instance, as shown in FIG. 31, in the above state of the confirmation screen being displayed after termination of the "ADD RGST" (address registration), when the selection key 323, the cancel key 326 or the address key 340 is operated (or similarly to the case of FIG. 26, when the address key 340 is depressed by the user in the state of the text entry screen being displayed), the "ADDRESS" selection screen is displayed (T212: the same as T200 in FIG. 26). In this state (T212), options, such as "READ", "RGST", "MDF", "PRNT", "DLT" and so forth, are displayed as options at the level hierarchically immediately under the option of "ADDRESS" (T212 to T214), so that the user operates the cursor key 330 to highlight the option "PRNT" (T214). When the selection key 323 is depressed in this state, the option "PRNT" ("ADD PRNT") is selected and the screen is switched to a selection screen of "ADD PRNT" for selecting an object to be printed by "ADD PRNT" (T215).

As shown in FIG. 31, however, when the "ADD PRNT" processing is started, first, it is determined whether or not there is data (address data) registered by address registration. If there is not any registered data, a message notifying the user of the fact is displayed (T217). In this state, by depressing any key (hereinafter referred to as the "any key"), the user can terminate the processing to return the display screen to the text entry screen (T218: the same as T10 in FIG. 26 and the like). It should be noted that in this case, the screen may be returned to the state of the option "PRNT" being highlighted for selection on the "ADDRESS" selection screen (T214) such that the above "ADD RGST" can be carried out with ease after termination of the above processing.

On the other hand, if registered data exists, and in the state of the selection screen of "ADD PRNT" for selecting an object to be printed being displayed (T215: commonly shown in FIGS. 31, 32), by operating the cursor key 330, the user can highlight a desired option ("PART" or "ALL" is selected in this example) (T215 to T216), and operate the selection key 323 for selection. Here, when the option "ALL" is selected by the user, address printing is carried out to print all the registered address data sequentially in the order of registration numbers. In this example, however, for purposes of ease of understanding, it is assumed that the option "PART" is selected.

In this case, as shown in FIG. 32, when the selection key 323 is depressed in the state of the option "PART" being highlighted for selection (T215), the screen is switched to a selection screen for selecting an object to be printed, which is hierarchically immediately under the option of "PART" (T220). On this selection screen as well, the user can highlight only registration number as a desired option by operating the cursor key 330, and select the same by operating the selection key 323 (T220 TO T221). It should be noted that in this example, the order of display is different from the order of the above entry/registration items of the "ADD RGST" (see FIG. 25) in that the items are displayed in the order of "FIRM" (firm name), "NAME" (personal name), and "RESIDENCE". In this case, of course, the items may be displayed in the same order as that of the entry/registration, that is, in the order of "RESIDENCE", "FIRM", "NAME" or in still another order, but it is assumed here that "NAME" is arranged in a central portion such that it can be viewed most easily, and "FIRM" is arranged such that it can be viewed second most easily.

As described above, in the address printing, registration numbers registered by the address registration are used as identifiers, and a plurality of types of identifiers (different numbers) corresponding to a plurality of types of regular character strings (different regular character strings) (in this example, regular character string groups having the regular character strings as representative character strings) are displayed on the display screen (predetermined display screen) 41, for selecting any of the identifiers. In this case, similarly to the above registration numbers and the like, identifiers are only required to permit discrimination between regular character strings (and regular character string groups including the regular character strings) from each other based on displayed contents of the display screen, and hence a small-sized display screen will suffice. Further, in this case as well, similarly to the regular printing process and the registration process required therefor, described above with reference to FIG. 9, etc., the present state-saving process (S21), and the tape type-obtaining process (S22), described above with reference to FIG. 8, are carried out immediately after depression of the address key 340 which is a key associated with regular printing, and after termination of the printing process (S25), the preset state-restoring process (S26) is carried out. Therefore, even when the display screen is used to display the identifiers, it is possible to return the display screen to the state of the screen being displayed before the identifiers are displayed, whereby even if the user carries out the "ADD PRNT" (address printing) (or the above-mentioned address registration or phone book printing referred to hereinafter) in the course of editing a character string other than a regular character string on the display screen, it is possible to easily restore the display screen to the state of the screen being displayed during the editing operation. Further, in this case as well, if text data of the character string being edited is stored, it is only required to store a flag or the like for causing the display image to be formed again from the text data, as display-restoring information, which saves the capacity of the memory device.

Next, for instance, when the selection key is depressed by the user in a state of the selection screen (T221) immediately under the hierarchical level of the registration number “2”, which is registered by the above “ADD RGST” (address registration), the address information of the registration number “2” is selected for printing, and a message “PRINT EXE 2” (printing execution 2) meaning execution of the address information of registration number “2” is displayed together with a message “IN PREP” indicating preparation of a print image. The print image to be printed by the “ADD PRNT” is thus formed (T222). After forming the image, the message “IN PREP” is turned off and the address printing is carried out on the tape T. After the printing is terminated, the printed portion of the tape T is cut off and an address label is formed (T223). After termination of the printing, the screen is switched to the selection screen at the upper level in hierarchy (T224: the same as T215). Here, processing operations responsive to respective key operations carried out when the “IN PREP” is displayed (T222) or when the “PRINT EXE” being displayed (T223) without the “IN PREP” are defined as shown in FIG. 33 (in FIG. 33, “SELECTION SCREEN OF ADDRESS PRINTING” at “2.” of the box in the row of “CANCEL” under the heading of “KEY OPERATION DURING PREPARATION” and “4.” of the box in the row of “CANCEL” under the heading of “KEY OPERATION DURING PRINTING” means the “PART/ALL” selection screen (T215 or the like). The following “PRECEDING PHONE BOOK SCREEN” is related to phone book printing, described hereinafter).

It should be noted that as shown in FIG. 34A, the items (i.e. related character strings) of images to be printed in this case are defined as “PSTL CODE”, “ADDRESS”, “FIRM”, “NAME” and “BARCODE” by default, and that an address label printed as shown in FIG. 34B is formed when the above items are all registered. Further, if there is any item (related character string corresponding to the item) which is not registered, print images are arranged after the item is omitted. For instance, when the item of “BARCODE” is not registered as shown in FIG. 34C, an address label printed as shown in FIG. 34D is formed.

Figure 35:
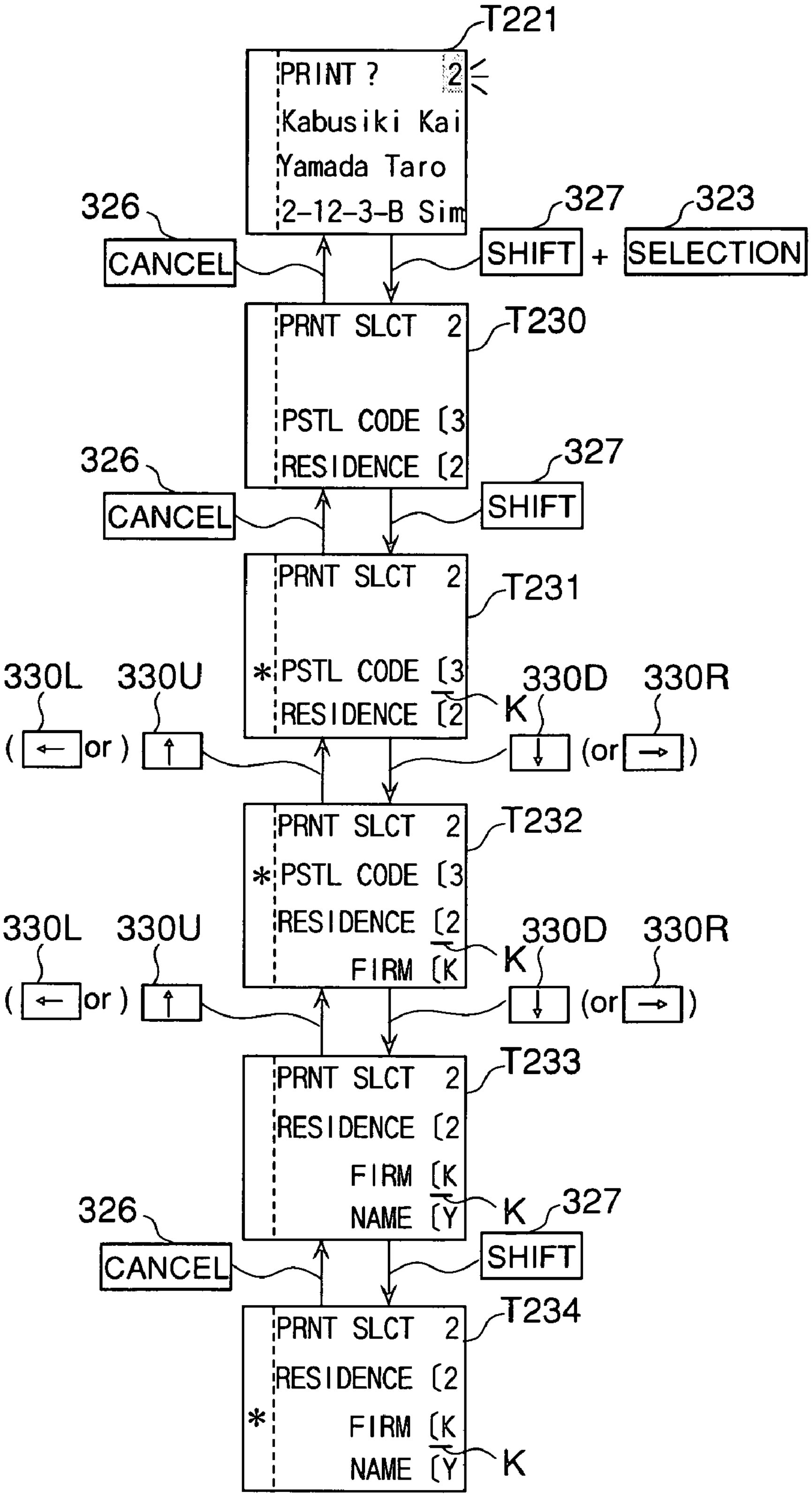
FIG. 35 is a diagram illustrating an example of images of the display screen and operations carried out on the screen when items for printing are selected/changed in the course of the FIG. 32 operation, while viewing entries registered in items of an address registration.
Figure 36:
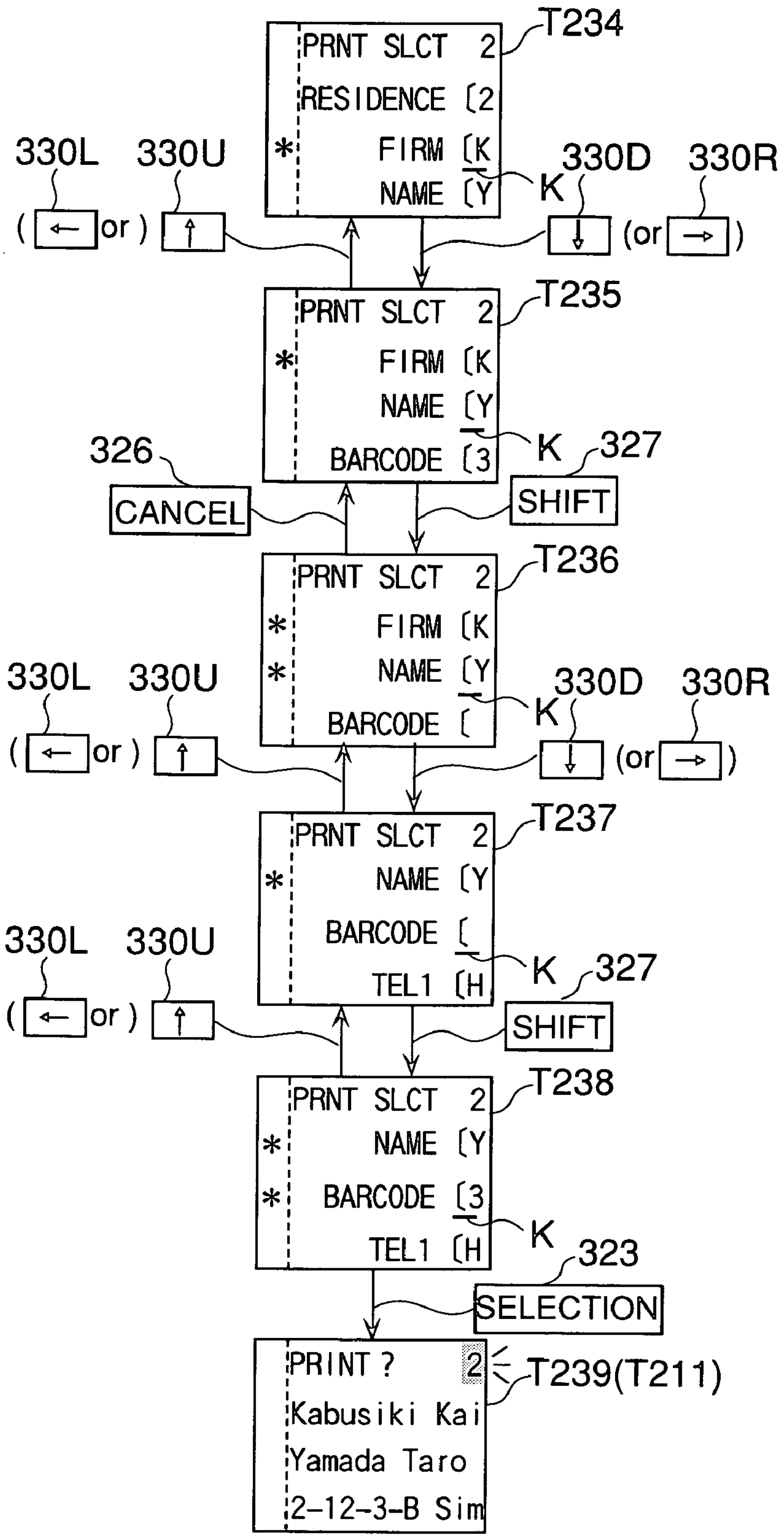
FIG. 36 is a continuation of FIG. 35.

Further, as described above, the items to be printed (i.e. related character strings to be printed) are determined whether or not they are default or entries, and further a desired item of entry/registration items can be determined as an item to be printed. In this case, for instance, in a state where the desire registration number described above with reference to FIG. 32 is displayed (in the above example, in the selection screen of the registration number “2”), when the shift key 327 and the selection key 323 are depressed at the same time (the shift key 327+the selection key 323 are depressed), as shown in FIGS. 35 to 36, a screen similar (but different in the indication of the name of the menu) to the above “ADD READ” screen is displayed (T230). By operating the cursor key 330 in this state, the user can display (read) all the entry/registration items corresponding to a registration number (identifier: “2” in this example) of an object to be printed (T230 to T238), and if he operates the shift key 327 when the cursor K is positioned on an item desired to be printed, he can select the desired item for printing. In this example, the item selected printing is displayed with a mark “*” added immediately before the line head of the item. Further, if the cursor K is placed under an item once selected, and the shift key 327 is operated again, the item can be omitted from the item to be printed.

Consequently, in the examples illustrated in FIGS. 35 to 36, “PSTL CODE”, “FIRM”, “NAME” and “BARCODE are selected as items to be printed. When the selection key 323 is depressed by the user after the items to be printed have been selected, the screen is returned to the original state (T239: the same as T221 in FIGS. 32 and 35) of the selection screen of the registration number “2”. Even when the screen is returned to the original state (T239) of the registration number “2”, the user can select again an item for printing by depressing again the shift key 327+the selection key 323 from the state. On the other hand, in this state (T239), the items to be printed are selected items (registered contents thereof: related character string: see FIG. 37A), so that when the selection key 323 is depressed, an address label shown in FIG. 37B is formed.

As described above, in the address printing, when each registration number (each identifier) is selected, the character string (related character string) of each item (name, residence, etc.) for printing is displayed with its identifier, so that it is possible to easily grasp related character strings for printing by way of the displayed related character strings, and with reference to the related character strings displayed, their identifier can be selected. Further, in the address printing, if a predetermined reading instruction is provided (by depression of the shift key 327+the selection key 323, in this example) when with an identifier being displayed, all the related character strings corresponding to the displayed identifier are readably displayed. Therefore, not only the displayed identifier and related character strings (selected for printing) but also other related character strings in the same regular character string group can be easily grasped by providing the predetermined reading instruction through simple operations, which makes it possible to select each identifier with reference to the related character strings. Further, by providing predetermined selecting instruction (by depression of the shift key 327, in this example) it is also possible to change (select) related character strings for printing (further, as described hereinabove, not related character strings to be selected but related character strings not to be selected may be designated).

It should be noted that postal codes, addresses, and barcodes (numerical value information thereof) included in the items of address registration according to the present embodiment include redundant information. That is, postal codes can be obtained from names of prefectures and municipalities, information of an address and that of a barcode are redundant in house number, and the numerical value information of a barcode contains information of a postal code. Therefore, entry/registration of part of information may be omitted. Particularly, in the numerical value information of a barcode includes information of a postal code as it is, and hence e.g. as shown in FIG. 37C, an address label appearing in FIG. 37B can be easily printed and formed similarly to the above examples, even if an address display number (part of a house number, of an address) obtained by excluding part of the postal code from the barcode is set to an entry/registration item in place of the barcode. Similarly, if information are shown in FIG. 37D is provided, the above address label shown in FIG. 34B can be easily printed and formed.

Further, a picture postcard or the like has a picture or a photo printed on a whole back surface thereof, so that a message or a comment is sometimes desired to be written on a front surface of the postcard. Therefore, the apparatus may be configured such that in such a case, desired character strings, such as the comment or the like described above with reference to FIG. 7, can be printed. In this case, similarly to the above comment registration, desired character strings may be entered such that the desired character strings can be registered as one kind of regular character string, and printed by carrying out regular printing in the same fashion as other types of regular printing described hereinbefore, or alternatively desired character strings being edited may be printed as they are. Further, instruction means for instructing, for instance, "ARBITRARY PRINTING" may be provided not for printing character strings being edited but for printing arbitrary character strings. In this case, irrespective of whether there exists a character string being edited or a registered regular character string, if "ARBITRARY PRINTING" is instructed at a desired time point similarly to the case of regular printing, an arbitrary character string can be printed by entering it at the desired time point. This can be realized by storing information for restoring a present state, similarly to regular printing before entering, editing, or printing the arbitrary character string. By using the above methods, similarly to the FIG. 7 case in which a comment is inserted (printed) next to character strings printed by "ADD PRNT" (address printing), it is possible to print an entered arbitrary character string at a location next to character strings printed by "ADD PRNT" (or on a back surface of a post card), at a given time point through simple operations.

In the following, description will be made of "PHN PRNT" (phone book printing) which is capable of printing "PHONE NUMBER" by using (appropriating) data registered for the above address printing and forming a phone number label usable as a memorandum of a phone number.

Figure 38:
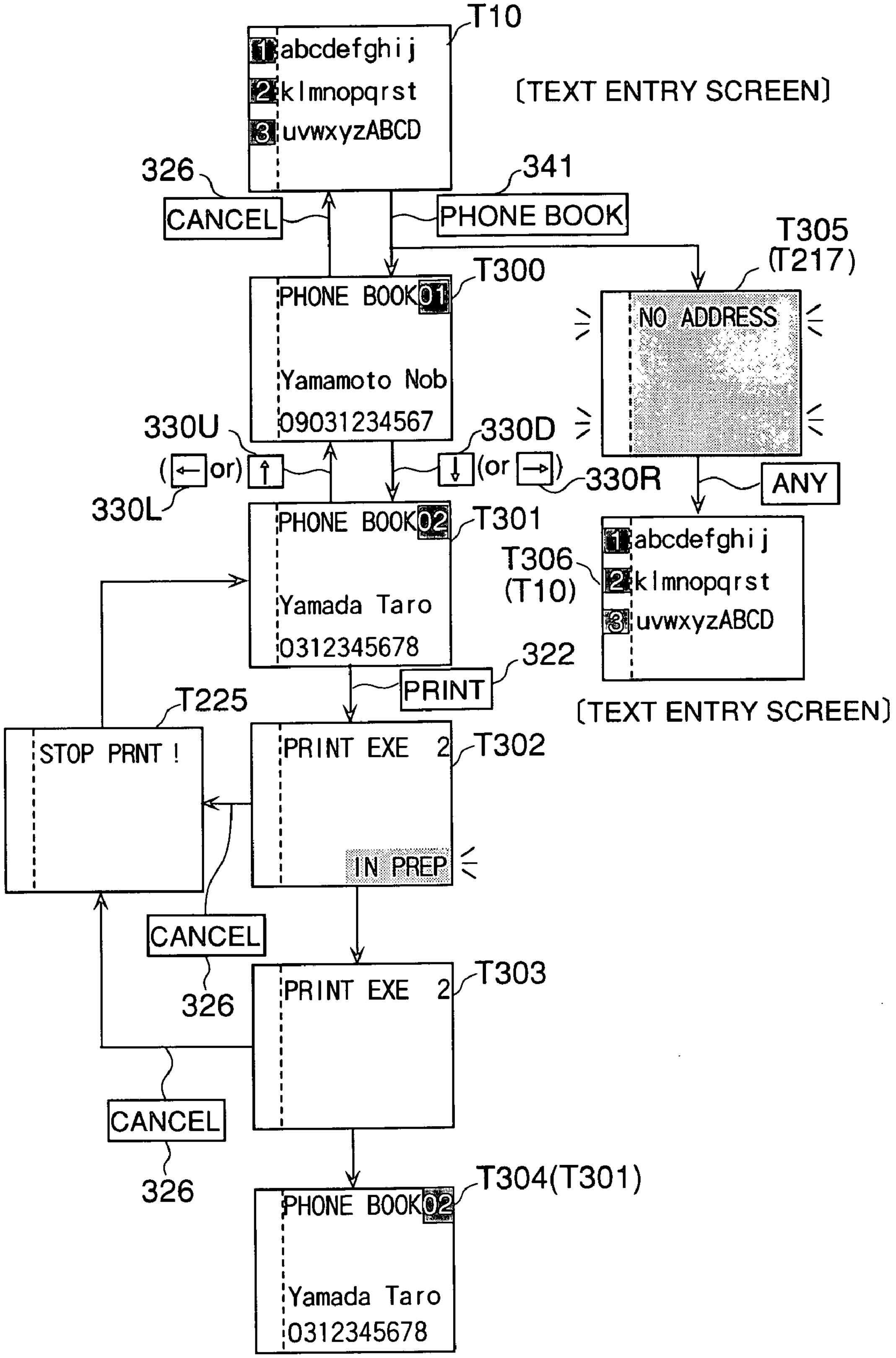
FIG. 38 is a diagram illustrating an example of images of a display screen and operations carried out on the screen when phone book printing is carried out as regular printing.

As shown in FIG. 38, in the state of the text entry screen editing the character strings "abcde . . . zABCD" described hereinabove with reference to FIG. 9 and the like, when the phone book key 341 is depressed by the user, a phone number selection screen (hereinafter referred to as the "PHONE BOOK" screen) is displayed (T300). Similarly to the case of "ADD PRNT" (address printing) described above with reference to FIG. 31, when a process concerning (displaying/printing of) a phone book is started, first, it is determined whether or not there is data registered by the address registration. If there is no registered data, a message for notifying the user of the fact is displayed (T305: the same as T217 in FIG. 31). In this state, by depressing the any key, the user can terminate the process to return the display screen to the text entry screen (T306: the same as T10).

On the other hand, if registered data exists, and now assuming that there is not an option selected when this screen was displayed on the immediately preceding occasion, "Yamamoto Nobuyuki" and "09031234567" are displayed (T300) which are registered entries (related character strings) of the items of "NAME" and "TEL1" of the smallest registration number "1" registered by the address registration (see FIG. 25). In this state, that is, in a state of the "PHONE BOOK" screen being displayed, by operating the cursor key 330, the user can cause a desired option (registration number (identifier) registered by the "ADD RGST", in this example) to appear on the screen in a highlighted state together with registered entries of items (basically "NAME" and "TEL1") thereof, and select the option by operating the selection key 323 (T300 to T301).

As described above, in the "PHN PRNT" (phone book printing) as well, similarly to the above "ADD PRNT", registration numbers registered by the "ADD RGST" (address registration) are used as identifiers, and a plurality of types of identifiers corresponding to a plurality of types of regular character strings are displayed on the display screen 41 for selecting any of the identifiers. Further, the same processes as the processes carried out in response to operation of the address key 340 in the address printing process (the present state-saving process (S21), the preset state-restoring process (S26), etc.) are carried out in response to operation of the phone book key 341. Further, in the phone book printing, similarly to the address printing, character strings (related character strings) of items (name, phone number, etc.) for printing are displayed together with a registration number (identifier) corresponding thereto, so that it is possible to easily grasp the related character strings for printing by way of the displayed related characters, and with reference to the related characters displayed, each identifier can be selected.

Figure 40:
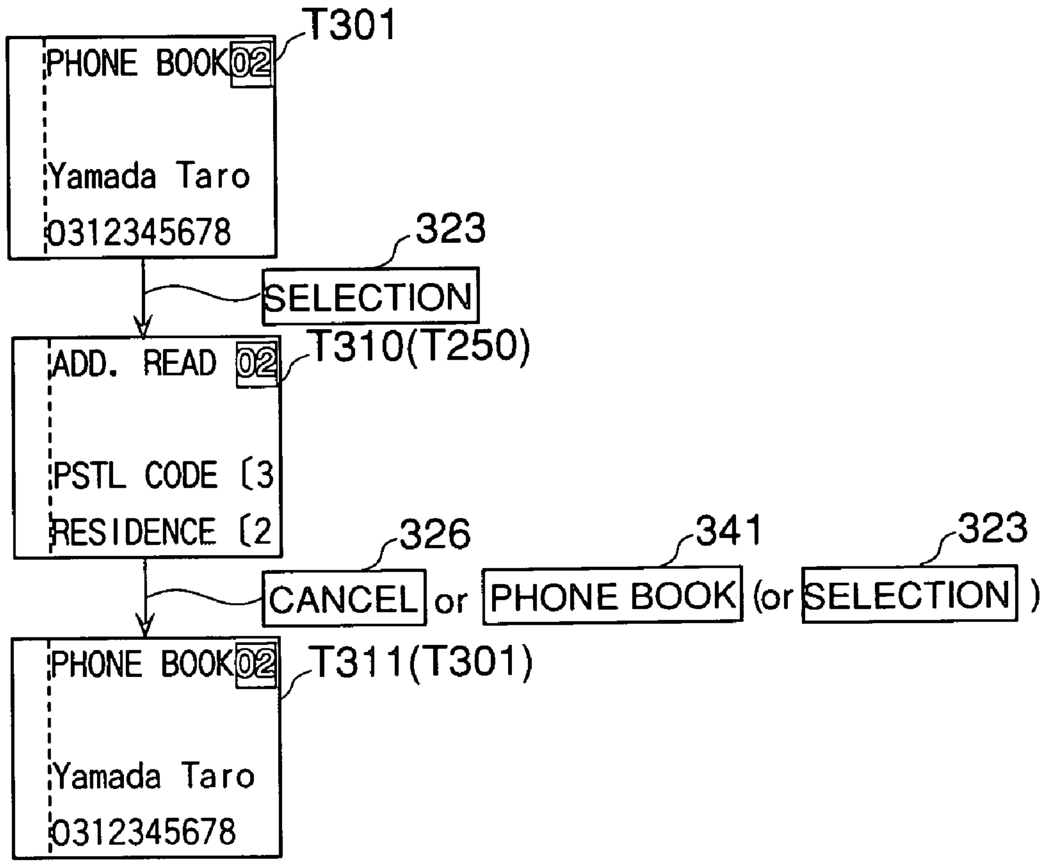
FIG. 40 is a diagram illustrating an example of images of the display screen and operations carried out on the screen when address reading is carried out via a "PHONE BOOK" screen.

It should be noted that screens displayed for the phone number printing are basically arranged in two hierarchical levels. For instance, as shown in FIG. 40, in the state of the "PHONE BOOK" screen being displayed (T301: commonly shown in FIGS. 38, 40), when the selection key 323 is depressed by the user, an address reading screen of the registration number displayed on the "PHONE BOOK" screen (registration number "2" in the figure) is displayed (T310: the same as T250 in FIG. 29). In this state, similarly to the "ADD READ" screen shown in FIG. 29 (T250), by operating the cursor key 330, the user can scroll the display screen to thereby confirm all the address information. After terminating the confirmation (reading), by operating a predetermined key, such as the cancel key 326 or the like as shown in FIG. 40, the user can change the "ADD READ" confirmation screen to the "PHONE BOOK" screen at the level hierarchically immediately above the "ADD READ" screen (T311: the same as T301). Therefore, not only the displayed registration numbers (identifiers) and related character strings (for printing) but also other related character strings in a regular character string group having the same registration number can be easily grasped by providing a predetermined reading instruction through simple operations (by operating the selection key 323, in this example), which makes it possible to select each identifier with reference to the related character strings. Here, processing operations responsive to key operations in the state of the "ADD READ" screen being displayed are defined as shown in FIG. 30 (however, as described above, in the row of [ADDRESS]/[PHONE BOOK] under the heading of "EFFECTIVE KEY(S)" in FIG. 30, the phone book key 341 is an effective key for instructing via the "PHONE BOOK" screen).

Further, as is clear from comparison of the phone number displayed on the "PHONE BOOK" screen (T301) in FIG. 38 (or FIG. 40) and the registered entry of the phone number described above with reference to FIG. 25 and the like, in the case of the registered entry of the item of TEL1 (phone number 1), for instance, "Home" indicative of the attribute of the phone number is added immediately before the head of the phone number "03-1234-5678", whereas this "Home" is omitted in the "PHONE BOOK" screen. This is because added characters, such as "Home" or the like, are automatically deleted considering display efficiency of the display screen. Examples of the differences are shown in FIG. 41. Although this method of display may be employed when characters are desired to be printed in a space limited in size, it is advantageous in displaying characters in a small-sized apparatus, such as the tape printing apparatus 1 which has a relatively small display screen.

Further, processing operations carried out in response to key operations via the "PHONE BOOK" screen are defined as shown in FIG. 42. Therefore, for instance, as shown in FIG. 38, when the print key 322 is depressed when the "PHONE BOOK" screen is displayed with registration number "2" (T301), the "PHN PRNT" (phone book printing) is carried out (see FIG. 42). More specifically, there are displayed the message "PRINT EXE 2" showing that registered entries of the registration number "2" are to be printed, and the message "IN PREP" showing preparation of a print image. The print image to be printed by the phone book printing is thus formed (T302). After the print image is formed, the message "IN PREP" is turned off and the "PHN PRNT" (phone book printing) is carried out on the tape T. After termination of the printing, the printed portion of the tape T is cut off and a phone number label (phone book label: see FIG. 43A) is formed (T303). After termination of the printing operation, the screen is returned to the "PHONE BOOK" screen displayed immediately before the phone book printing is carried out (T304: the same as T301). Here, processing operations responsive to key operations carried out when the "IN PREP" is displayed (T302) or when the "PRINT EXE" is displayed without the "IN PREP" (T303) are defined as shown in FIG. 33 (as described above, in the figure, at "2." of the box in the row of "CANCEL" under the heading of "KEY OPERATION DURING PREPARATION" and "4." of the box in the row of "CANCEL" under the heading of "KEY OPERATION DURING PRINTING", the portion "PRCEDING PHONE BOOK SCREEN" is related to the phone book printing.)

It should be noted that in the phone book printing, when the item of "NAME" has no entries (of the related character strings), registered entries (the related character strings) of the item "FIRM" (firm name) are substituted therefor to carry out display/printing operations. Further, when there exist a plurality of related character strings related to the "NAME" (or FIRM) and indicative of phone numbers, a related character string representative of a representative (or pilot) phone number representative of the plurality of related character strings is selected therefrom to carrying out the display/printing operations. In general, even when the user makes a phone call to a person having a plurality of telephones (using a plurality of phone numbers), the person normally uses one particular phone number. Therefore, in the phone book printing, when there exist a plurality of related character strings representative of respective phone numbers, a related character string representative of a representative (or pilot) phone number representing the phone numbers is selected. More specifically, when a related character string is registered to the item of the first one of registered phone numbers, that is, to the item of "TEL1" (phone number 1) described above with reference to FIG. 25 and the like, "TEL1" (phone number 1) is set to the representative phone number, whereas when a related character string is not registered to the item of "TEL1" (phone number 1), the display/printing operation is carried out by using the related character string of the item of the "TEL2" (phone number "2"). This makes it possible to print only one phone number usually used for communication as the representative phone number, thereby saving a printing space in comparison with a case in which the plurality of phone numbers are printed.

Figure 44:
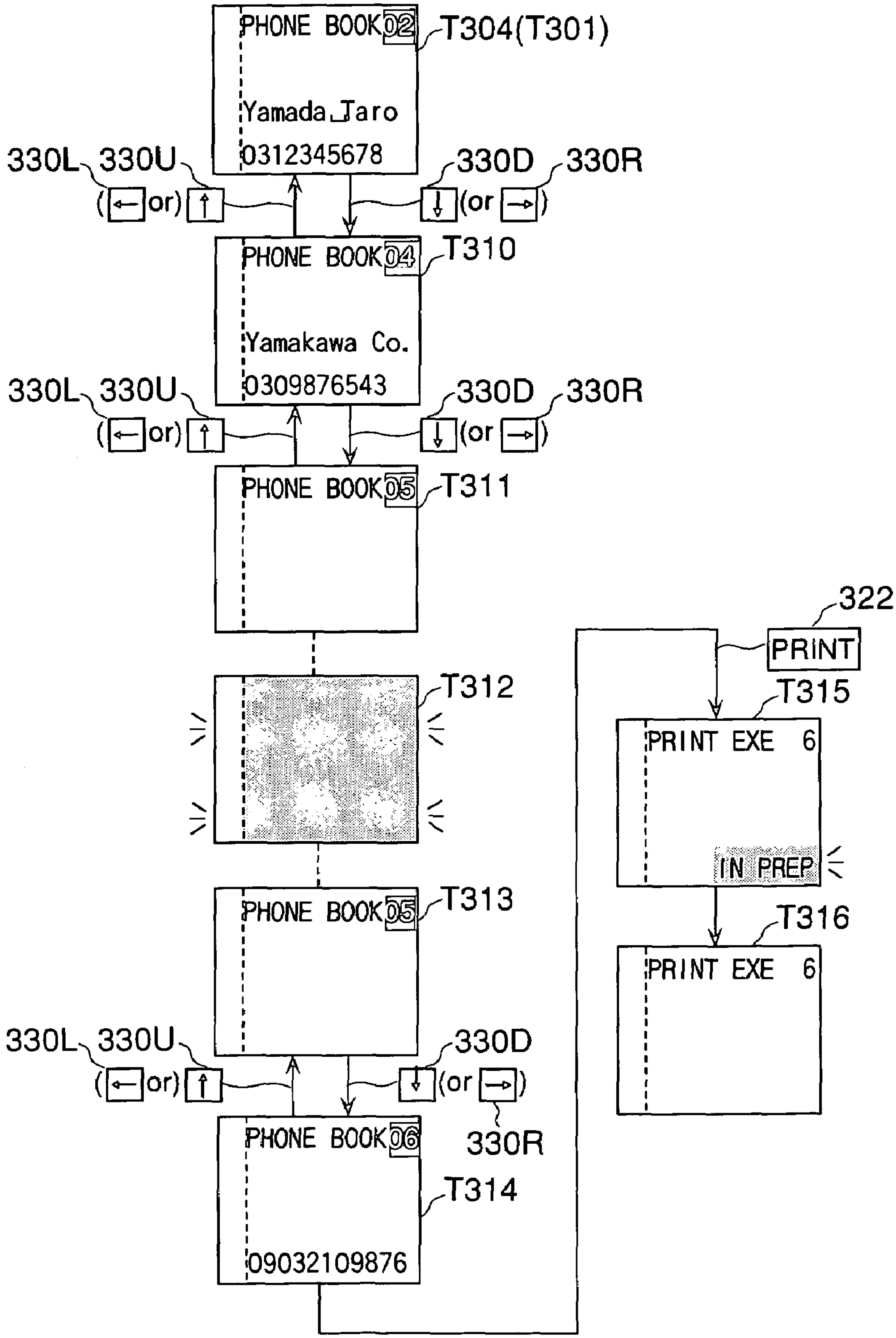
FIG. 44 is a diagram illustrating an example of images of the display screen and operations carried out on the screen when various types of phone book printing are carried out following the FIG. 38 process.

Next, various examples of the phone book printing will be enumerated hereinafter. After termination of the phone book printing for printing registered entries of the registration number "2" described above with reference to FIG. 38, as shown in FIG. 44, from the state of the screen being returned to the "PHONE BOOK" screen (T304: FIG. 38), when the cursor key 330D (or 300R) is operated by the user, if the registration number "3" has no entries, the address information of next registration number "4" is retrieved without displaying anything. Here, for instance, when the registration number "4" has no registered entry in the item of "NAME", but has a registered entry in the item of "FIRM", the registered entry of the item of "FIRM" is displayed instead (T310). Further, assuming that the following registration number "5" has entries registered by the ADD READ (address registration) but there are no entries in the items of "NAME", "FIRM", "TEL1", and "TEL2", if the cursor key 330D (or 300R) is then operated by the user, a weak (soft) warning is issued by flashing the whole display screen for a predetermined time period (T311 to T313).

Figure 45:
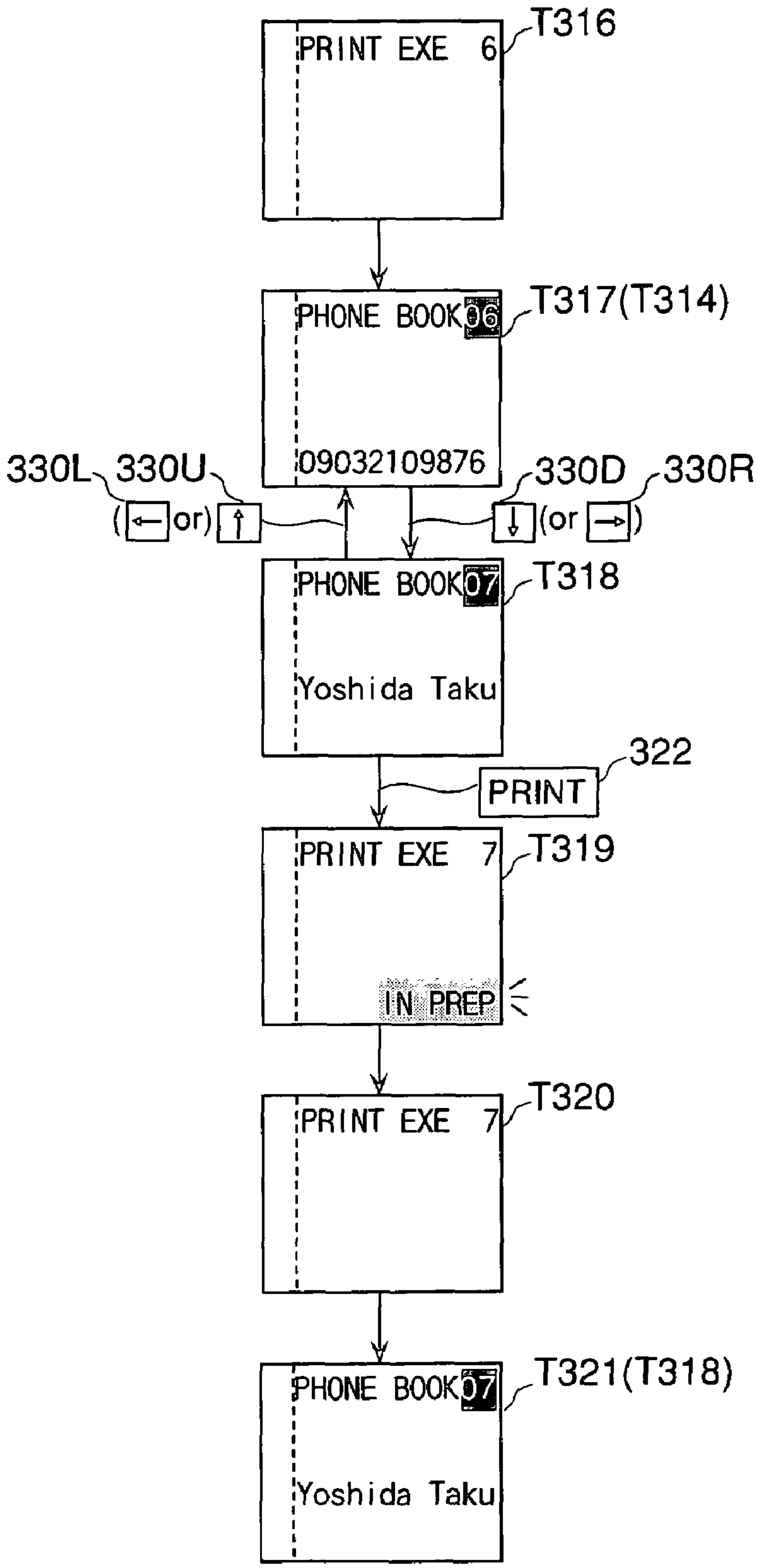
FIG. 45 is a continuation of FIG. 44.

Then, when the cursor key 330D (or 300R) is operated by the user, if the registration number "6" does not have any entries, for instance, registered in the items of "NAME", "FIRM", and "TEL1", but an entry (phone number) registered in the item of "TEL2", only the phone number is displayed (T314). If the print key 322 is depressed, for instance, in this state, there are displayed a message "PRINT EXE 6" showing that registered entries of the registration number "6" are to be printed, and the message "IN PREP" showing preparation of a print image. The print image to be printed by the phone book printing is thus formed (T315). After the print image is formed, the message "IN PREP" is turned off and the "PHN PRNT" (phone book printing) is carried out on the tape T. After termination of the printing, the printed portion of the tape T is cut off and a phone number label (only phone number: see FIG. 43B) is formed (T316: commonly shown in FIGS. 44 and 45). As shown in FIG. 45, after the printing operation has been terminated, the screen is returned to the "PHONE BOOK" screen displayed immediately before the phone book printing is carried out (T317: the same as T314).

Then, when the cursor key 330D (or 300R) is operated by the user, and, for instance, if the registration number "7" has an entry registered in the item of "NAME" but no entries registered in the items of "TEL1" and "TEL2, only "NAME" is displayed (T318). If the print key 322 is depressed, for instance, in this state, there are displayed a message "PRINT EXE 7" showing that registered entries of the registration number "7" are to be printed, and the message "IN PREP" showing preparation of a print image. The print image to be printed by the phone book printing is thus formed (T319). After the print image is formed, the message "IN PREP" is turned off and the "PHN PRNT" (phone book printing) is carried out on the tape T. After termination of the printing, the printed portion of the tape T is cut off and a phone number label (only name: see FIG. 43C) is formed (T320). As shown in FIG. 45, after the printing operation has been terminated, the screen is returned to the "PHONE BOOK" screen displayed immediately before the phone book printing is carried out (T321: the same as T318).

Figure 43A:
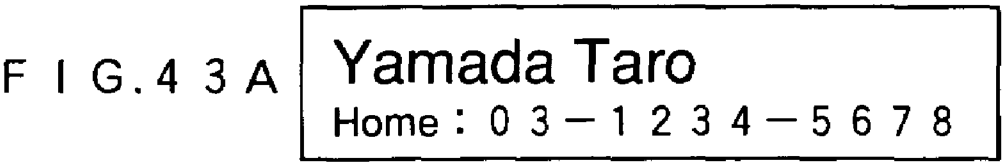
FIGS. 43A to 43C are diagrams showing labels printed with print images which are formed by carrying out phone book printing as regular printing.
Figure 43B:
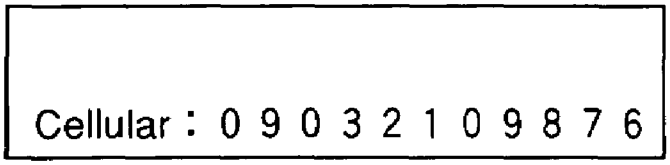

As described hereinabove, in the phone book printing, items to be printed by default (related character strings for printing) by the "ADD PRNT" are set to "FIRM", "NAME", "TEL1", and "TEL2", while "NAME" and "TEL1" are displayed and printed in preference to "FIRM" (firm name) and "TEL2" respectively. Further, as shown in FIG. 43, it is possible to carry out regular printing on both the personal name (or the firm name) and the phone number(s) depending on registered address information (address data), and thereby form a phone book label (see FIG. 43A), a (phone number) label (printed with only phone number) (see FIG.

Figure 43C:
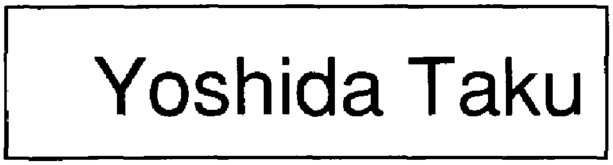

43B), and (name) label (printed with only personal name) (see FIG. 43C). It should be noted that the former two labels can be conveniently affixed to things near at hand as memorandum of phone numbers, while the latter can be used as the name label described above with reference to FIG. 6 and the like.

As described hereinbefore, addresses printed based on data registered by the address registration (address data: so-called address book data) can be used to substitute for hand-written addresses on postcards or the like. Address labels thus obtained can be easily affixed to mails or the like, and serve many uses at the office as well as at home. On the other hand, phone numbers, also serving as information on the other party, are often referenced and required to be referenced both at the office and home. Phone book (phone number) labels provided by the phone book printing method can be easily affixed to desks or phones as memorandums as required for serving as many uses as address labels. Since prints by the former address printing or address labels obtained therefrom can be substituted for hand-written addresses, the labels each bear a large amount of information (amount of data) printed as to a person but they are not referenced so often as phone numbers. Although prints by the latter phone book printing and phone book (or phone number) labels obtained thereby are frequently referenced, they each require only small spaces for affixing them, since they each bear a small amount of information (amount of data).

In the above-mentioned address printing and the phone book printing, address printing enables the user to print an address label bearing a sufficient amount of information to be used for mailing purposes, while phone book printing enables the user to easily print a label bearing personal name, phone numbers, and the like required for phone communications, and use the same in place of a memorandum. This makes it possible to easily and suitably carry out regular printing as circumstances demand, based on the same address information in a manner making use of the characteristics of both the address printing and the phone book printing.

Although in the above embodiments, the image printing method and apparatus of the invention are applied to the tape printing apparatus 1 by way of example, this is not limitative, but the same can be applied to any kind of apparatuses, such as a printing apparatus of the general type and the like, or image printing methods for any purpose, so long as the they regularly or repetitively print a character string image of a character string having one or more characters, such as letters, numerals, symbols, simple figures, and the like.

INDUSTRIAL APPLICABILITY

As described above, according to the image printing method and apparatus of the invention, irrespective of whether or not another character string is being edited, it is possible to print a regular character string image of a registered regular character string at a desired time point through simple operations in a very suitable manner, thereby saving the capacity of the memory device.

The invention claimed is:

1. An image printing method comprising:

a regular character string registration step of registering a character string having at least one character as a regular character string;

a regular printing instruction step of instructing regular printing for printing said regular character string, irrespective of whether or not a character string other than said regular character string is being input or edited;

a regular printing step of printing a regular character string image corresponding to said regular character string on a printing object as a print image without displaying said regular character string image on a predetermined display screen when said regular printing is instructed;

wherein a plurality of types of regular character strings can be registered as said regular character strings; and a regular printing image selection step of selecting any one of said plurality of types of regular character strings as a regular character string to be printed by said regular printing;

said regular printing image selection step including:

an identifier display step of displaying a plurality of types of identifiers corresponding respectively to said plurality of types of regular character strings on the predetermined display screen; and an identifier selection step of selecting any one of said plurality of types of identifiers.

2. An image printing method according to claim 1, further including a related character string registration step of registering said regular character string as a representative character string, and registering at least one character string related to said representative character string as related character strings, such that said related character strings are correlated with said representative character string, to thereby construct one regular character string group including said representative character string as a representative thereof, and wherein said regular printing step includes a related character string printing step of printing, when a representative character string image corresponding to said representative character string is printed as said regular character string image, at least one related character string image corresponding to at least one of said related character strings such that said at least one related character string image accompanies said representative character string image.

3. An image printing apparatus having display means, said apparatus comprising:

regular character string registration means for registering a character string having at least one character as a regular character string;

regular printing instruction means for instructing regular printing for printing said regular character string, irrespective of whether or not a character string other than said regular character string is being input or edited;

regular printing means for printing a regular character string image corresponding to said regular character string as a print image without displaying said regular character string on a predetermined display screen, on a printing object when said regular printing is instructed;

wherein a plurality of types of regular character strings can be registered as said regular character strings; and regular print image selection means for selecting any of said plurality of types of regular character strings as a regular character string to be printed by said regular printing;

said regular print image selection means including:

identifier display means for displaying a plurality of types of identifiers corresponding to said plurality of types of regular character strings on the predetermined display screen; and identifier selection means for selecting any of said plurality of types of identifiers.

4. An image printing apparatus according to claim 3, further including related character string registration means registering said regular character string as a representative character string, and registering at least one character string related to said representative character string as related character strings, such that said related character strings are correlated with said representative character string, to thereby construct one regular character string group including said representative character string as a representative thereof, and wherein said regular printing means includes related character string printing means for printing, when a representative character string image corresponding to said representative character string is printed as said regular character string image, at least one related character string image corresponding to at least one of said related character strings such that said at least one related character string image accompanies said representative character string image.

5. An image printing apparatus according to claim 4, wherein said related character string printing means prints at least one predetermined related character string image of said related character strings such that said at least one predetermined related character string image accompanies said representative character string image.

6. An image printing apparatus according to claim 4, wherein a plurality of types of related character strings can be registered as said related character strings, wherein said related character string printing means includes:

related print image selection means for selecting at least one arbitrary related character string of said related character strings; and related print image printing means for printing said at least one selected arbitrary related character string such that said at least one selected arbitrary related character string accompanies said representative character string image.

7. An image printing apparatus according to claim 3, wherein a plurality of types of regular character strings can be registered as said regular character strings, the image printing apparatus further including regular printing image selection means for selecting any of said plurality of types of regular character strings as a regular character string to be printed by said regular printing.

8. An image printing apparatus according to claim 3, wherein said regular character string group is registered such that said representative character string corresponding to said identifier is registered separately therefrom as one type of said related character string.

9. An image printing apparatus according to claim 3, wherein assuming that predetermined two identifiers included in said plurality of types of identifiers are defined as a first identifier and a second identifier, and regular character string groups corresponding to said first identifier and said second identifier are defined as a first regular character string group and a second regular character string group respectively, at least one of related character strings of said second regular character string group is included in related character strings of said first regular character string group, as a common related character string.

10. An image printing apparatus according to claim 3, wherein said regular print image selection means includes:

identifier display means for displaying said plurality of types of identifiers on a predetermined display screen; and identifier selection means for selecting any of said plurality of types of identifiers.

11. An image printing apparatus according to claim 10, wherein said regular print image selection means further includes:

display-restoring information storage means for storing display-restoring information required for restoring contents currently displayed on said predetermined display screen before displaying said plurality of types of identifiers; and display restoration means for restoring said contents displayed on said predetermined display screen at said time of storing said display-restoring information, based on said display-restoring information, after selection of said identifier.

12. An image printing apparatus according to claim 4, wherein said regular character string includes a character string representative of at least one of a person's name, an appellation and a name of a division to which a person belongs.

13. An image printing apparatus according to claim 3, further including arbitrary character string entry means for entering an arbitrary character string having at least one character string, wherein said regular character string registration means registers said arbitrary character string as one type of a regular character string other than said regular character string.

14. An image printing apparatus according to claim 13, further including:

arbitrary printing instruction means for instructing arbitrary printing for printing said arbitrary character string entered; and arbitrary printing means for printing an arbitrary character string image corresponding to said arbitrary character string as said print image when said arbitrary printing is instructed.

15. An image printing apparatus according to claim 3, wherein said printing object is a tape.

* * * * *